United States Patent
Yeke Yazdandoost et al.

(10) Patent No.: US 12,449,940 B2
(45) Date of Patent: Oct. 21, 2025

(54) PHOTO-SENSING ENABLED DISPLAY FOR STYLUS DETECTION

(71) Applicant: Apple Inc., Cupertino, CA (US)

(72) Inventors: Mohammad Yeke Yazdandoost, San Francisco, CA (US); Christopher J. Butler, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/462,330

(22) Filed: Sep. 6, 2023

(65) Prior Publication Data

US 2024/0118773 A1    Apr. 11, 2024

Related U.S. Application Data

(60) Provisional application No. 63/496,258, filed on Apr. 14, 2023, provisional application No. 63/377,003, filed on Sep. 23, 2022.

(51) Int. Cl.
*G06F 3/042*    (2006.01)
*G06F 3/041*    (2006.01)

(52) U.S. Cl.
CPC ......... *G06F 3/0425* (2013.01); *G06F 3/0412* (2013.01); *G06F 3/0421* (2013.01); *G06F 3/0428* (2013.01)

(58) Field of Classification Search
CPC .... G06F 3/0412; G06F 3/0421; G06F 3/0425; G06F 3/0428
See application file for complete search history.

(56) References Cited

U.S. PATENT DOCUMENTS

| 8,345,023 B1 | 1/2013 | Drennan et al. |
| 8,717,337 B2 | 5/2014 | Kim et al. |
| 8,773,399 B2 | 7/2014 | Niu et al. |

(Continued)

FOREIGN PATENT DOCUMENTS

| CA | 2340723 A1 | 3/2000 |
| CN | 206058164 U | 3/2017 |

(Continued)

OTHER PUBLICATIONS

Notice of Allowance received for U.S. Appl. No. 18/411,907, mailed on Sep. 17, 2024, 10 pages.

*Primary Examiner* — Adam J Snyder
(74) *Attorney, Agent, or Firm* — Kubota & Basol LLP

(57) ABSTRACT

An optical stylus system including an optical stylus and optical sensing system that are together operative to determine one or more of the target or touch location, centroid, hover distance, tilt angle, azimuth, and in some instances the orientation and rotation of the stylus is disclosed. In some examples, light illuminator and detector angular filters are employed to limit the illumination and detection angles of light to minimize false object detection. In other examples, the stylus is a passive stylus with a surface that reflects light with a consistent angular reflection profile or reflected light pattern regardless of stylus tilt. In still other examples, the stylus can detect light at different modulation frequencies emitted from an array of light emitters in the optical sensing system, or the stylus can emit light and detect reflected light with different spectral distributions across the optical sensing system to determine stylus location.

20 Claims, 30 Drawing Sheets

(56) References Cited

U.S. PATENT DOCUMENTS

| | | |
|---|---|---|
| 9,158,416 B2 | 10/2015 | Eriksson et al. |
| 9,218,073 B1 | 12/2015 | Kremin et al. |
| 9,501,176 B1 | 11/2016 | Smits |
| 9,557,846 B2 | 1/2017 | Baharav et al. |
| 9,582,117 B2 | 2/2017 | Wyrwas et al. |
| 9,844,704 B2 | 12/2017 | Thurman et al. |
| 9,964,439 B2 | 5/2018 | Arends et al. |
| 10,365,732 B2 | 7/2019 | Bernstein et al. |
| 10,908,710 B2 | 2/2021 | Kremin et al. |
| 11,301,089 B2 | 4/2022 | Christiansson et al. |
| 11,755,107 B1 | 9/2023 | Cihan et al. |
| 11,775,021 B2 | 10/2023 | Soskind et al. |
| 2005/0026209 A1 | 2/2005 | Vann |
| 2007/0290284 A1* | 12/2007 | Shaffer ............... H01L 27/1446 |
| | | 257/432 |
| 2010/0289755 A1 | 11/2010 | Zhu et al. |
| 2012/0127110 A1 | 5/2012 | Amm et al. |
| 2012/0133624 A1* | 5/2012 | Castagner ............ G06F 3/0421 |
| | | 345/207 |
| 2013/0069913 A1 | 3/2013 | Wang et al. |
| 2013/0120760 A1* | 5/2013 | Raguin ................ A61B 5/117 |
| | | 356/612 |
| 2013/0321345 A1 | 12/2013 | Burns |
| 2014/0191110 A1* | 7/2014 | Holenarsipur ........ G06F 3/0421 |
| | | 250/206 |
| 2014/0347291 A1* | 11/2014 | Katsube ............. G06F 3/04186 |
| | | 345/173 |
| 2015/0091875 A1 | 4/2015 | Li |
| 2015/0317034 A1* | 11/2015 | Kent .................... G06F 3/0421 |
| | | 345/175 |
| 2017/0024083 A1 | 1/2017 | Gilton et al. |
| 2017/0091506 A1* | 3/2017 | Sinha ................... G06F 1/1643 |
| 2017/0123595 A1 | 5/2017 | Zou et al. |
| 2017/0139498 A1 | 5/2017 | Zou et al. |
| 2017/0161543 A1* | 6/2017 | Smith ................ G02F 1/13338 |
| 2017/0161544 A1* | 6/2017 | Fomani ................ G06F 3/0428 |
| 2018/0233531 A1* | 8/2018 | Huang ............. H01L 27/14623 |
| 2018/0239445 A1 | 8/2018 | Barel |
| 2019/0237521 A1* | 8/2019 | Ju ....................... G06V 40/1318 |
| 2020/0105841 A1* | 4/2020 | Bang ...................... H10K 59/60 |
| 2020/0249777 A1 | 8/2020 | Hou et al. |
| 2020/0266227 A1* | 8/2020 | Wang ............... H01L 27/14627 |
| 2020/0310592 A1 | 10/2020 | Bergström et al. |
| 2021/0004556 A1* | 1/2021 | Reinhold ........... G06V 40/1359 |
| 2021/0020708 A1* | 1/2021 | Kim ....................... G06F 21/32 |
| 2021/0311585 A1 | 10/2021 | Duxbury et al. |
| 2021/0311586 A1 | 10/2021 | Duxbury et al. |
| 2021/0349326 A1 | 11/2021 | Peng et al. |
| 2022/0027034 A1 | 1/2022 | Park et al. |
| 2022/0113542 A1 | 4/2022 | Pappas et al. |
| 2024/0310959 A1 | 9/2024 | Yeke Yazdandoost et al. |
| 2025/0068285 A1 | 2/2025 | Yeke Yazdandoost et al. |

FOREIGN PATENT DOCUMENTS

| | | |
|---|---|---|
| CN | 211319241 U | 8/2020 |
| KR | 20130113185 A | 10/2013 |
| KR | 20200000012 A | 1/2020 |

* cited by examiner

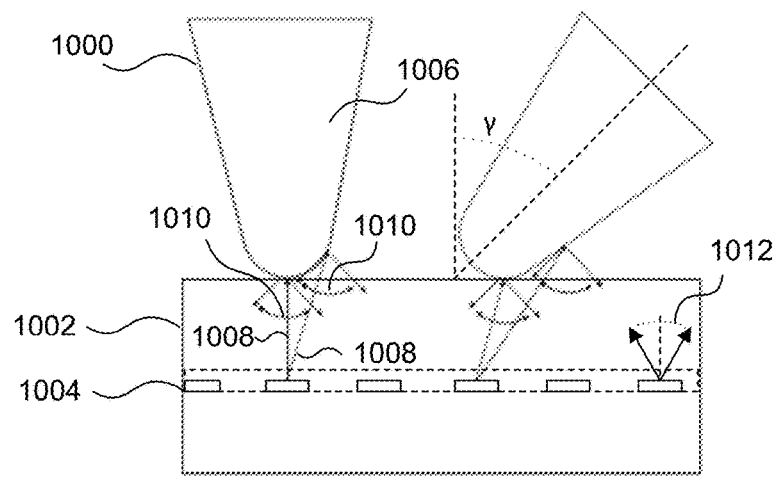
FIG. 10A
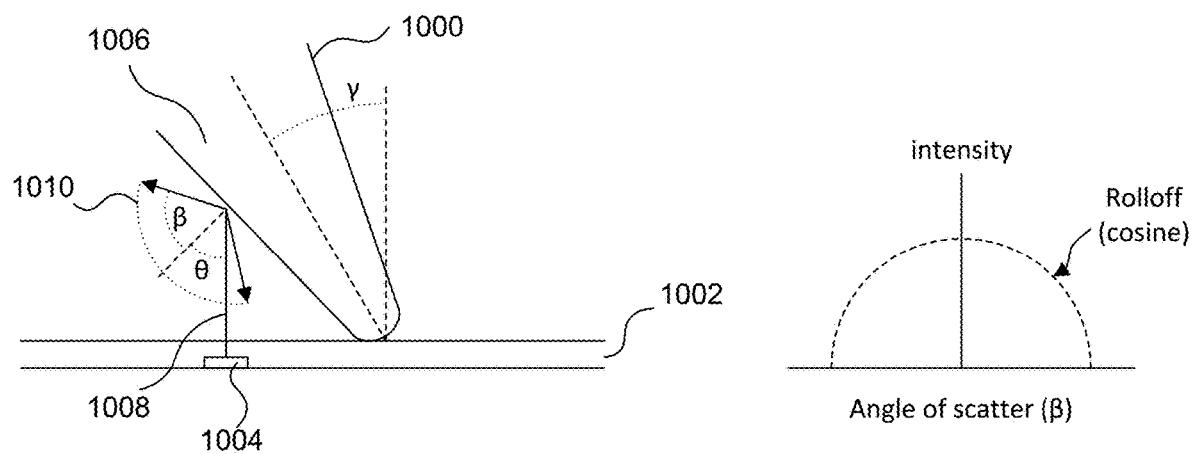
FIG. 10B     FIG. 10C

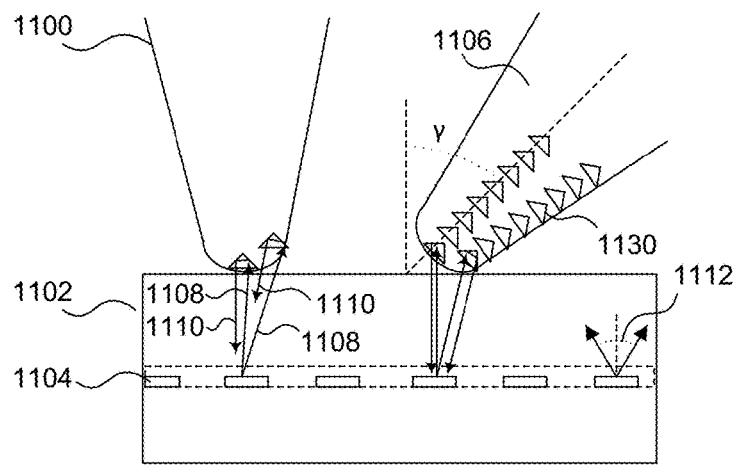
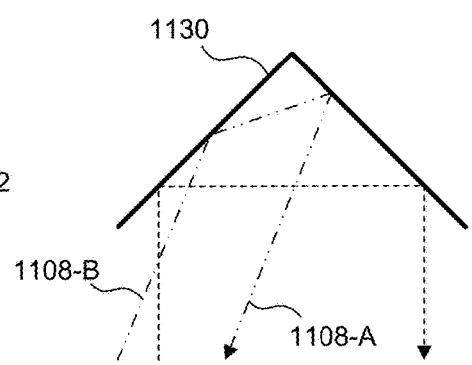
FIG. 11A
FIG. 11B
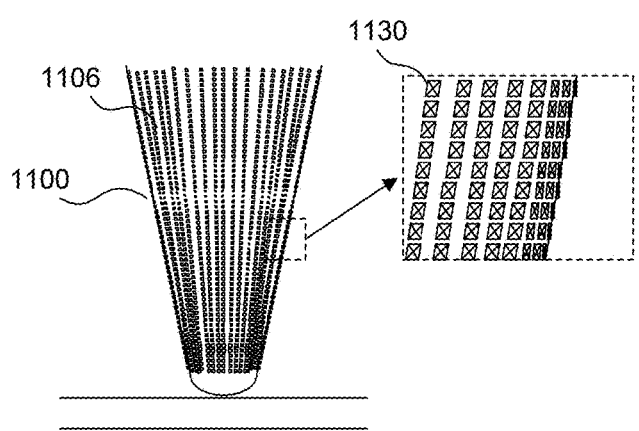
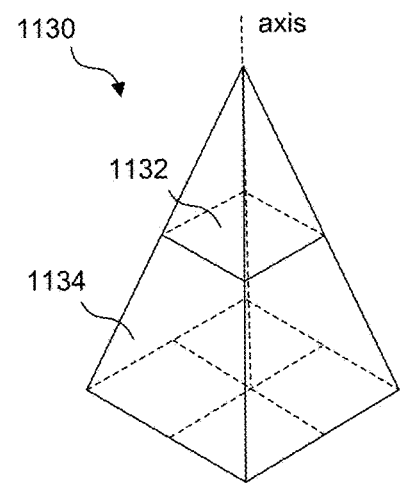
FIG. 11C-1
FIG. 11C-2

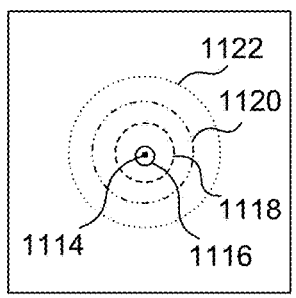 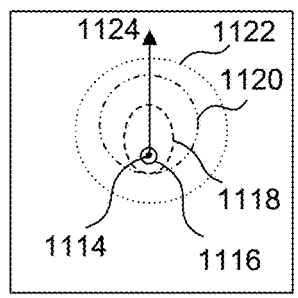 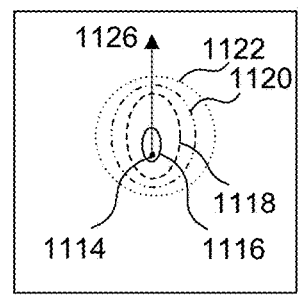
FIG. 11D-1        FIG. 11D-2        FIG. 11D-3

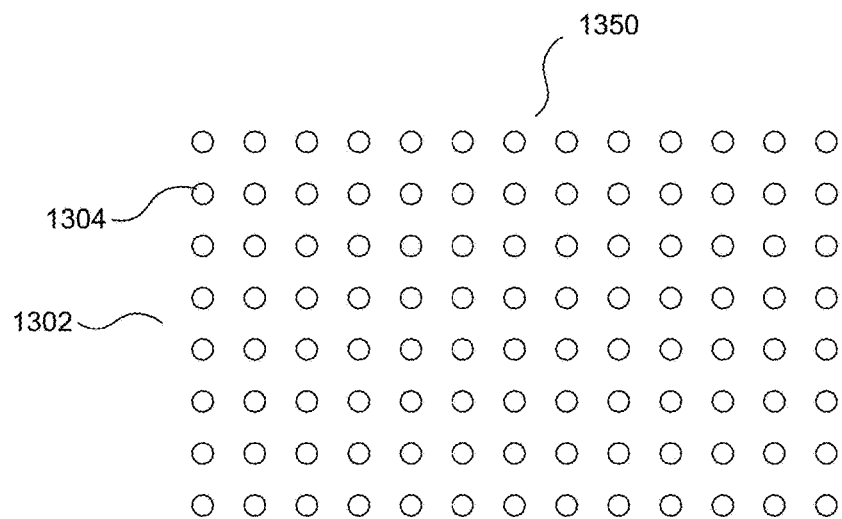
FIG. 13A
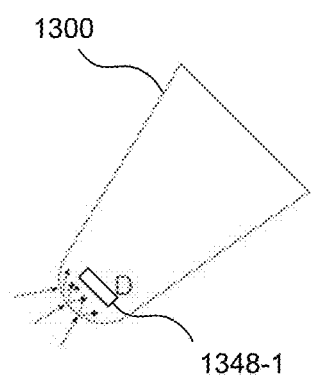 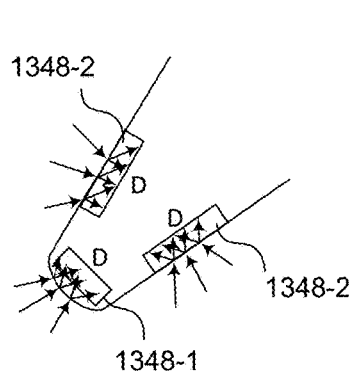 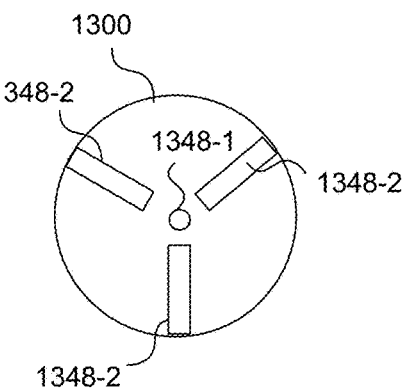
FIG. 13B   FIG. 13C-1   FIG. 13C-2

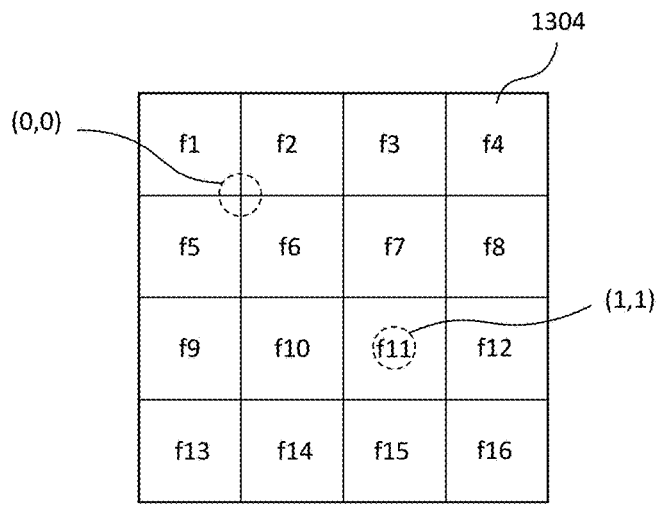
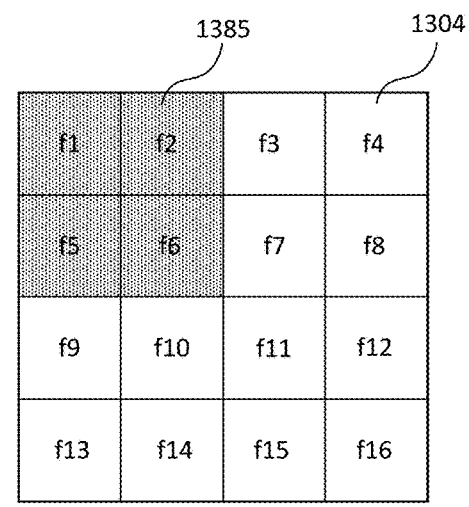
FIG. 13G-1
FIG. 13G-2
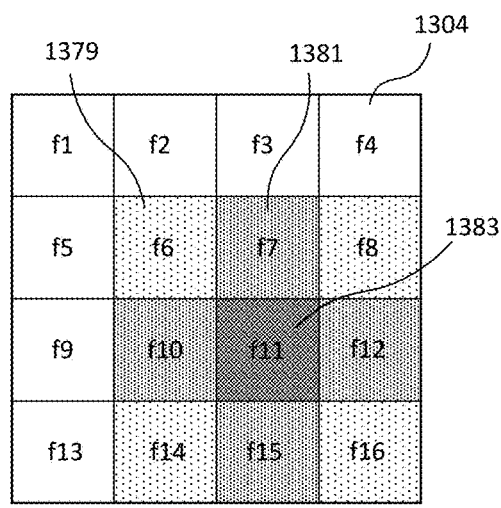
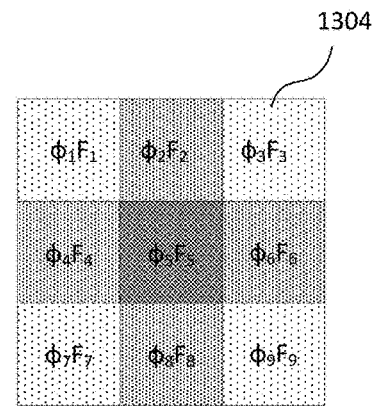
FIG. 13G-3
FIG. 13G-4

PHOTO-SENSING ENABLED DISPLAY FOR STYLUS DETECTION

CROSS-REFERENCE TO RELATED APPLICATIONS

This application claims priority to U.S. Provisional Application No. 63/377,003, filed Sep. 23, 2022, and U.S. Provisional Application No. 63/496,258, filed Apr. 14, 2023, the contents of which are herein incorporated by reference in their entireties for all purposes.

FIELD OF THE DISCLOSURE

This relates generally to optical touch and/or proximity sensing, and more particularly to an optical sensing system that works in conjunction with an optical stylus to determine one or more of the target or touch location, centroid, hover distance, tilt angle, azimuth, and in some instances the orientation and rotation of the stylus.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

In some examples, capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

Styluses have become popular input devices for touch-sensitive devices such as touch panels and touch screens. Detecting the touch location or target location of a stylus (e.g., the illumination area of the detection surface that a user of the stylus is intending to engage), the tilt angle and direction of a stylus that is touching or hovering over (but not directly in contact with) the detection surface, or the orientation and rotation of the stylus can provide for a variety of input modes and increased stylus functionality. However, the tilt angle and hover distance of a stylus can affect the accuracy of parameters derived from the target location (e.g., parameters such as the centroid of an illumination pattern representing the target location), which can affect the accuracy of other operations (e.g., tracking accuracy) and lead to degraded performance.

SUMMARY OF THE DISCLOSURE

This relates to an optical stylus system including an optical stylus and optical sensing system that are together operative to detect one or more of the target or touch location, centroid, hover distance, tilt angle, azimuth, and in some instances the orientation and rotation of the optical stylus with respect to the optical sensing system. In particular, detecting the rotation of a stylus can provide an additional input mode that enables additional stylus functionality. For example, rotating a stylus while interacting with a drawing application can allow the artist to control the perceived texture, thickness or color of a line being drawn.

In some embodiments the optical sensing system is an electronic device having an integrated touch screen with micro circuitry configurable for both display operations and touch/proximity sensing of the object. In some embodiments, the integrated touch screen can include light emitting diodes or organic light emitting diodes (LEDs/OLEDs), display driving circuitry, and touch sensing circuitry. In some embodiments, the LEDs/OLEDs can be implemented as a micro-LED display including an array of micro-LEDs and micro-driver circuitry. In some implementations, the array of micro-LEDs and micro-driver circuitry can be configured in a direct current (DC) photoconduction mode to detect the presence of a stylus by detecting unmodulated light transmitted by a stylus. In other implementations, the array of micro-LEDs and micro-driver circuitry can be configured in an alternating current (AC) photoconduction mode to detect the presence of multiple styluses by detecting modulated light transmitted by the multiple styluses. In still other implementations, the array of micro-LEDs and micro-driver circuitry can be configured in an optical reflective touch mode to detect the presence of an object such as a finger or stylus by detecting modulated light generated by some of the micro-LEDs and reflected off the object.

The detection modes described above rely on light passing through the detection surface of a cover material located above the integrated touch screen to LEDs, OLEDs or micro-LEDs located below. However, light impinging on the boundary between the detection surface and a medium above the detection surface (e.g., air, water, stylus, or finger), from either above or below the detection surface, can reflect off the boundary or be refracted as it passes through the boundary. In some instances, this reflected or refracted light can be detected and incorrectly identified as an object such as a finger or a stylus. Accordingly, in some embodiments of the disclosure, light illuminator angular filters can be employed above those micro-LEDs configured as illuminators within the integrated touch screen to limit the illumination angle of those illuminators, and/or light detector angular filters can be employed above those micro-LEDs configured as detectors within the integrated touch screen to limit the detection angle of those detectors. These angular filters effectively block or filter light transmitted, reflected or refracted within the cover material to reduce or eliminate the false detection of water droplets on the touch surface.

After the angularly filtered light is detected by the optical sensing system, the resultant illumination pattern (e.g., the target location of a hovering stylus) can be processed to determine the hover distance and tilt angle of the object, and compute various parameters (e.g., the centroid of the illumination pattern representing the target location) and other operations (e.g., stylus tracking) with greater precision.

In some embodiments, the optical stylus is a passive stylus including either a diffusive reflector or retroreflector facets to reflect light emitted from the optical sensing system with a consistent angular reflection profile. Different tilt angles can generate different reflected energy profiles, and these different reflected energy profiles can be evaluated to determine the location, hover distance (if any) and tilt angle of the stylus. In embodiments, a passive stylus including a diffractive (patterned) reflector can also reflect light emitted from the optical sensing system with a consistent reflected light pattern regardless of an angle of stylus tilt angle with respect to the surface. Different tilt angles and rotations of the stylus can generate different reflected light patterns, and these different reflected light patterns can be evaluated to determine the location, hover distance (if any), tilt angle, orientation and rotation of the stylus. In some embodiments, a semi-active stylus including an amplitude sensor in its tip and optionally in radial locations along the sides of the stylus can detect the amplitudes of different frequencies of modulated light emitted from the optical sensing system, and detect the location and hover distance (if any) of the stylus, and in some instances also detect the tilt angle and rotation of the stylus. In some examples of the disclosure, an active stylus including both light emitters and detectors can generate light and receive reflected light when it is reflected off a proximate optical sensing system with a retroreflector layer formed between an array of display elements. Different locations of the stylus on or above the display surface can produce different spectral distributions of reflected light that can be analyzed to determine the location of the stylus.

BRIEF DESCRIPTION OF THE DRAWINGS

FIG. 10A illustrates a cross-sectional view of a portion of an optical stylus system with a passive diffusive reflector stylus and an optical sensing system with an array of optical light emitting and/or detecting devices according to some examples of the disclosure.

FIG. 10B illustrates a cross-sectional view of a portion of an optical stylus system with a passive diffusive reflector stylus and an optical sensing system with a single light emitting device (for purposes of explanation only) according to some examples of the disclosure.

FIG. 10C illustrates a plot of reflected light intensity versus angle of scatter R for light reflecting off a passive diffusive reflector stylus according to some examples of the disclosure.

FIG. 11A illustrates a cross-sectional view of a portion of an optical stylus system with a passive retroreflective stylus and an optical sensing system with an array of optical light emitting and/or detecting devices according to some examples of the disclosure.

FIG. 11B illustrates a symbolic representation of a cross-section of a retroreflector facet to illustrate the principles of retroreflection according to some examples of the disclosure.

FIG. 11C-1 illustrates a portion of an optical stylus system with a passive retroreflective stylus having a retroreflective surface including retroreflector facets according to some examples of the disclosure.

FIG. 11C-2 illustrates a retroreflector facet according to some examples of the disclosure.

FIGS. 11D-1 to 11D-3 illustrate energy profiles for light that has reflected off a retroreflective surface of a passive retroreflective stylus at three different tilt angles and is now impinging on an array of detectors in an optical sensing system according to examples of the disclosure.

FIG. 13A illustrates a plan view of a portion of an optical sensing system including an array of light emitting devices operative with a semi-active light detecting stylus according to some examples of the disclosure.

FIG. 13B illustrates a semi-active stylus with a light detecting device embedded within the tip of the stylus according to some examples of the disclosure.

FIG. 13C-1 illustrates a semi-active stylus with a light detecting device embedded within the tip of the semi-active stylus and additional light detecting devices embedded within the sides of the stylus according to some examples of the disclosure.

FIG. 13C-2 illustrates a view of a semi-active stylus along its axis with light detecting devices according to some examples of the disclosure.

FIGS. 13G-1, 13G-2 and 13G-3 illustrate a symbolic optical sensing system with 16 light emitting devices and two semi-active stylus locations according to some examples of the disclosure.

FIG. 13G-4 illustrates a group of nine light emitting devices that can emit light at up to nine different modulation frequencies and up to nine different phases according to some examples of the disclosure.

DETAILED DESCRIPTION

Figure 1A:
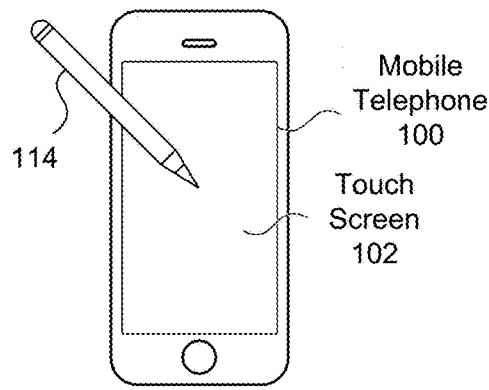
FIGS. 1A-1E illustrate optical stylus systems including an optical stylus and an electronic device that includes an optical sensing system in which one or more of the target or touch location, centroid, hover distance, tilt angle, azimuth, and in some instances the orientation and rotation of an optical stylus touching or in proximity to a surface can be determined according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to an optical stylus system including an optical stylus and optical sensing system that are together operative to detect one or more of the target or touch location, centroid, hover distance, tilt angle, azimuth, and in some instances the orientation and rotation of the optical stylus with respect to the optical sensing system. In particular, detecting the rotation of a stylus can provide an additional input mode that enables additional stylus functionality. For example, rotating a stylus while interacting with a drawing application can allow the artist to control the perceived texture, thickness or color of a line being drawn.

In some embodiments the optical sensing system is an electronic device having an integrated touch screen with micro circuitry configurable for both display operations and touch/proximity sensing of the object. In some embodiments, the integrated touch screen can include light emitting diodes or organic light emitting diodes (LEDs/OLEDs), display driving circuitry, and touch sensing circuitry. In some embodiments, the LEDs/OLEDs can be implemented as a micro-LED display including an array of micro-LEDs and micro-driver circuitry. In some implementations, the array of micro-LEDs and micro-driver circuitry can be configured in a direct current (DC) photoconduction mode to detect the presence of a stylus by detecting unmodulated light transmitted by a stylus. In other implementations, the array of micro-LEDs and micro-driver circuitry can be configured in an alternating current (AC) photoconduction mode to detect the presence of multiple styluses by detecting modulated light transmitted by the multiple styluses. In still other implementations, the array of micro-LEDs and micro-driver circuitry can be configured in an optical reflective touch mode to detect the presence of an object such as a finger or stylus by detecting modulated light generated by some of the micro-LEDs and reflected off the object.

The detection modes described above rely on light passing through the detection surface of a cover material located above the integrated touch screen to LEDs, OLEDs or micro-LEDs located below. However, light impinging on the boundary between the detection surface and a medium above the detection surface (e.g., air, water, stylus, or finger), from either above or below the detection surface, can reflect off the boundary or be refracted as it passes through the boundary. In some instances, this reflected or refracted light can be detected and incorrectly identified as an object such as a finger or a stylus. Accordingly, in some embodiments of the disclosure, light illuminator angular filters can be employed above those micro-LEDs configured as illuminators within the integrated touch screen to limit the illumination angle of those illuminators, and/or light detector angular filters can be employed above those micro-LEDs configured as detectors within the integrated touch screen to limit the detection angle of those detectors. These angular filters effectively block or filter light transmitted, reflected or refracted within the cover material to reduce or eliminate the false detection of water droplets on the touch surface.

After the angularly filtered light is detected by the optical sensing system, the resultant illumination pattern (e.g., the target location of a hovering stylus) can be processed to determine the hover distance and tilt angle of the object, and compute various parameters (e.g., the centroid of the illumination pattern representing the target location) and other operations (e.g., stylus tracking) with greater precision.

In some embodiments, the optical stylus is a passive stylus including either a diffusive reflector or retroreflector facets to reflect light emitted from the optical sensing system with a consistent angular reflection profile. Different tilt angles can generate different reflected energy profiles, and these different reflected energy profiles can be evaluated to determine the location, hover distance (if any) and tilt angle of the stylus. In embodiments, a passive stylus including a diffractive (patterned) reflector can also reflect light emitted from the optical sensing system with a consistent reflected light pattern regardless of an angle of stylus tilt angle with respect to the surface. Different tilt angles and rotations of the stylus can generate different reflected light patterns, and these different reflected light patterns can be evaluated to determine the location, hover distance (if any), tilt angle, orientation and rotation of the stylus. In some embodiments, a semi-active stylus including an amplitude sensor in its tip and optionally in radial locations along the sides of the stylus can detect the amplitudes of different frequencies of modulated light emitted from the optical sensing system, and detect the location and hover distance (if any) of the stylus, and in some instances also detect the tilt angle and rotation of the stylus. In some examples of the disclosure, an active stylus including both light emitters and detectors can generate light and receive reflected light when it is reflected off a proximate optical sensing system with a retroreflector layer formed between an array of display elements. Different locations of the stylus on or above the display surface can produce different spectral distributions of reflected light that can be analyzed to determine the location of the stylus.

Figure 1B:
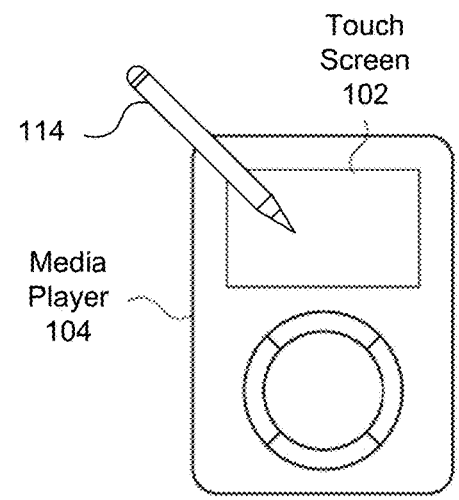
Figure 1C:
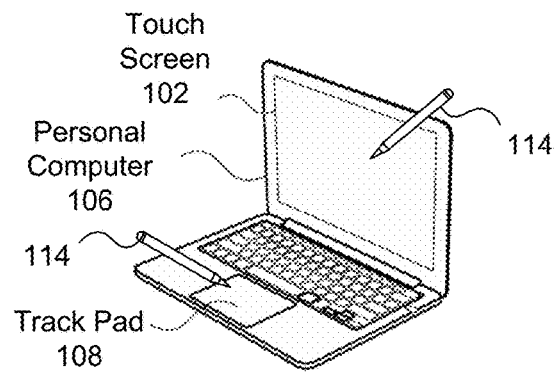
Figure 1D:
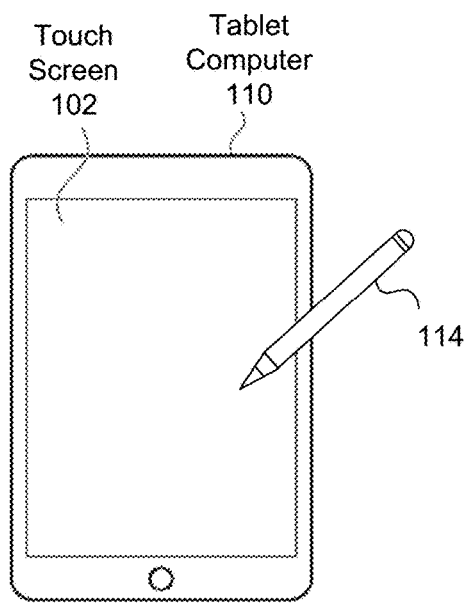
Figure 1E:
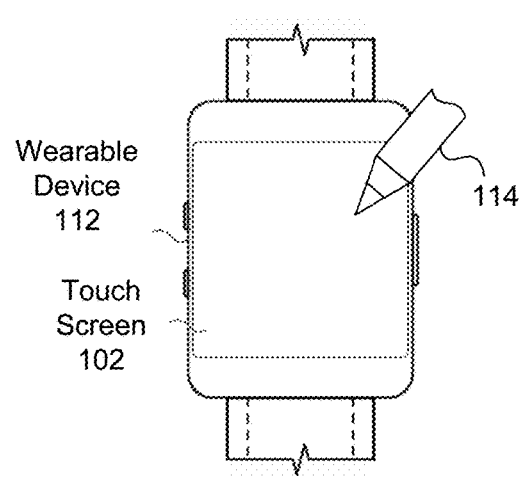

FIGS. 1A-1E illustrate optical stylus systems including an optical stylus and an electronic device that includes an optical sensing system in which one or more of the target or touch location, centroid, hover distance, tilt angle, azimuth, and in some instances the orientation and rotation of an optical stylus touching or in proximity to a surface can be determined according to examples of the disclosure. FIG. 1A illustrates mobile telephone 100 that includes an optical sensing system having integrated touch screen 102 that is operative with optical stylus 114 to determine one or more of the target or touch location, centroid, hover distance, tilt angle, azimuth, and in some instances the orientation and rotation of the optical stylus according to examples of the disclosure. FIG. 1B illustrates digital media player 104 that includes an optical sensing system having integrated touch screen 102 that is operative with optical stylus 114 to determine one or more of the target or touch location, centroid, hover distance, tilt angle, azimuth, and in some instances the orientation and rotation of the optical stylus according to examples of the disclosure. FIG. 1C illustrates personal computer 106 that includes an optical sensing system having trackpad 108 and integrated touch screen 102 that are operative with optical stylus 114 to determine one or more of the target or touch location, centroid, hover distance, tilt angle, azimuth, and in some instances the orientation and rotation of the optical stylus according to examples of the disclosure. FIG. 1D illustrates tablet computer 110 that includes an optical sensing system having integrated touch screen 102 that is operative with optical stylus 114 to determine one or more of the target or touch location, centroid, hover distance, tilt angle, azimuth, and in some instances the orientation and rotation of the optical stylus according to examples of the disclosure. FIG. 1E illustrates wearable device 112 (e.g., a watch) that includes an optical sensing system having integrated touch screen 102 that is operative with optical stylus 114 to determine one or more of the target or touch location, centroid, hover distance, tilt angle, azimuth, and in some instances the orientation and rotation of the optical stylus according to examples of the disclosure. It is understood that the above integrated touch screens can be implemented in other devices as well. Additionally it should be understood that although the disclosure herein primarily focuses on integrated touch screens, some of the disclosure is also applicable to touch sensor panels without a corresponding display.

Figure 2A:
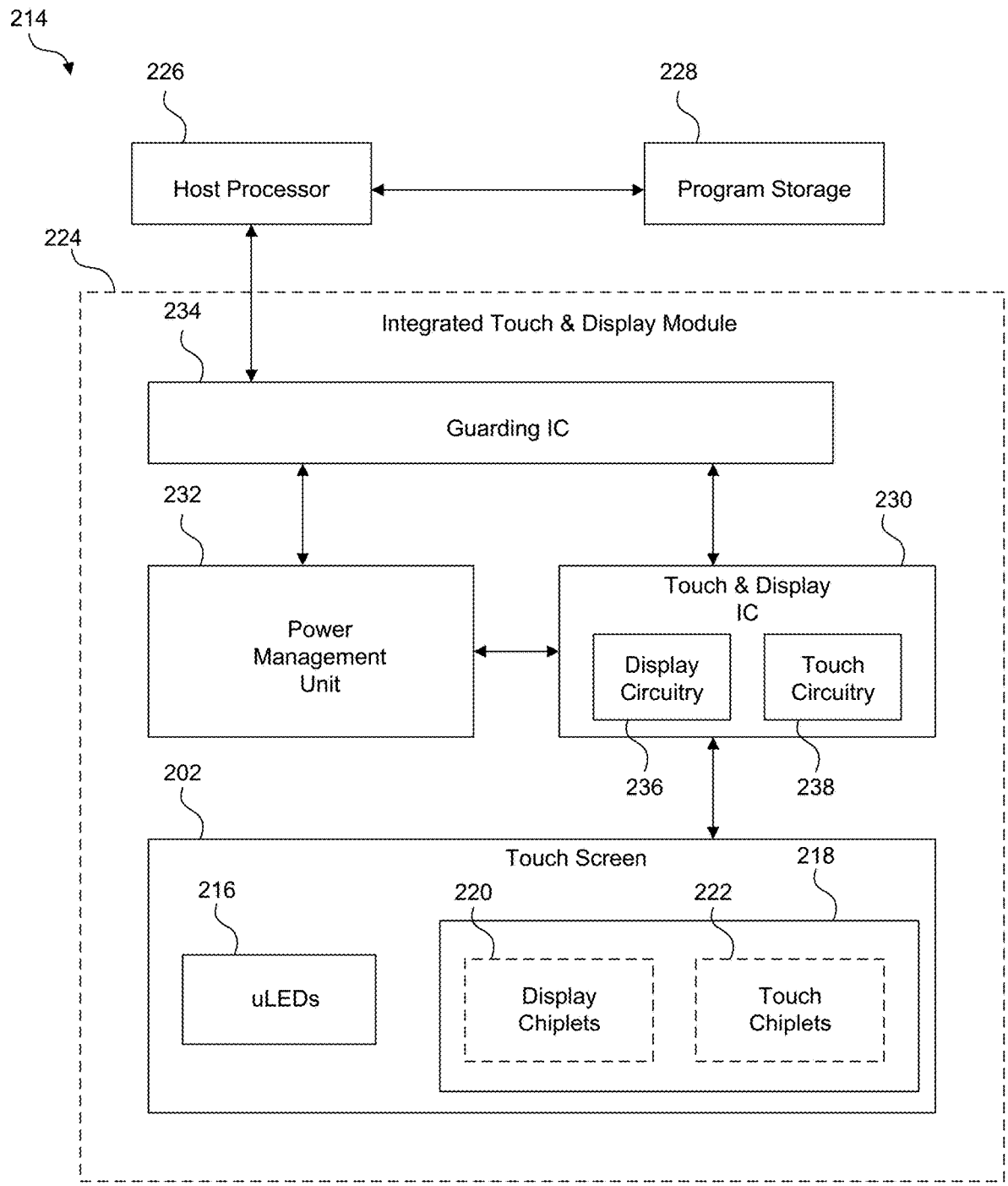
FIG. 2A is a block diagram of a computing system that illustrates one implementation of an integrated touch screen where one or more of the target or touch location, centroid, hover distance, tilt angle, azimuth, and in some instances the orientation and rotation of an optical stylus touching or in proximity to a surface can be determined according to examples of the disclosure.

FIG. 2A is a block diagram of computing system 214 that illustrates one implementation of integrated touch screen 202 where one or more of the target or touch location, centroid, hover distance, tilt angle, azimuth, and in some instances the orientation and rotation of an optical stylus touching or in proximity to a surface can be determined according to examples of the disclosure. As described in more detail herein, integrated touch screen 202 can include light emitting diodes (LEDs) or organic light emitting diodes (OLEDs) represented by micro-LEDs 216 and chiplets 218 (e.g., integrated chiplets including LED/OLED drivers, touch sensing circuitry and/or optical sensing circuitry). In some examples, the functionality of chiplets can be divided into separate display chiplets 220 (e.g., including LED/OLED drivers) and touch chiplets 222 (e.g., including touch sensing circuitry and/or optical sensing circuitry). Computing system 214 can be included in, for example, mobile telephone 100, digital media player 104, personal computer 106, tablet computer 110, or wearable device 112 as shown in FIGS. 1A-1E, or any mobile or non-mobile computing device that includes a touch screen. Computing system 214 can include an optical sensing system such as integrated touch and display module 224, host processor 226 (which can include one or more processors) and program storage 228. Integrated touch and display module 224 can include integrated touch screen 202 and integrated circuits for operation of integrated touch screen 202. In some examples, integrated touch and display module 224 can be formed on a single substrate with micro-LEDs 216 and chiplets 218 (or display chiplets 220 and/or touch chiplets 222) of integrated touch screen 202 on one side of the touch screen and integrated circuits controlling operation of micro-LEDs 216 and chiplets 218 mounted on an opposite side of the single substrate. Forming integrated touch and display module 224 in this way can provide for simplified manufacturing and assembly of devices with a touch screen. In some examples, the integrated touch and display module 224 can be formed on a single substrate with micro-LEDs 216 on one side of the substrate and chiplets 218 (or display chiplets 220 and/or touch chiplets 222) of integrated touch screen 202 and integrated circuits controlling operation of micro-LEDs 216 and chiplets 218 mounted on an opposite side of the single substrate.

Integrated circuits for operation of integrated touch screen 202 can include an integrated touch and display integrated circuit (IC) (touch and display controller) 230, a power management unit (PMU) 232, and optionally a guard integrated circuit (guard IC) 234. (Self-capacitance touch sensing performance can be improved (and parasitic capacitance effects reduced) by performing touch sensing operations in a different power domain than in the chassis power domain.) In some examples, guard IC 234 can be used to operate integrated touch and display module 224 in a guard power domain during guarded touch operation and operate touch and display module 224 in the chassis power domain otherwise (e.g., during non-guarded touch operations or during display operations). Power management unit 232 can be an integrated circuit configured to provide the voltages necessary for the touch and display controller 230, including guard-referenced power supplies when operating in a guarded power domain. The touch and display controller 230 can include circuitry to perform touch sensing, optical sensing and display operations. Although illustrated in FIG. 2A as a single integrated circuit, the various components and/or functionality of the touch and display controller 230 can be implemented with multiple circuits, elements, chips, and/or discrete components (e.g., a separate touch integrated circuit and a separate display integrated circuit with an integrated circuit to handle the handoff between the two).

The touch and display controller 230 can include display circuitry 236 to perform display operations. Display circuitry 236 can include hardware to process one or more still images and/or one or more video sequences for display on integrated touch screen 202. The display circuitry 236 can be configured to generate read memory operations to read the data representing the frame/video sequence from a memory (not shown) through a memory controller (not shown), for example, or can receive the data representing the frame/video sequence from host processor 226. The display circuitry 236 can be configured to perform various processing on the image data (e.g., still images, video sequences, etc.). In some examples, the display circuitry 236 can be configured to scale still images and to dither, scale and/or perform color space conversion on the frames of a video sequence. Display circuitry 236 can be configured to blend the still image frames and the video sequence frames to produce output frames for display. The display circuitry 236 can also be more generally referred to as a display controller, display pipe, display control unit, or display pipeline. The display control unit can be generally any hardware and/or firmware configured to prepare a frame for display from one or more sources (e.g., still images and/or video sequences). More particularly, the display circuitry 236 can be configured to retrieve source frames from one or more source buffers stored in memory, composite frames from the source buffers, and display the resulting frames on integrated touch screen 202. Accordingly, the display circuitry 236 can be configured to read one or more source buffers and composite the image data to generate the output frame. Display circuitry 236 can provide various control and data signals to the display via chiplets 218 (or via display chiplets 220), including timing signals (e.g., one or more clock signals) and pixel selection signals. The timing signals can include a pixel clock that can indicate transmission of a pixel. The data signals can include color signals (e.g., red, green, blue) for micro-LEDs 216. The display circuitry can control integrated touch screen 202 in real-time, providing the data indicating the pixels to be displayed as the touch screen is displaying the image indicated by the frame. The interface to such an integrated touch screen 202 can be, for example, a video graphics array (VGA) interface, a high definition multimedia interface (HDMI), a mobile industry processor interface (MIPI), a digital video interface (DVI), a LCD/LED/OLED interface, a plasma interface, or any other suitable interface.

The touch and display controller 230 can include touch circuitry 238 to perform touch operations. Touch circuitry 238 can include one or more touch processors, peripherals (e.g., random access memory (RAM) or other types of memory or storage, watchdog timers and the like), and a touch controller. The touch controller can include, but is not limited to, channel scan logic (e.g., implemented in programmable logic circuits or as hard coded logic circuits) which can provide configuration and control for touch sensing operations by chiplets 218 (or by touch chiplets 222). For example, touch chiplets 222 can be configured to drive, sense and/or ground touch node electrodes depending on the mode of touch sensing operations. Additionally or alternatively, the chiplets 218 (or touch chiplets 222) can be configured for optical sensing (e.g., using touch circuitry 238 of touch and display controller 230 or using separate circuitry and a separate controller for optical sensing operations). The mode of touch sensing and/or optical sensing operations can, in some examples, be determined by a scan plan stored in memory (e.g., RAM) in touch circuitry 238. The scan plan can provide a sequence of scan events to perform during a frame. The scan plan can also include information necessary for providing control signals to and programming chiplets 218 for the specific scan event to be performed, and for analyzing data from chiplets 218 according to the specific scan event to be performed. The scan events can include, but are not limited to, a mutual capacitance scan, a self-capacitance scan, a stylus scan, touch spectral analysis scan, a stylus spectral analysis scan, and an optical sensing scan. The channel scan logic or other circuitry in touch circuitry 238 can provide the stimulation signals at various frequencies and phases that can be selectively applied to the touch node electrodes of integrated touch screen 202 or used for demodulation, as described in more detail below. The touch circuitry 238 can also receive touch data from the chiplets 218 (or touch chiplets 222), store touch data in memory (e.g., RAM), and/or process touch data (e.g., by one or more touch processors or touch controller) to determine locations of touch and/or clean operating frequencies for touch sensing operations (e.g., spectral analysis). The touch circuitry 238 (or separate optical sensing circuitry) can also receive ambient light data from the chiplets 218 (or touch chiplets 222), store ambient light data in memory (e.g., RAM), and/or process ambient light data (e.g., by one or more touch processors or touch controller or an optical sensing processor/controller) to determine ambient light conditions.

Integrated touch screen 202 can be used to derive touch data at multiple discrete locations of the touch screen, referred to herein as touch nodes. For example, integrated touch screen 202 can include touch sensing circuitry that can include a capacitive sensing medium having a plurality of electrically isolated touch node electrodes. Touch node electrodes can be coupled to chiplets 218 (or touch chiplets 222) for touch sensing by sensing channel circuitry. As used herein, an electrical component "coupled to" or "connected to" another electrical component encompasses a direct or indirect connection providing electrical path for communication or operation between the coupled components. Thus, for example, touch node electrodes of integrated touch screen 202 may be directly connected to chiplets 218 or indirectly connected to chiplets 218 (e.g., connected to touch chiplets 222 via display chiplets 220), but in either case provided an electrical path for driving and/or sensing the touch node electrodes. Labeling the conductive plates (or groups of conductive plates) used to detect touch as touch node electrodes corresponding to touch nodes (discrete locations of the touch screen) can be particularly useful when integrated touch screen 202 is viewed as capturing an "image" of touch (or "touch image"). The touch image can be a two-dimensional representation of values indicating an amount of touch detected at each touch node electrode corresponding to a touch node in integrated touch screen 202. The pattern of touch nodes at which a touch occurred can be thought of as a touch image (e.g., a pattern of fingers touching the touch screen). In such examples, each touch node electrode in a pixelated touch screen can be sensed for the corresponding touch node represented in the touch image.

Host processor 226 can be connected to program storage 228 to execute instructions stored in program storage 228 (e.g., a non-transitory computer-readable storage medium). Host processor 226 can provide, for example, control and data signals so that touch and display controller 230 can generate a display image on integrated touch screen 202, such as a display image of a user interface (UI). Host processor 226 can also receive outputs from touch and display controller 230 (e.g., touch inputs from the one or more touch processors, ambient light information, etc.) and performing actions based on the outputs. The touch input can be used by computer programs stored in program storage 228 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 226 can also perform additional functions that may not be related to touch processing, optical sensing, and display.

Note that one or more of the functions described herein, including the configuration and operation of chiplets, can be performed by firmware stored in memory (e.g., one of the peripherals in touch and display controller 230) and executed by one or more processors (in touch and display controller 230), or stored in program storage 228 and executed by host processor 226. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system 214 is not limited to the components and configuration of FIG. 2A, but can include other or additional components in multiple configurations according to various examples. Additionally, the components of computing system 214 can be included within a single device, or can be distributed between multiple devices. In some examples, PMU 232 and guard IC 234 can be integrated into a power management and guard integrated circuit. In some examples, the power management and guard integrated circuit can provide power supplies (e.g., guard referenced) and the guard signal to touch screen 202 directly rather than via touch and display IC 230. In some examples, touch and display IC 230 can be coupled to host processor 226 directly, and a portion of touch and display IC 230 in communication with chiplets 218 can be included in an isolation well (e.g., a deep N-well isolation) referenced to the guard signal from guard IC 234. In some examples, computing system 214 can include an energy storage device (e.g., a battery). In some examples, computing system 214 can include wired or wireless communication circuitry (e.g., Bluetooth, WiFi, etc.).

Integrated touch screen 202 can be fabricated such that touch sensing circuit elements of the touch sensing system can be integrated with the display stack-up and some circuit elements can be shared between touch and display operations. It is noted that circuit elements are not limited to whole circuit components, such as a whole capacitor, a whole transistor, etc., but can include portions of circuitry, such as a conductive plate.

Figure 2B:
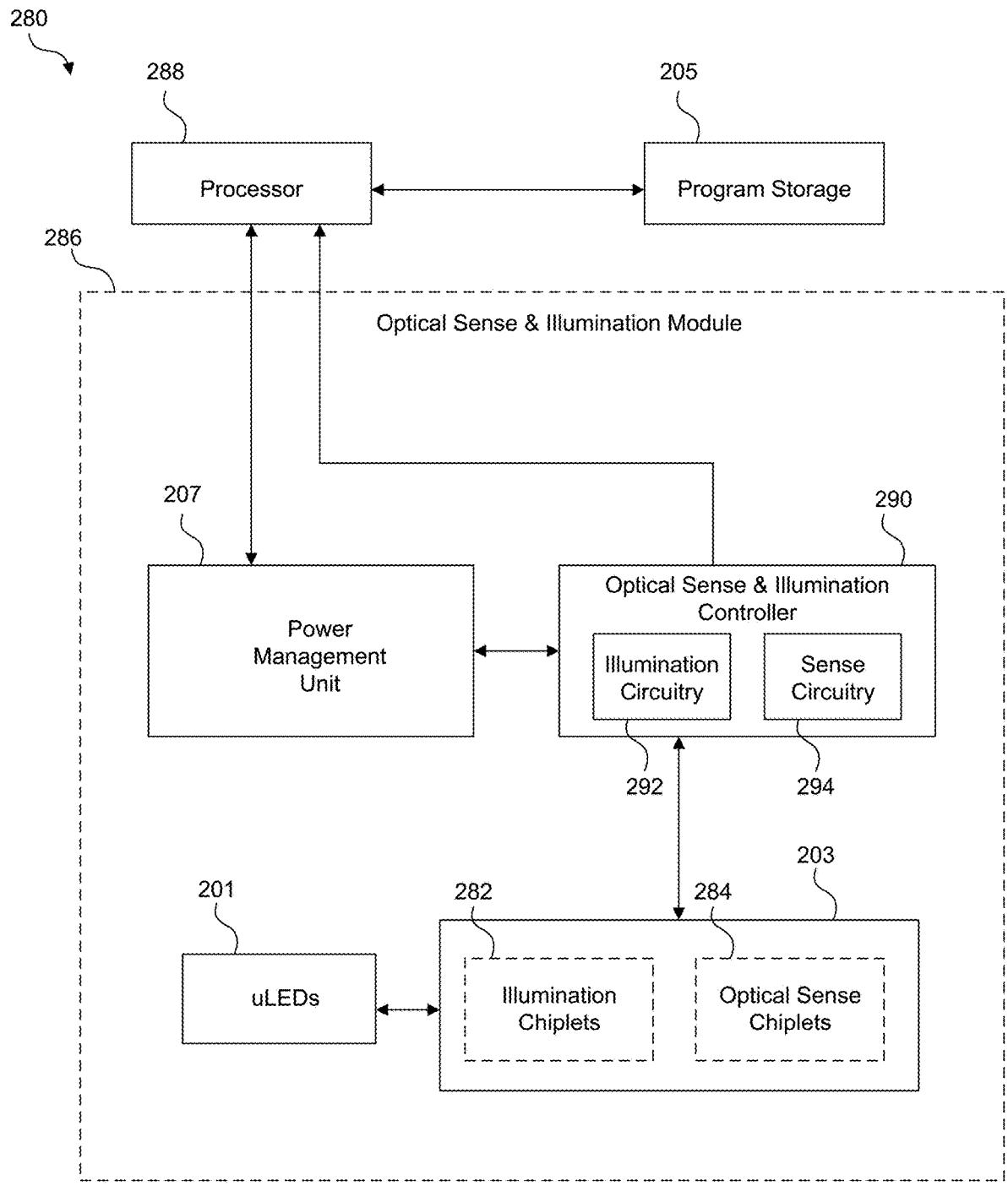
FIG. 2B is a block diagram of one implementation of a semi-active or active optical stylus that forms part of an optical stylus system for detecting one or more of the target or touch location, centroid, hover distance, tilt angle, azimuth, and in some instances the orientation and rotation of an optical stylus touching or in proximity to a surface according to examples of the disclosure.

FIG. 2B is a block diagram of one implementation of a semi-active or active optical stylus that forms part of an optical stylus system for detecting one or more of the target or touch location, centroid, hover distance, tilt angle, azimuth, and in some instances the orientation and rotation of an optical stylus touching or in proximity to a surface according to examples of the disclosure. As described in more detail herein, the example semi-active or active optical stylus 280 of FIG. 2B can include light emitting diodes (LEDs) or organic light emitting diodes (OLEDs) represented by micro-LEDs 201 and chiplets 203 (e.g., integrated chiplets including LED/OLED drivers, and optical sensing circuitry). In some examples, the functionality of chiplets can be divided into separate illumination chiplets 282 (e.g., including LED/OLED drivers) and optical sense chiplets 284 (e.g., including optical sensing circuitry). Semi-active or active optical stylus 280 can be included in any semi-active or active stylus that includes light emitting and/or light detecting devices. Semi-active or active optical stylus 280 can include integrated optical sense and illumination module 286, processor 288 (which can include one or more processors) and program storage 205.

Integrated optical sense and illumination module 286 can include an integrated optical sense and illumination controller 290 and a power management unit (PMU) 207. Power management unit 207 can be an integrated circuit configured to provide the voltages necessary for the optical sense and illumination controller 290. The optical sense and illumination controller 290 can include circuitry to perform optical sensing and illumination (light detection and light emitting) operations. Although illustrated in FIG. 2B as a single integrated circuit, the various components and/or functionality of the optical sense and illumination controller 290 can be implemented with multiple circuits, elements, chips, and/or discrete components (e.g., a separate optical sense integrated circuit and a separate illumination integrated circuit with an integrated circuit to handle the handoff between the two).

The optical sense and illumination controller 290 can include illumination circuitry 292 to perform light emitting operations. Illumination circuitry 292 can provide various control and data signals to light emitting devices (e.g., uLEDs 201) via chiplets 203 (or via illumination chiplets 282), including timing signals (e.g., one or more clock signals).

The optical sense and illumination controller 290 can include sense circuitry 294 to perform optical sensing (light detection) operations. Sense circuitry 294 can include one or more processors, peripherals (e.g., random access memory (RAM) or other types of memory or storage, watchdog timers and the like), and a optical sensing controller. The optical sensing controller can include, but is not limited to, logic (e.g., implemented in programmable logic circuits or as hard coded logic circuits) which can provide configuration and control for light detection operations by chiplets 203 (or by optical sense chiplets 284). The sense circuitry 294 can also receive light detection data from the chiplets 203 (or optical sense chiplets 284), store light detection data in memory (e.g., RAM), and/or process light detection data (e.g., by one or more processors or controllers) to determine one or more of the frequency, wavelength and amplitude of detected light at various times. The sense circuitry 294 (or separate optical sensing circuitry) can also receive ambient light data from the chiplets 203 (or optical sense chiplets 284), store ambient light data in memory (e.g., RAM), and/or process ambient light data (e.g., by one or more processors or controllers or an optical sensing processor/controller) to determine ambient light conditions.

Processor 288 can be connected to program storage 205 to execute instructions stored in the program storage (e.g., a non-transitory computer-readable storage medium). Processor 288 can provide, for example, control and data signals so that optical sense and illumination controller 290 can cause the stylus to emit or detect light. Processor 226 can also perform additional functions that may not be related to optical illumination or detection.

Note that one or more of the stylus functions described herein, including the configuration and operation of chiplets, can be performed by firmware stored in memory (e.g., one of the peripherals in optical sense and illumination controller 290) and executed by one or more processors (in optical sense and illumination controller 290), or stored in program storage 228 and executed by processor 288. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that semi-active or active optical stylus 280 is not limited to the components and configuration of FIG. 2B, but can include other or additional components in multiple configurations according to various examples, or fewer components in multiple configurations in other examples. In some examples, semi-active or active optical stylus 280 can include an energy storage device (e.g., a battery). In some examples, semi-active or active optical stylus 280 can include wired or wireless communication circuitry (e.g., Bluetooth, WiFi, etc.).

Figure 3A:
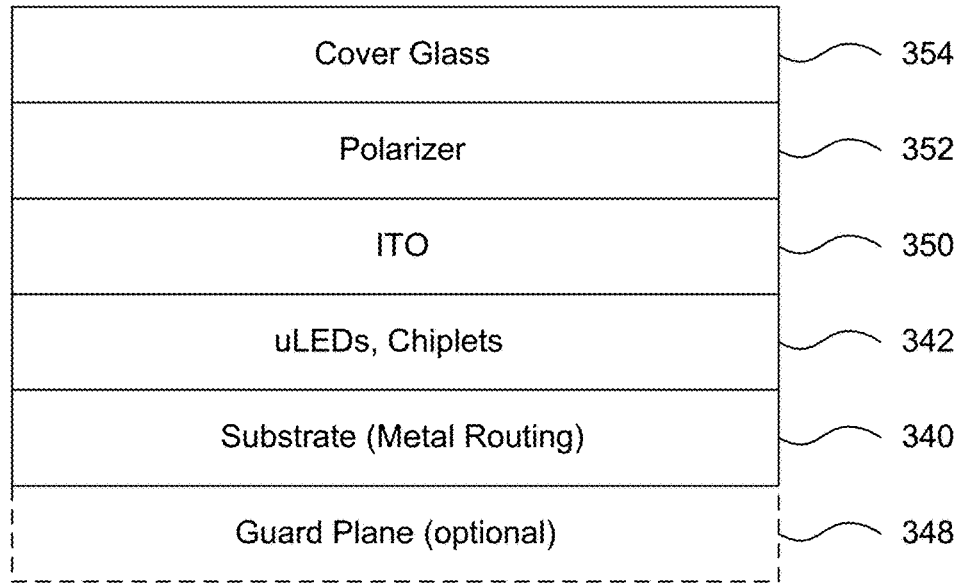
FIGS. 3A-3B illustrate stack-ups of an integrated touch screen where one or more of the target or touch location, centroid, hover distance, tilt angle, azimuth, and in some instances the orientation and rotation of an optical stylus touching or in proximity to a surface can be determined according to examples of the disclosure.
Figure 3B:
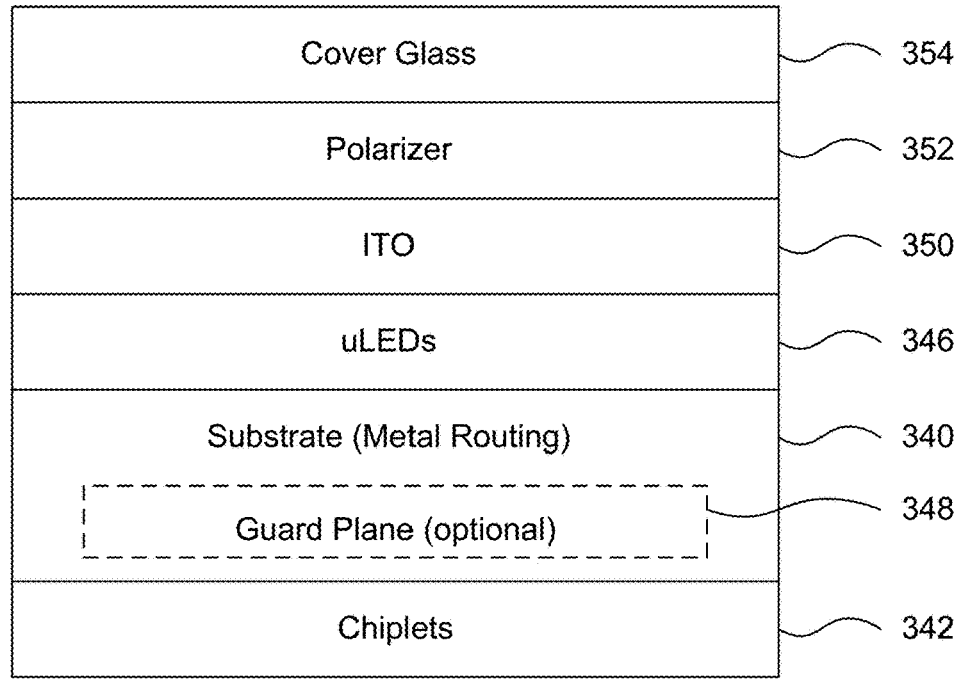

FIGS. 3A-3B illustrate stack-ups of an integrated touch screen where one or more of the target or touch location, centroid, hover distance, tilt angle, azimuth, and in some instances the orientation and rotation of an optical stylus touching or in proximity to a surface can be determined according to examples of the disclosure. FIG. 3A illustrates an example stack-up of a touch screen including chiplets (or touch chiplets and display chiplets) in the visible area of the display. Integrated touch screen 302A comprises a substrate 340 (e.g., a printed circuit board) upon which chiplets (or touch chiplets and/or display chiplets) and micro-LEDs can be mounted in a touch and display circuit layer 342. In some examples, the chiplets and/or micro-LEDs can be partially or fully embedded in the substrate (e.g., the components can be placed in depressions in the substrate). In some examples, the chiplets can be mounted on one and/or both sides of substrate 340. For example, some or all of the chiplets can be mounted on a second side of substrate 340 (or some or all of the touch chiplets and/or some or all of the display chiplets can be mounted on a second side of substrate 340). In some examples, the chiplets can be disposed on the second side of the substrate (opposite the first side of the substrate including micro-LEDs). FIG. 3B illustrates an example stack-up of a touch screen 302B including chiplets (or touch chiplets and/or display chiplets) outside the visible area of the display. Unlike the stack-up of integrated touch screen 302A, in which chiplets and micro-LEDs can be mounted in touch and display circuit layer 342, stack-up of integrated touch screen 302B can include chiplets mounted in a touch and display circuit layer 342 on a second (bottom) side of substrate 340 different than the micro-LEDs mounted on in a display pixel layer 346 on a first (top, visible) side of substrate 340. In some examples, placing the chiplets on the second side of the substrate can allow for uniform spacing of the micro-LEDs and/or increased density of micro-LEDs on the first side of substrate 340.

The substrate 340 can include routing traces in one or more layers to route signals between micro-LEDs, chiplets and a touch and display controller. Substrate 340 can also optionally include a guard plane 348 for guarded operation (e.g., corresponding to guard plane 348 in FIG. 3A). Although illustrated on the bottom of substrate 340 in FIG. 3A, guard plane 348 can be formed as a layer of substrate 340 other than the bottom layer (e.g., as illustrated in FIG. 3B in an internal layer of substrate 340).

After mounting micro-LEDs and chiplets in the touch and display circuit layer 342 in FIG. 3A (e.g., during a pick-and-place assembly), a planarization layer (e.g., transparent epoxy) can be deposited over the micro-LEDs and chiplets. The planarization layer can be deposited over the micro-LEDs in the display pixel layer 346 in the stack-up of FIG. 3B. A fully or partially transparent conductor layer 350 (e.g., ITO) can be deposited above planarized touch and display circuit layer 342 in FIG. 3A or above the display pixel layer 346 in FIG. 3B. Conductor layer 350 can include a pattern of individual conductor plates that can be used for touch and display functions of integrated touch screens 302A or 302B. For example, individual conductor plates can be used as cathode terminals for micro-LEDs during display operations (and/or optical sensing operations) and groups of conductor plates can form touch node electrodes for touch operations. Polarizer 352 can be disposed above the transparent conductor layer 350 (optionally with another planarization layer disposed over the transparent conductor layer 350). Cover material or glass (or front crystal) 354 can be disposed over polarizer 352 and form the outer surface of integrated touch screen 302. The stack-up of integrated touch screens 302A and/or 302B can provide numerous benefits including reduced costs (e.g., due to simplified assembly of devices including the integrated touch and display module and a reduced number of integrated circuits by combining touch and display functionality into integrated touch and display controller), reduced stack-up height (sharing conductors eliminates a separate touch node electrode layer; integrating chiplets (or touch chiplets and display chiplets) into the stack-up on the same layer with the micro-LEDs does not add to the stack-up height for FIG. 3A), simplified support for guarded self-capacitance scans (by including touch circuitry on the integrated touch and display module with a guard plane extending throughout the substrate of the integrated touch and display module), and shrinking the border region around the touch screen (because routing can be done through the substrate rather than in the border regions).

Figure 4A:
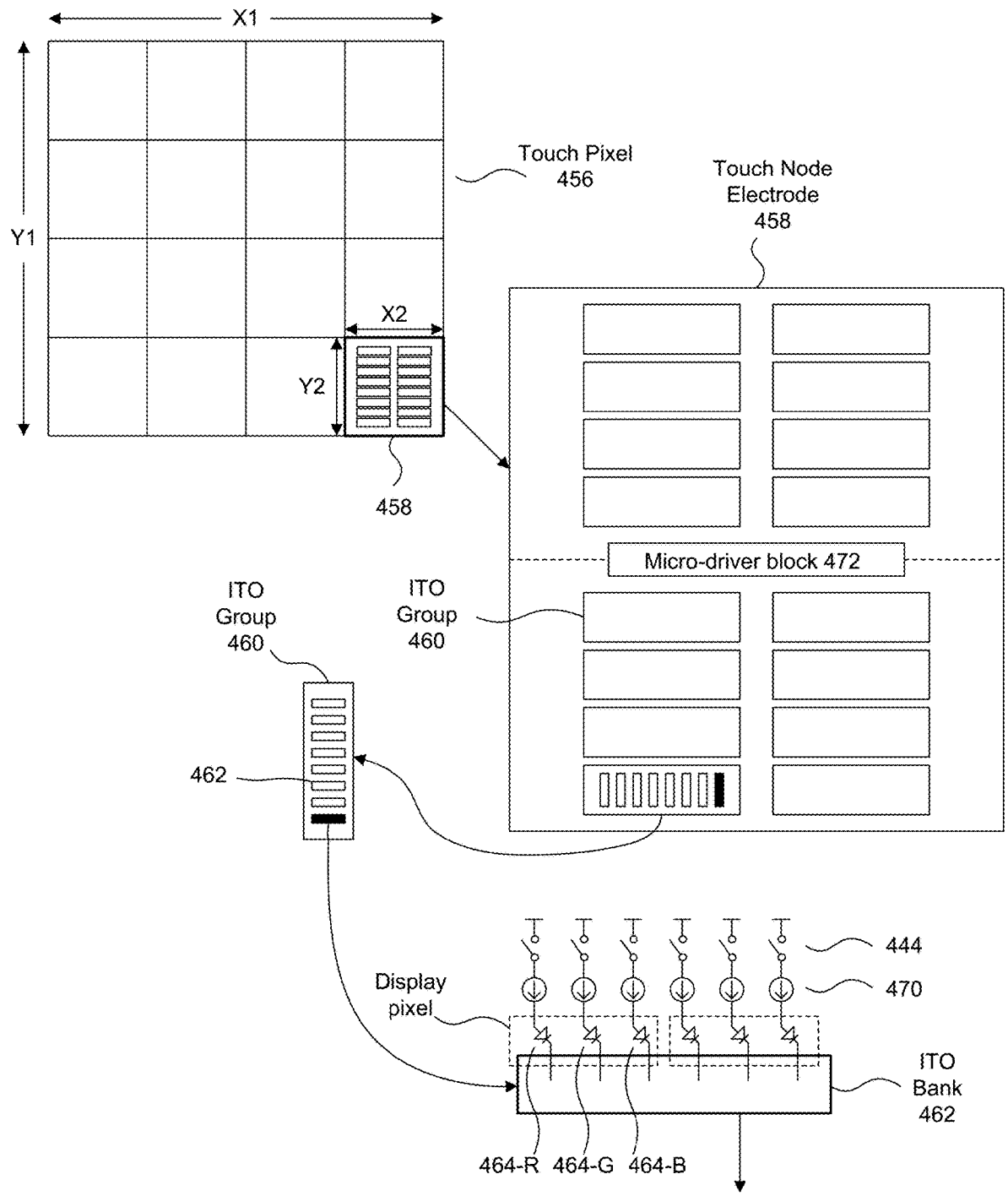
FIG. 4A illustrates a portion of a conductive layer and corresponding circuitry of a portion of an example touch and display circuit layer in an optical sensing system where one or more of the target or touch location, centroid, hover distance, tilt angle, azimuth, and in some instances the orientation and rotation of an optical stylus touching or in proximity to a surface can be determined according to examples of the disclosure.

FIG. 4A illustrates a portion of a conductive layer and corresponding circuitry of a portion of an example touch and display circuit layer in an optical sensing system where one or more of the target or touch location, centroid, hover distance, tilt angle, azimuth, and in some instances the orientation and rotation of an optical stylus touching or in proximity to a surface can be determined according to examples of the disclosure. An integrated touch screen can include a conductive layer (e.g., corresponding to conductive layer 350 in FIG. 3A or 3B), a portion of which is shown in FIG. 4A as touch pixel 456. Touch pixel 456 can define a region having an area X1 by Y1 (e.g., 5 mm×5 mm) including 16 touch node electrodes 458, although in other examples, different numbers of touch node electrodes can be employed. Each touch node electrode 458 can be formed from 16 ITO groups 460 (e.g., eight rows, two columns in the orientation of FIG. 4) and can define an area X2 by Y2 (e.g., 1.25 mm×1.25 mm) smaller than X1 by Y1, although in other examples, different numbers of ITO groups, and different numbers of rows and columns can also be employed. In some examples, as described herein, touch can be measured using touch chiplets for some or all of the smaller regions (e.g., touch node electrodes 458 having an area X2 by Y2). In some examples, as described herein, the touch image used for determining touch input from the user to the integrated touch screen can combine these touch measurements for some or all of the smaller regions into a touch image with a lower resolution corresponding to the larger regions (e.g., touch pixels having an area X1 by Y1).

FIG. 4A also illustrates an expanded view of touch node electrode 458 showing component ITO banks 462 of ITO groups 460 and touch and display circuitry (e.g., corresponding to components of touch and display circuit layer 342), according to some examples. The touch and display circuitry can include micro-LEDs 464 (with example micro-LED sub-pixels 464-R, 464-G and 464-B shown in FIG. 4A), display chiplets, and touch chiplets (not shown), although in other examples, LEDs other than micro-LEDs can also be employed, and chiplets need not be utilized. In yet another embodiment, display and touch functions may be integrated into a single chiplet. Touch node electrode 458 of FIG. 4A includes 128 ITO banks 462 (i.e., eight ITO banks 462 per ITO group 460), although in other examples, different numbers of ITO banks can also be used). In some examples, each ITO bank can be formed over a bank of micro-LEDs and can serve as the cathode terminal for the bank of micro-LEDs during display operations, and can be coupled to one or more display chiplets to update the micro-LEDs in the corresponding ITO group. As illustrated in FIG. 4A, each ITO bank 462 can serve as a cathode for two display pixels (e.g., each including red, green and blue sub-pixels). In some examples, each ITO bank 462 can serve as the cathode for more or fewer display pixels.

During a touch operation, in some examples ITO banks 462 can be coupled together to form touch node electrode 458, and touch node electrode 458 can be coupled to one or more touch chiplets (not shown) for touch sensing operations.

The one or more display chiplets can include display micro-drivers 470 and switches 444 as shown in FIG. 4A. Display micro-drivers 470 can be coupled to one or more red, green, and blue LED/OLED devices 464-R, 464-G, and 464-B such as micro-LEDs that emit red, green and blue light, respectively. The RGB arrangement is exemplary and other examples may include alternative sub-pixel arrangements (e.g., red-green-blue-yellow (RGBY), red-green-blue-yellow-cyan (RGBYC), or red-green-blue-white (RGBW), or other sub-pixel matrix schemes where the pixels may have a different number of sub-pixels). As illustrated in the example of FIG. 4A, micro-drivers 470 within a display chiplet within ITO group 460 can be coupled to an eight row, two column array of pixels. Each row of the array can correspond to ITO bank 462. ITO bank 462 can serve as a cathode node when selected by switching circuitry, for example. The cathode nodes can be connected to a voltage, Vneg, during display operations. Although not shown in FIG. 4A, a redundant set of micro-LEDs, display micro-drivers 470 and switches 444 can be associated with ITO bank 462. Micro-driver block 472 can include some or all of micro-drivers 470, switches 444, and other circuitry such as amplifiers, analog-to-digital converters, filters, demodulators, results registers, and the like.

Display micro-drivers 470 can include current drivers coupled to the anodes of sub-pixel elements in the two columns of pixels. For example, the anode of each blue sub-pixel in the first column of pixels can be coupled together and to one of the current drivers, and the anode of each blue sub-pixel in the second column of pixels can be coupled together and to a different one of the current drivers. Likewise, the anode of each green sub-pixel or red sub-pixel in the first and second columns of pixels can be respectively coupled together and to respective current sources. Thus, during display operations, selecting one of the ITO banks 462 using one or more switches and adjusting and providing the operating current of respective current drivers in display micro-drivers can address the illumination adjustment for each pixel in ITO group 460. In some examples, refresh and/or timing signals can be provided by the touch and display controller to address each LED device individually, to enable asynchronous or adaptively synchronous display updates. In some examples, display brightness can be adjusted by manipulation of reference voltages (not shown) supplied to the display micro-drivers.

As described above, during display operations, one or more switches can select a respective bank (e.g., a multiplexer or corresponding group of discrete switches can be used to select one of the ITO banks) to couple to the cathode node, which is in turn coupled to Vneg by other switches. During touch operations by an integrated touch screen, one or more switches can instead couple together each of the ITO banks 462 in ITO group 460, and couple ITO group 460 to a touch chiplet. Additionally, one or more switches can be configured so that the anode and cathode of the LED devices can be shorted to avoid any noise from the LEDs (e.g., leakage current or photocurrents) interfering with touch sensing. Additionally, multiple ITO groups corresponding to multiple display chiplets can be coupled together to form touch node electrodes, and be coupled to one or more touch chiplets.

As mentioned above, ITO banks 462 can be coupled together to form touch node electrodes for touch sensing operations. In some examples, ITO banks 462 coupled to a chiplet can be coupled together using switching circuitry within the chiplet to form a touch electrode. In some examples, groups of ITO banks can be coupled together using the display chiplets to form touch node electrodes for touch sensing operations. Each of the touch node electrodes formed from the groups of ITO banks can be coupled during touch operations to one of the touch chiplets.

In some examples, the number of ITO banks 462 in a touch node electrode can be selected according to the desired sensing resolution. In some examples, the number of ITO banks 462 in a touch node may be limited by space available for chiplets, which can be a function of the density of LEDs/display pixels.

As noted above, in some examples, ITO groups 460 can be coupled to both display chiplets and touch chiplets. The touch chiplets can include sensing circuitry (also referred to herein as a sense channel or sensing channel circuitry), switching circuitry, and control circuitry. The sensing circuitry can be configured to be coupled to ITO groups 460 for sensing operations. The switching circuitry can include switches (e.g., multiplexers, discrete switches, etc.) to enable display and sensing configurations described herein. For example, the switches can include ITO switches (cathode switches), anode switches, and stimulation voltage switches for coupling touch node electrodes to positive or negative phase stimulation signals for touch sensing operations. The control circuitry can include interface and register circuitry providing input and output functionality to enable communications between the touch chiplet and a controller and/or host processor and for storing configuration information for the chiplet (e.g., configurations for the sense channel circuitry). The control circuitry can also include switch control logic circuitry configured to operate the switching circuitry for display and sensing operations.

Figure 4B:
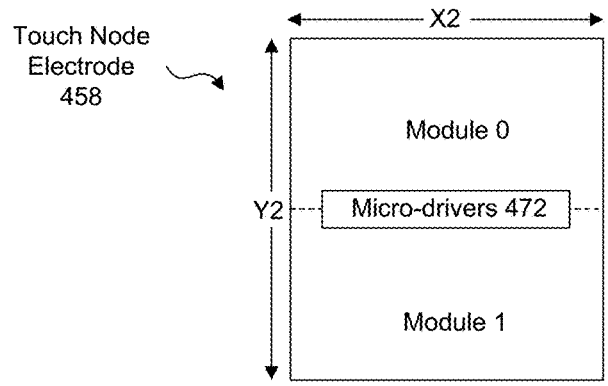
FIG. 4B illustrates a block diagram of a touch node electrode according to examples of the disclosure.

FIG. 4B illustrates a block diagram of touch node electrode 458 according to examples of the disclosure. The size and micro-LED density of touch node electrode 458 can vary depending on the size of the device, the size of the integrated touch screen, and the desired display and touch and/or proximity sensing granularity. In one nonlimiting example, touch node electrode 458 can define an area X2 by Y2 of 1.25 mm×1.25 mm and include a micro-LED module 0 and micro-LED module 1, with each module containing 16×16 pixels (assuming redundant set of pixels) and micro-driver block 472 located between module 0 and module 1. As noted above, micro-driver block 472 can include some or all of micro-drivers 470, switches 444, and other circuitry such as amplifiers, analog-to-digital converters, filters, demodulators, results registers, and the like. In another non-limiting example, touch node electrode 458 can define an area X2 by Y2 of 3.546 mm×3.546 mm and contain include a micro-LED module 0 and micro-LED module 1, with each module containing 32×64 pixels and micro-driver block 472 located between module 0 and module 1. Although the example of FIG. 4B illustrates one micro-driver block 472 and two modules, in other example of the disclosure different numbers of micro-driver blocks can control different numbers of modules.

As noted above, in various embodiments of the disclosure, the electronic device can detect unmodulated light transmitted by a stylus, modulated light transmitted by one or more styluses, or modulated/unmodulated light generated by the micro-LEDs and reflected off an object such as a finger or passive stylus. Various configurations of the array of micro-LEDs and micro-driver circuitry can be employed to perform these detections.

Figure 4C:
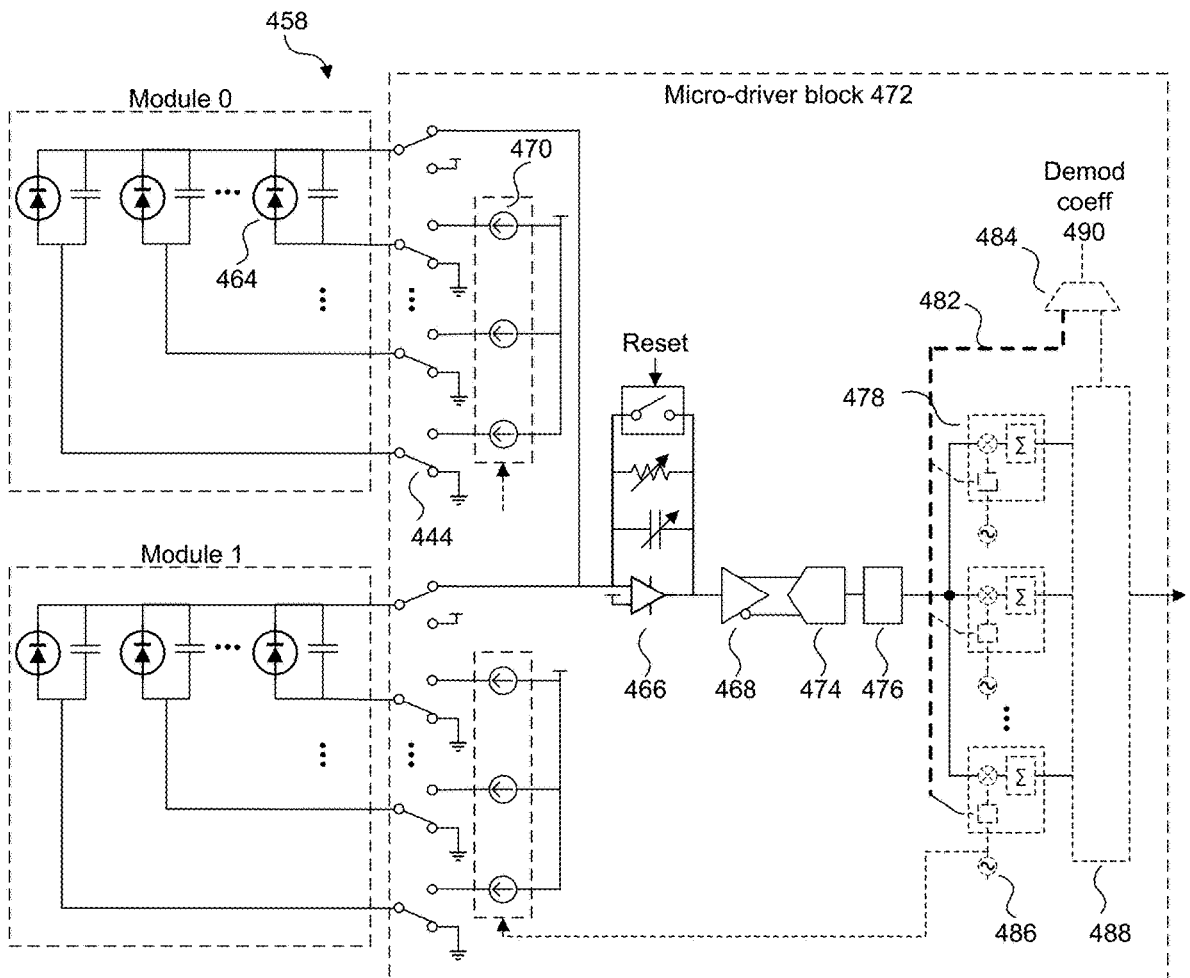
FIG. 4C illustrates an expanded view of a touch node electrode including two micro-LED modules and a micro-driver block configured in a DC photoconduction mode for detecting unmodulated light transmitted by a stylus according to examples of the disclosure.

FIG. 4C illustrates an expanded view of touch node electrode 458 including two micro-LED modules and micro-driver block 472 configured in a DC photoconduction mode for detecting unmodulated light transmitted by a stylus according to examples of the disclosure. In the DC photoconduction mode, light (e.g., unmodulated light) generated by an active stylus can be detected by micro-LEDs 464 that have been configured as light detectors. In the example of FIG. 4C, the anodes of micro-LEDs 464 in both Module 0 and Module 1 can be configured to be held at ground using switches 444, while the cathodes can be reverse-biased by being coupled to the inverting input of transimpedance amplifier 466, whose noninverting input can be held at a reference voltage such as 0.65V. Amplifier 466 (also known herein as the analog front-end (AFE)) can be configured as a transimpedance amplifier or charge amplifier to convert current on its inverting input (indicative of the intensity of light received at the micro-LEDs) to a voltage on its output using the feedback network of the amplifier. In some examples, the analog output of amplifier 466 can be converted to a differential signal using a single-ended to differential (S2D) converter 468, and the differential signal can be converted to a digital signal using a sigma-delta ADC 474 and a subsequent decimation filter 476. In some embodiments, instead of a sigma-delta ADC and a decimation filter, a Nyquist ADC (such as a SAR ADC) could be used. The digital signal at the output of the decimation filter 476 (or Nyquist ADC, if applicable) can be a composite of a DC offset value due to dark current (reverse-bias leakage current) through micro-LEDs 464, and a dynamic component which is the signal of interest. In the DC photoconduction mode, because the light detected at micro-LEDs 464 need not be modulated, one or more demodulators 478 can be bypassed (as indicated by the dashed lines in FIG. 4C). The digitized data stream from ADC 474 can then be processed by one or more downstream processors (along with data from other micro-LEDs) to generate an image of the illumination pattern indicative of the target location of an active stylus, and the intensity of light across that illumination pattern.

In the example of FIG. 4C, all micro-LEDs 464 in both Modules 0 and 1 are coupled to a single amplifier 466 and its associated downstream circuitry to generate a single digitized data stream per touch node electrode. However, it should be understood that in other embodiments, touch node electrode 458 can be divided into more than two groups of micro-LEDs 464, and each group of micro-LEDs 464 can be coupled to one of a plurality of amplifiers 466 within micro-driver block 472, each amplifier generating its own digitized data stream for processing by the one or more processors.

Figure 4D:
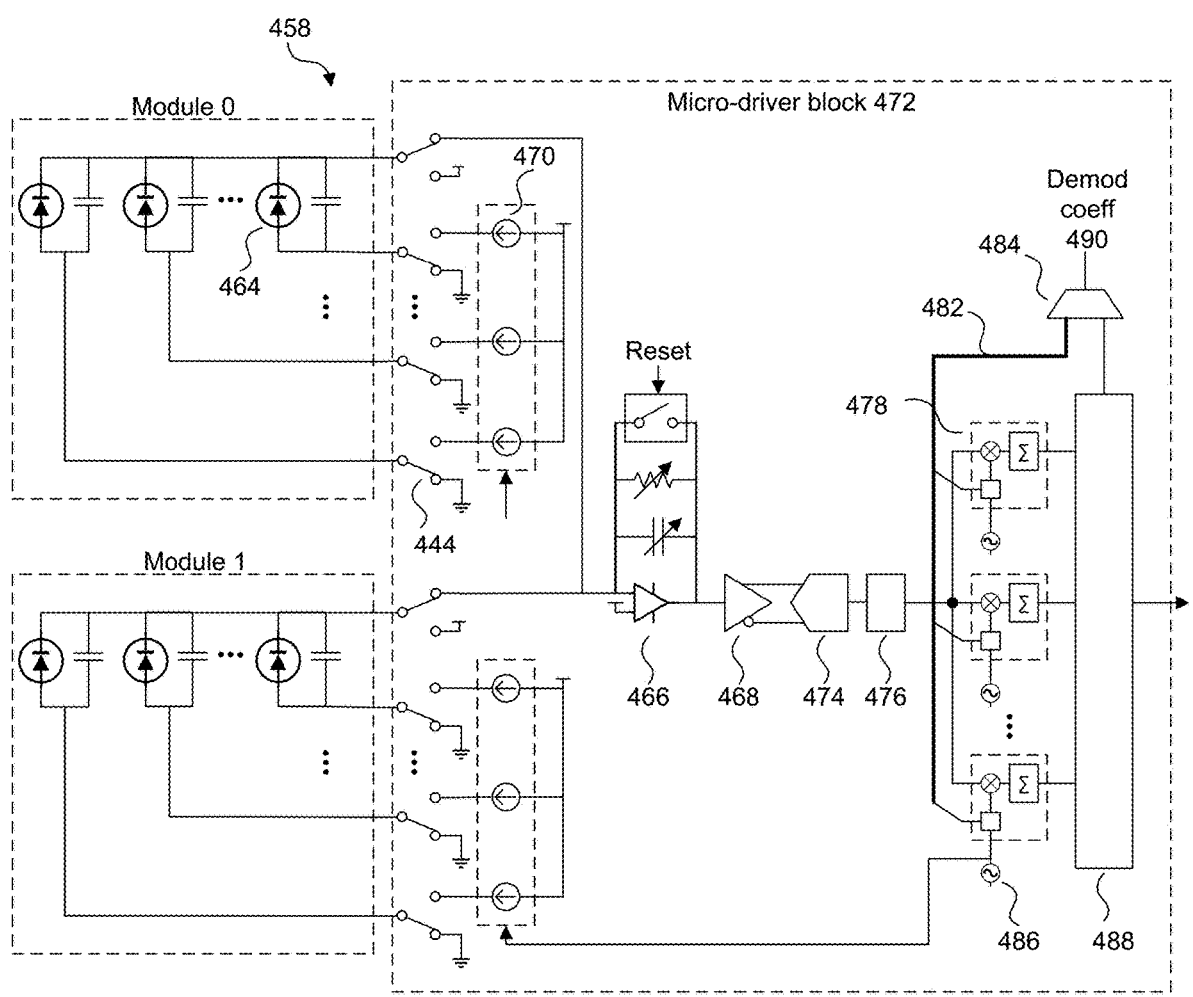
FIG. 4D illustrates an expanded view of a touch node electrode including two micro-LED modules and a micro-driver block configured in an AC photoconduction mode for detecting modulated light transmitted by one or more styluses according to examples of the disclosure.

FIG. 4D illustrates an expanded view of touch node electrode 458 including two micro-LED modules and micro-driver block 472 configured in an AC photoconduction mode for detecting modulated light transmitted by one or more styluses according to examples of the disclosure. In the AC photoconduction mode, modulated light generated by one active stylus or a plurality of active styluses, each generating modulated light at a different frequency, can be detected by micro-LEDs 464 that have been configured as light detectors. In the example of FIG. 4D, the anodes of micro-LEDs 464 in both Module 0 and Module 1 can be configured to be held at ground using switches 444, while the cathodes can be reverse-biased by being coupled to the inverting input of transimpedance (or charge) amplifier 466, whose noninverted input can be held at a reference voltage such as 0.65V. Amplifier 466 can be configured as a transimpedance amplifier as discussed above with respect to FIG. 4C. In the AC photoconduction mode, a plurality of demodulators 478 (finite impulse response (FIR) filters) are needed to demodulate the signals received from the one or more active styluses, where each stylus can generate light with a different modulation frequency. In some examples, in-phase (I) and quadrature (Q) demodulation (I/Q demodulation) can be employed to enable phase agnostic (phase independent) operation, which may be needed because the carrier on the stylus may not be synchronized with the demodulation waveform in the electronic device.

Because of I/Q demodulation, two demodulators 478 are needed at each demodulation frequency, one for the I component and one for the Q component. In some examples, serialized demodulation coefficients 490 can be selected by multiplexer 484 and transmitted to demodulator. In some embodiments, the multiplier in demodulators 478 can be realized with a shift register and adder, and the serialized demodulation coefficients can gate partial sums in the multiplier throughout the touch scan. In yet another embodiment, serialized demodulation coefficients can be parallelized and then applied to an area multiplier that is time shared across multiple channels. In the above examples, serial demodulation coefficients can be generated by an NCO that resides in an off panel Display Driver IC (DDIC). However, in other examples, one or more local NCOs can be used to generate the demodulation waveforms. The demodulated output of each demodulator 478 can be accumulated and fed to results register 488, and the digitized data stream stored in the results register can be processed by one or more downstream processors to generate an image of the illumination pattern indicative of the target location of each of the one or more active styluses, and the intensity of light across each of those illumination patterns.

In some examples, a plurality of pairs of demodulators 478 can be employed within micro-driver block 472, one pair for each of a plurality of possible frequencies that may be generated by the plurality of active styluses. However, having all pairs of demodulators actively performing digital demodulation on an incoming digitized data stream at all times can be wasteful of resources if some pairs are not needed. Accordingly, in some examples a spectral analysis scan can be performed by at least some of the demodulators to determine incoming modulation frequencies, and determine which channel or channels (pairs of demodulators 478) are performing demodulation at those frequencies. Alternatively, a wireless communications channel can be established between the active styluses and the electronic device to identify the active modulation frequencies. If some of the demodulators do not correspond to any of the determined incoming modulation frequencies, those channels can be deactivated.

In the example of FIG. 4D, all micro-LEDs 464 in both Modules 0 and 1 are coupled to a single amplifier 466 and its associated downstream circuitry, and then demodulated by multiple demodulators 478 to generate separate results at different frequencies representative of different active styluses, if more than one active stylus is present. However, it should be understood that in other embodiments, touch node electrode 458 can be divided into more than two groups of micro-LEDs 464, and each group of micro-LEDs 464 can be coupled to one of a plurality of amplifiers 466 within micro-driver block 472, each amplifier generating its own digitized data stream for demodulation by multiple demodulators to generate separate results at different frequencies representative of different active styluses.

Figure 4E:
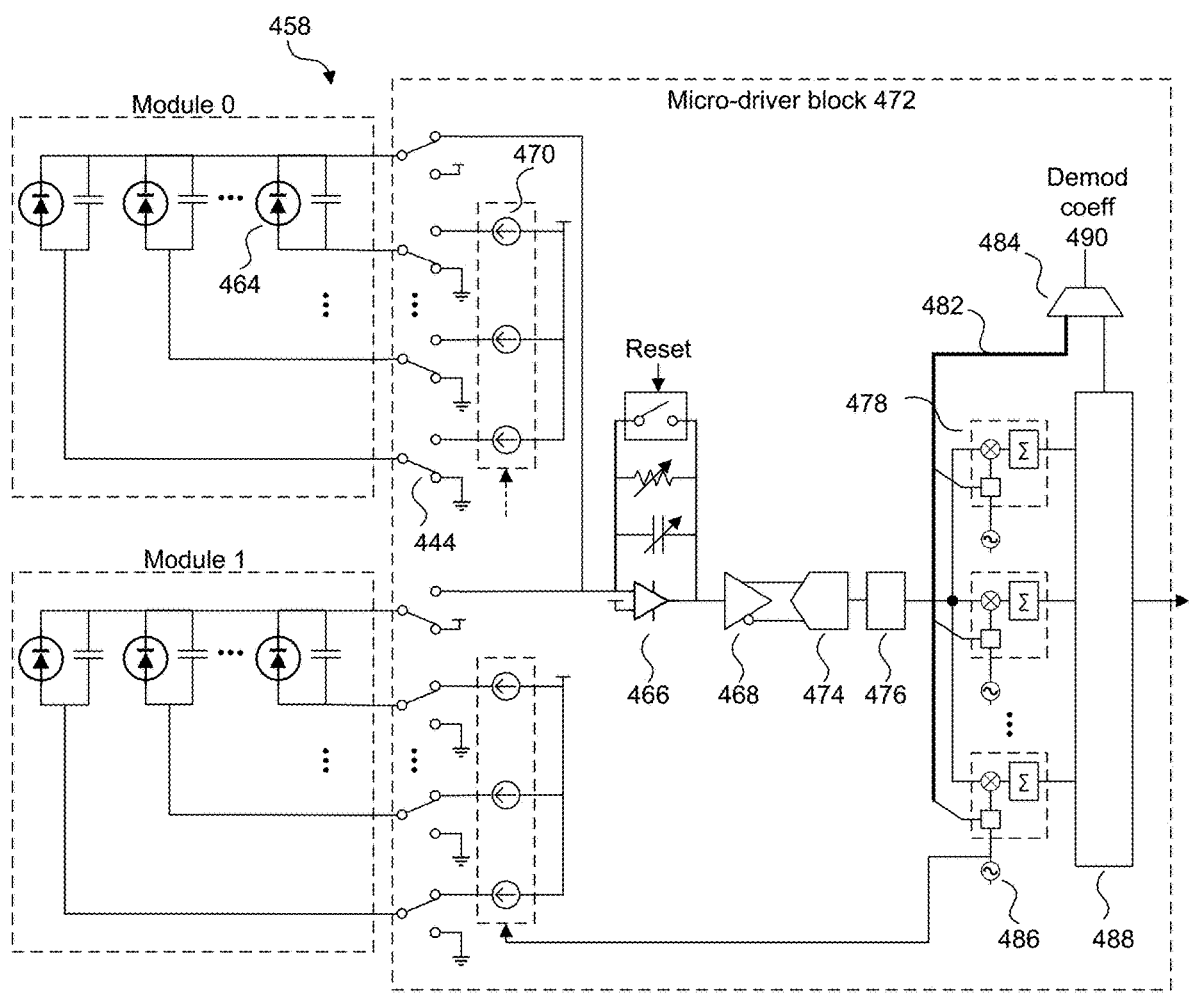
FIG. 4E illustrates an expanded view of a touch node electrode including two micro-LED modules and a micro-driver block configured in an optical reflective touch mode for transmitting modulated light and detecting reflections of the modulated light off of an object such as a finger or passive stylus according to examples of the disclosure.

FIG. 4E illustrates an expanded view of touch node electrode 458 including two micro-LED modules and micro-driver block 472 configured in an optical reflective touch mode for transmitting modulated light and detecting reflections of the modulated light off of an object such as a finger or passive stylus according to examples of the disclosure. In the optical reflective touch mode, modulated light generated by one or more micro-LEDs 464 configured as light illuminators can reflect off of an object such as a finger or passive stylus, and be received by one or more micro-LEDs configured as light detectors. In the example of FIG. 4E, micro-LEDs 464 in Module 1 can be configured as illuminators by coupling the anodes to micro-drivers 470 (e.g., current sources) (which are coupled to a reference voltage such as 1.29V) using switches 444, while the cathodes can be biased by being coupled to a reference voltage such as −3.7V. In some examples, micro-drivers 470 in Module 1 can be modulated by receiving a stimulus signal from discrete oscillator 486 (as shown in FIG. 4E), or alternatively by receiving coefficients that can used by a device such as an NCO to generate a stimulus signal at a particular modulation frequency. In either case, micro-drivers 470 can be modulated in accordance with the stimulus signal to cause micro-LEDs 464 in Module 1 to generate modulated light.

In the example of FIG. 4E, the anodes of micro-LEDs 464 in Module 0 can be configured as detectors by coupling the anodes to a reference voltage such as ground using switches 444, while the cathodes can be coupled to the inverting input of amplifier 466. Amplifier 466 can be configured as a transimpedance amplifier as discussed above with respect to FIG. 4C. In the optical reflective touch mode, two demodulators 478 can be utilized to demodulate the modulated light that has reflected off an object such as a finger or a passive stylus, one for the I component and one for the Q component of the demodulation frequency as described above with respect to FIG. 4D. The demodulated output of each demodulator 478 can be accumulated and fed to results register 488, and the digitized data stream stored in results register 488 can be processed by one or more downstream processors to generate an image of the illumination pattern indicative of the target location of the object, and the intensity of light across that illumination pattern.

As discussed above, stylus detection can be performed by detecting light transmitted by a stylus, or by transmitting light and detecting the reflection of that light off of a stylus. However, the accurate detection of transmitted or reflected light can depend on the reflective properties of the stylus, the cover material, the interface between the ambient environment and the cover material, and interfering objects such as water droplets.

Figure 4F:
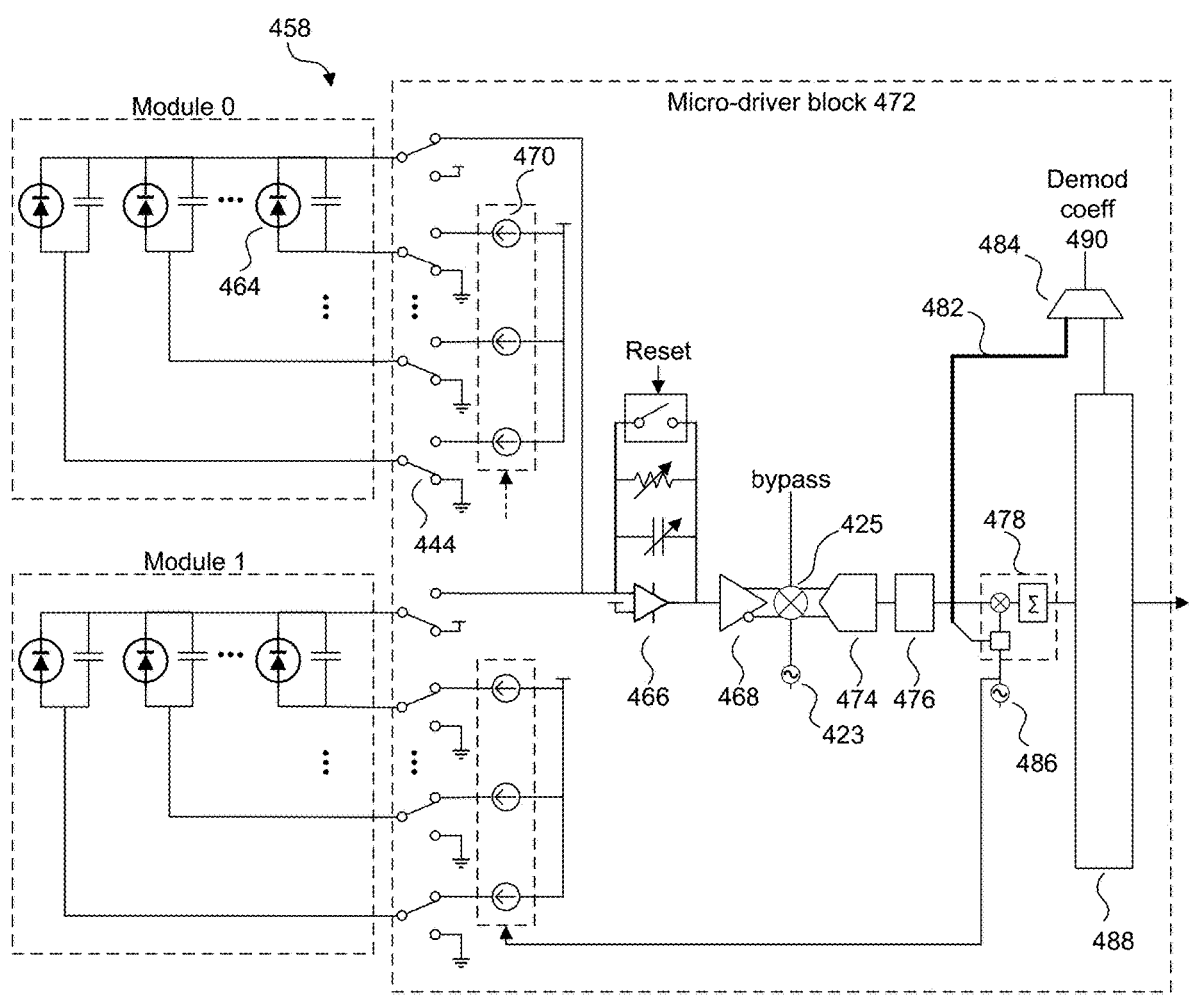
FIG. 4F illustrates an expanded view of a touch node electrode including two micro-LED modules and a micro-driver block in an analog demodulation configuration according to examples of the disclosure.

FIG. 4F illustrates an expanded view of touch node electrode 458 including two micro-LED modules and micro-driver block 472 in an analog demodulation configuration according to examples of the disclosure. Although FIG. 4F illustrates analog demodulation in the context of the optical reflective touch mode (e.g., FIG. 4E), analog demodulation can also be utilized in the DC photoconduction mode (e.g., FIG. 4C) and the AC photoconduction mode (e.g., FIG. 4D). In the example of FIG. 4F, analog multiplier 425 is inserted between S2D converter 468 and sigma-delta ADC 474. A single demodulator 478 receives the output of decimation filter 476, and after demodulation, passes its output to result register 488. In FIG. 4E, sigma-delta ADC 474 would have a lower bandwidth than other modes discussed above, because in the signal is already downconverted by analog multiplier 425 using demodulation signal 423 before the sigma-delta ADC. In this configuration, demodulator 478 receives a demodulation window (as opposed to a sinusoidal demodulation waveform, for example) to get improved interference rejection. For the DC photoconduction mode, analog multiplier 425 would be bypassed. For the AC photoconduction mode, I and Q scans can be performed sequentially (e.g., by splitting a 300 us scan into two 150 us scans, with the first scan at the I phase and the second scan at the Q phase).

Figure 5A:
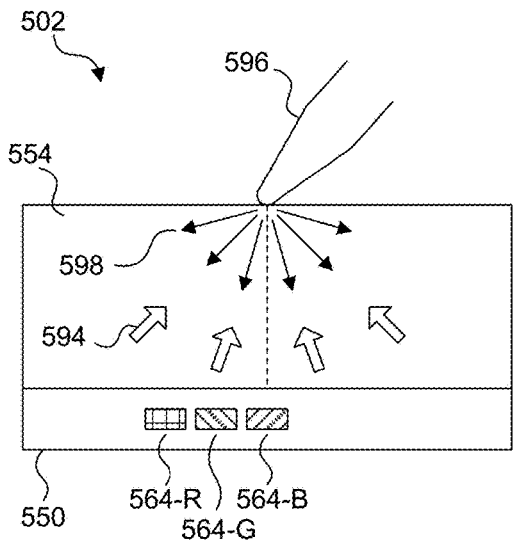
FIG. 5A illustrates a cross-sectional view of a portion of an integrated touch screen including micro-LEDs, cover material, and an object such as a proximate stylus, and the transmission of light through the boundary between the object and the cover material according to examples of the disclosure.

FIG. 5A illustrates a cross-sectional view of a portion of integrated touch screen 502 including micro-LEDs 564, cover material 554, and an object such as proximate stylus 596, and the transmission of light through the boundary between the object and the cover material according to examples of the disclosure. In the example of FIG. 5A, conductive layer 550 is a display layer including a plurality of micro-LEDs 564 configured as illuminators and photodetectors (though only three are shown in FIG. 5A for purposes of simplifying the figure). For example, micro-LED 564-R can be reverse biased and configured as a photodetector, while micro-LEDs 564-G and 564-B can be configured as illuminators. However, other types and configurations of illuminators and photodetectors can also be employed in FIG. 5A, as discussed hereinbelow. Cover material 554 is formed over the display layer, and in one example can be formed from glass having an index of refraction of about 1.5, although other materials (e.g., plastic) with other indices of refraction can also be used. Light 594, which can include light at any angle that has been transmitted from micro-LEDs 564-G and/or 564-B or light that has gone through one or more reflections within cover material 554, can impinge upon object 596 (e.g., a stylus or other medium) in contact with a detection surface of cover material 554, and reflect back into the cover material at any number of reflection angles as shown at 598. Due to reflections off and/or within object 596, absorption and scattering, and also due to the similarity of the indices of refraction of object 596 and cover material 554, reflections 598 can be generated at any reflection angle with respect to an angle normal to the surface of cover material 554 (see dashed line in FIG. 5A) (e.g., the surface normal), and in some instances be detected by micro-LED 564-R configured as a photodetector.

Figure 5B:
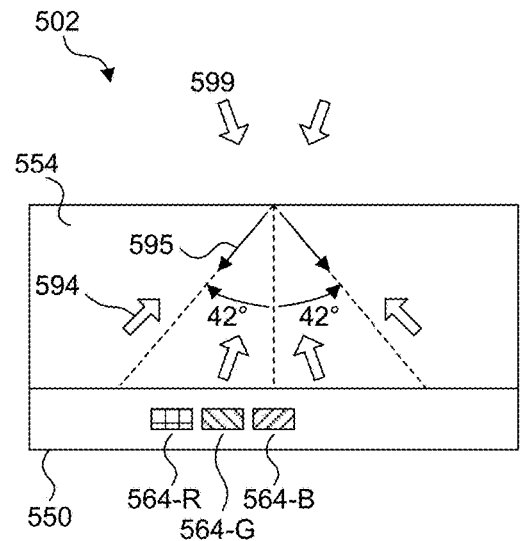
FIG. 5B illustrates a cross-sectional view of a portion of an integrated touch screen including micro-LEDs and cover material, and the reflection or refraction of light through the boundary between air and the cover material according to examples of the disclosure.

FIG. 5B illustrates a cross-sectional view of a portion of integrated touch screen 502 including micro-LEDs 564 and cover material 554, and the reflection or refraction of light through the boundary between air and the cover material according to examples of the disclosure. In the example of FIG. 5B, conductive layer 550 is a display layer including a plurality of micro-LEDs 564 configured as illuminators and photodetectors (though only three are shown in FIG. 5B for purposes of simplifying the figure). For example, micro-LED 564-R can be reverse biased and configured as a photodetector, while micro-LEDs 564-G and 564-B can be configured as illuminators. However, other types and configurations of illuminators and photodetectors can also be employed in FIG. 5B, as discussed hereinbelow. In the example of FIG. 5B, light 594, which can include light at any angle that has been transmitted from micro-LEDs 564-G and/or 564-B or light that has gone through one or more reflections within cover material 554, can impinge upon the boundary between the cover material and the air from within the cover material, and at least partially reflect back into the cover material as light 595, and in some instances be detected by micro-LED 564-R configured as a photodetector. In accordance with the principles of Snell's Law, the critical angle (with respect to the surface normal) of light 594 impinging on the detection surface of cover material 554 (from within the cover material) at which light is no longer refracted into the air and instead is completely reflected back into the cover material can be computed as $\theta_{crit}=\sin^{-1}(n_1/n_2)$, where $n_1$ is the refractive index of air and $n_2$ is the refractive index of the cover material. In addition, light 599, which can include ambient light, light that has been transmitted from or reflected by an object such as a stylus, or light from any other light source, can impinge upon cover material 554 from outside the cover material and be refracted as light 595 as it passes through the boundary between the air and the cover material. In accordance with Snell's Law (the law of refraction), the angle of refraction within the cover media $\theta_1$ is related to the angle of incidence of light impinging on the cover material $\theta_2$ as $\theta_1/\theta_2=n_2/n_1$, where $n_1$ is the refractive index of air and $n_2$ is the refractive index of the cover material. However, at the critical angle of light impinging on the detection surface of cover material 554 from the air, the light will no longer refract into the cover material and instead completely reflect back into the air.

As indicated above, the critical angle of light impinging on the detection surface of cover material 554 as a result of light 599 from air (below which light begins to refract into the cover material), and also the critical angle of light impinging on the detection surface of the cover material as a result of light 594 from within the cover material (above which light begins to being completely reflect back into the cover material) can be dependent on and determined (either computationally or empirically) by the type of cover material 554 (e.g., glass) and the medium (e.g., air) in contact with the cover material. In the example of FIG. 5B, the critical angle can be determined to be +/−42 degrees from the surface normal. For practical applications, the critical angle can include some margin, such as +/−42 degrees+/−1 degree from the surface normal, or +/−42 degrees+/−2%.

Figure 5C:
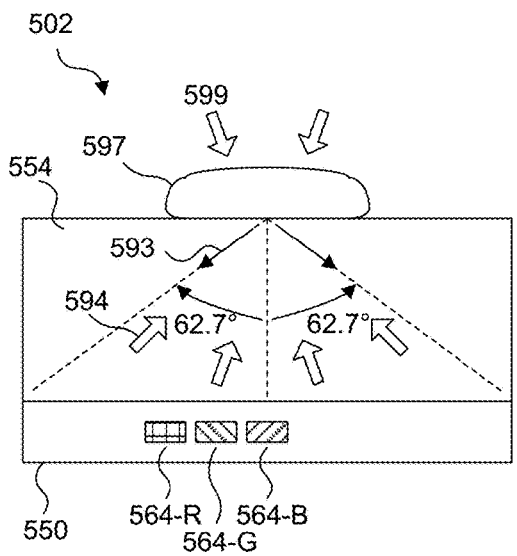
FIG. 5C illustrates a cross-sectional view of a portion of an integrated touch screen including micro-LEDs and cover material, and the reflection or refraction of light through the boundary between a water droplet and the cover material according to examples of the disclosure.

FIG. 5C illustrates a cross-sectional view of a portion of integrated touch screen 502 including micro-LEDs 564 and cover material 554, and the reflection or refraction of light through the boundary between water droplet 597 and the cover material according to examples of the disclosure. In the example of FIG. 5C, conductive layer 550 is a display layer including a plurality of micro-LEDs 564 configured as illuminators and photodetectors (though only three are shown in FIG. 5C for purposes of simplifying the figure). For example, micro-LED 564-R can be reverse biased and configured as a photodetector, while micro-LEDs 564-G and 564-B can be configured as illuminators. However, other types and configurations of illuminators and photodetectors can also be employed in FIG. 5C, as discussed hereinbelow. In the example of FIG. 5C, light 594, which can include light at any angle that has been transmitted from micro-LEDs 564-G and/or 564-B or light that has gone through one or more reflections within cover material 554, can impinge upon the boundary between the cover material and water droplet 597 (having an index of refraction of about 1.3) in contact with a detection surface of the cover material from within the cover material, and at least partially reflect back into the cover material as light 593, and in some instances be detected by micro-LED 564-R configured as a photodetector. At the critical angle of the cover material/water droplet interface, light 594 can be completely reflected back into cover material 554. In addition, light 599, which can include ambient light, light that has been transmitted from or reflected by and object such as a stylus, or light from any other light source, can enter water droplet 597 and impinge upon cover material 554 from within the water droplet and be refracted as light 593 as it passes through the boundary between the water droplet and the cover material. However, at the critical angle of light impinging on the detection surface of cover material 554 from within water droplet 597, the light will no longer refract into the cover material and instead completely reflect back into the water droplet.

As indicated above, the critical angle of light impinging in the detection surface of cover material 554 from within water droplet 597 as a result of light 599 (below which light begins to refract into the cover material), and also the critical angle of light impinging on the detection surface of the cover material as a result of light 594 from within the cover material (above which light begins to completely reflect back into the cover material) can be dependent on and determined (either computationally or empirically) by the type of cover material 554 (e.g., glass) and the medium (e.g., water) in contact with the cover material. In the example of FIG. 5C, the critical angle can be determined to be +/−62.7 degrees from the surface normal. For practical applications, the critical angle can include some margin, such as +/−62.7 degrees+/−1 degree from the surface normal, or +/−62.7 degrees+/−2%.

Figure 5D:
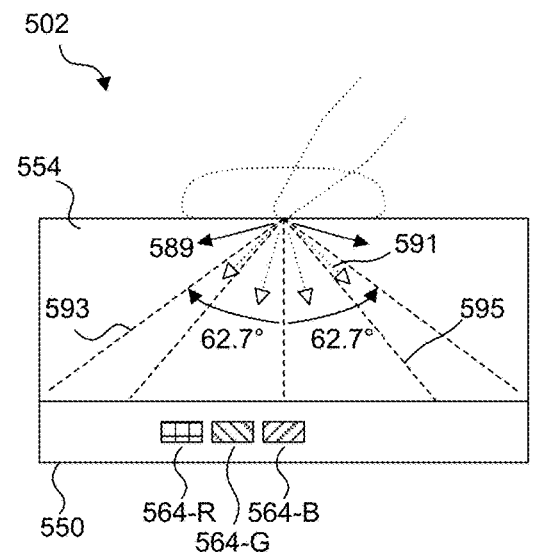
FIG. 5D illustrates a cross-sectional view of a portion of an integrated touch screen including micro-LEDs and cover material, and the concept of blocking or filtering of some angles of reflected or refracted light from, or through, the cover material according to examples of the disclosure.

FIG. 5D illustrates a cross-sectional view of a portion of integrated touch screen 502 including micro-LEDs 564 and cover material 554, and the concept of blocking or filtering of some angles of reflected or refracted light from, or through, the cover material according to examples of the disclosure. In the example of FIG. 5D, conductive layer 550 is a display layer including a plurality of micro-LEDs 564 configured as illuminators and photodetectors (though only three are shown in FIG. 5D for purposes of simplifying the figure). For example, micro-LED 564-R can be reverse biased and configured as a photodetector, while micro-LEDs 564-G and 564-B can be configured as illuminators. However, other types and configurations of illuminators and photodetectors can also be employed in FIG. 5D, as discussed hereinbelow. The example of FIG. 5D superimposes an air/cover material critical angle of +/−42 degrees from the surface normal, as shown in FIG. 5B, and the water droplet/cover material critical angle of +/−62.7 degrees from the surface normal as shown in FIG. 5C. To reduce the likelihood of reflected or refracted light from ambient light, light sources other than a stylus, or a water droplet being detected and erroneously used to determine a proximity image, some embodiments of the disclosure can filter or block light such that light having a detection angle less than the largest of these two critical angles (e.g., less than +/−62.7 degrees with respect to the surface normal (indicated by dashed and white-tipped arrows 591)) is blocked from being received by a detector, while light having an angle greater than the larger of these two critical angles (e.g., greater than +/−62.7 degrees with respect to the surface normal (indicated by solid and dark-tipped arrows 589)) can be received by a detector. Filters or light-blocking elements (not shown in FIG. 5D) can be established at locations associated with specific micro-LEDs configured as detectors to permit only light (reflected or otherwise) having an angle of +/−62.7 degrees or greater to reach those detectors.

As discussed above with respect to FIGS. 5A, 5C and 5D, in some embodiments of the disclosure, light transmitted by illuminators can reflect off of a stylus and back to photodetectors, and the detection of this reflected light can be used to capture an image of the stylus. However, it can be important to control the angle of illumination of the illuminators to minimize reflections of the transmitted light that are not due to an object, but rather due to the transmitted light reflecting off the air/cover material boundary at a critical angle (or greater) that causes the total internal reflection (TIR) or near TIR of the transmitted light. This type of reflected light may be of a sufficient angle to be received by the detectors, which can cause false object detection.

Figure 5E:
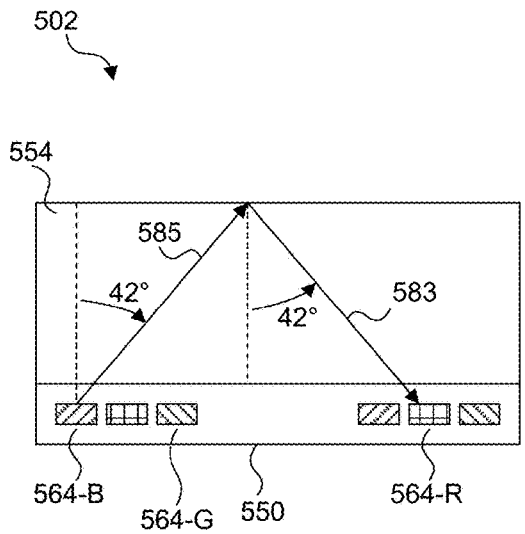
FIG. 5E illustrates a cross-sectional view of a portion of an integrated touch screen including a micro-LED configured as an illuminator and generating light in the direction of the boundary represented by the interface between the air and cover material according to examples of the disclosure.

FIG. 5E illustrates a cross-sectional view of a portion of integrated touch screen 502 including micro-LED 564-B configured as an illuminator and generating light 585 in the direction of the boundary represented by the interface between the air and cover material 554 according to examples of the disclosure. In the example of FIG. 5E, conductive layer 550 is a display layer including a plurality of micro-LEDs 564 configured as illuminators and photodetectors (though only two pixels (representing three micro-LEDs each) are shown in FIG. 5E for purposes of simplifying the figure). For example, micro-LED 564-R can be reverse biased and configured as a photodetector, while micro-LEDs 564-G and 564-B can be configured as illuminators. However, other types and configurations of illuminators and photodetectors can also be employed in FIG. 5E, as discussed hereinbelow. In the example of FIG. 5E, micro-LED 564-B is generating light 585 at a critical angle with respect to the surface normal that results in the total (or near total) internal reflection of the transmitted light at the air/cover material interface and the generation of reflected light 583, even though no object is present to cause the reflection. To reduce the chance of reflected light 583 causing erroneous detections, light 585 generated by an illuminator can be limited to not more than the critical angle of the cover material/air interface, which can reduce reflections 583. This critical angle can be dependent on and determined (either computationally or empirically) by the type of cover material 554 (e.g., glass) and the medium (e.g., air) in contact with the cover material. In the example of FIG. 5E, this critical angle can be determined to be +/−42 degrees from the surface normal. For practical applications, the critical angle can include some margin, such as +/−42 degrees+/−1 degree from the surface normal, or +/−42 degrees+/−2%.

Figure 5F:
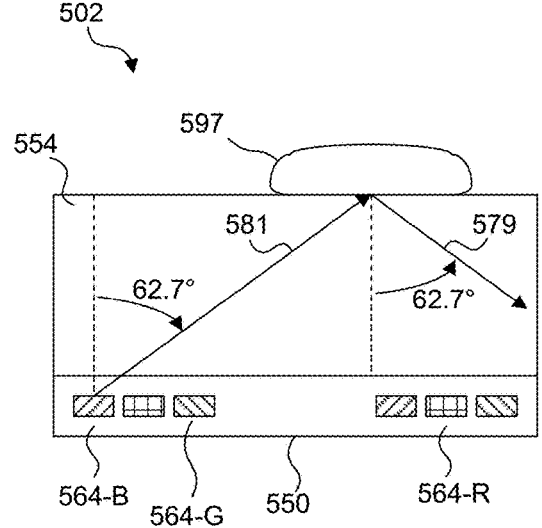
FIG. 5F illustrates a cross-sectional view of a portion of an integrated touch screen including a micro-LED configured as an illuminator and generating light in the direction of the boundary represented by the interface between a water droplet and cover material according to examples of the disclosure.

FIG. 5F illustrates a cross-sectional view of a portion of integrated touch screen 502 including micro-LED 564-B configured as an illuminator and generating light 581 in the direction of the boundary represented by the interface between water droplet 597 and cover material 554 according to examples of the disclosure. In the example of FIG. 5F, conductive layer 550 is a display layer including a plurality of micro-LEDs configured as illuminators and photodetectors (though only two pixels (representing three micro-LEDs each) are shown in FIG. 5E for purposes of simplifying the figure). For example, micro-LED 564-R can be reverse biased and configured as a photodetector, while micro-LEDs 564-G and 564-B can be configured as illuminators. However, other types and configurations of illuminators and photodetectors can also be employed in FIG. 5F, as discussed hereinbelow. In the example of FIG. 5F, micro-LED 564-B is generating light 581 at a critical angle with respect to the surface normal that results the total (or near total) internal reflection of the transmitted light at the water droplet/cover material interface and the generation of reflected light 579. To reduce the chance of reflected light 579 causing erroneous detections, light 581 generated by an illuminator can be limited to not more than the critical angle of the cover material/water droplet interface, which can reduce reflections 579. This critical angle can be dependent on and determined (either computationally or empirically) by the type of cover material 554 (e.g., glass) and the medium (e.g., water) in contact with the cover material. In the example of FIG. 5F, this critical angle can be determined to be +/−62.7 degrees from the surface normal. For practical applications, the critical angle can include some margin, such as +/−62.7 degrees+/−1 degree from the surface normal, or +/−62.7 degrees+/−2%.

Figure 5G:
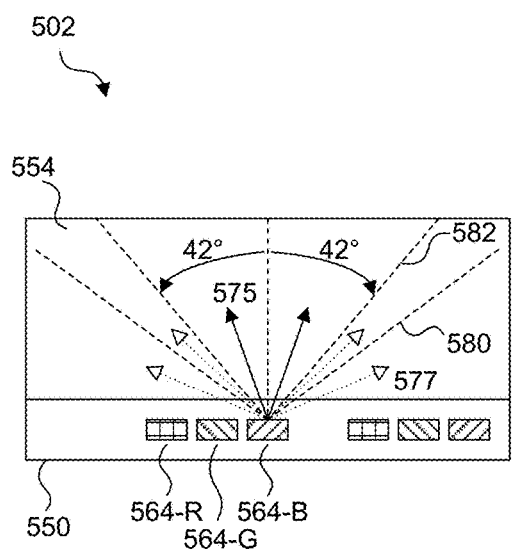
FIG. 5G illustrates a cross-sectional view of a portion of an integrated touch screen including micro-LEDs and cover material, and the concept of blocking or filtering of some angles of light transmitted by a micro-LED configured as an illuminator according to examples of the disclosure.

FIG. 5G illustrates a cross-sectional view of a portion of integrated touch screen 502 including micro-LEDs 564 and cover material 554, and the concept of blocking or filtering of some angles of light transmitted by a micro-LED 564-B configured as an illuminator according to examples of the disclosure. In the example of FIG. 5G, conductive layer 550 is a display layer including a plurality of micro-LEDs 564 configured as illuminators and photodetectors (though only two pixels (representing three micro-LEDs each) are shown in FIG. 5G for purposes of simplifying the figure). For example, micro-LED 564-R can be reverse biased and configured as a photodetector, while micro-LEDs 564-G and 564-B can be configured as illuminators. However, other types and configurations of illuminators and photodetectors can also be employed in FIG. 5E, as discussed hereinbelow. The example of FIG. 5G superimposes the air/cover material critical angle of +/−42 degrees from the surface normal, as shown in FIG. 5E, and the water droplet/cover material critical angle of +/−62.7 degrees from the surface normal as shown in FIG. 5F. To reduce the likelihood of transmitted light being reflected off an air/cover material boundary or a water droplet/cover material boundary being detected and erroneously used to determine a proximity image, some embodiments of the disclosure can filter or block light such that transmitted light having an illumination angle greater than the smallest of these two critical angles (e.g., greater than +/−42 degrees with respect to the surface normal (indicated by dotted and white-tipped arrows 577)) is blocked from being transmitted, while light having an illumination angle less than the smaller of these two critical angles (e.g., less than +/−42 degrees (indicated by solid and dark-tipped arrows 575)) is transmitted. Filters or light-blocking elements (not shown in FIG. 5G) can be established at locations associated with specific micro-LEDs configured as illuminators (such as micro-LED 564-B in the example of FIG. 5G) to permit only light from those illuminators having an illumination angle of +/−42 degrees or less to be transmitted.

Figure 5H:
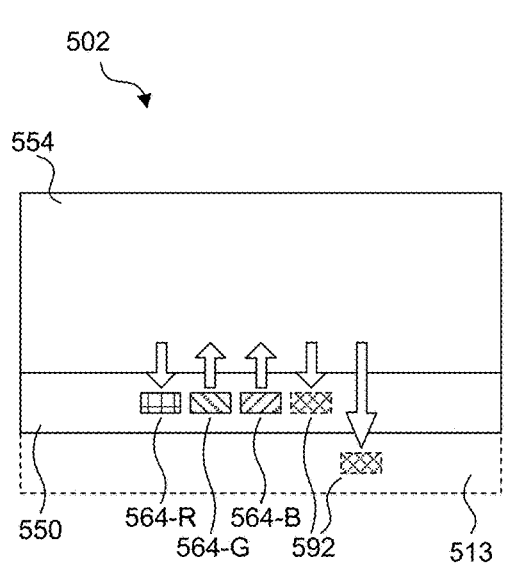
FIGS. 5H-5K illustrate cross-sectional views of portions of an integrated touch screen including alternative illuminator and photodetector embodiments according to examples of the disclosure.

FIG. 5H illustrates a cross-sectional view of a portion of integrated touch screen 502 including alternative illuminator and photodetector embodiments according to examples of the disclosure. In one embodiment within the example of FIG. 5H, conductive layer 550 is a display layer including reverse biased micro-LED 564-R configured as a photodetector, and micro-LEDs 564-G and 564-B configured as illuminators (and including other display micro-LEDs that are not shown in FIG. 5H for purposes of simplifying the figure).

In another embodiment within the example of FIG. 5H, the display layer includes dedicated photodetectors 592 (e.g., photodetectors that are discrete/separate from display LEDs) either on the same layer as micro-LEDs 564 configured as display elements, or as part of an array of photodetectors formed on a different layer 513 below the display layer. Utilizing an array of photodetectors on a separate layer 513 can be advantageous in that the design of the display layer is not disrupted, and it provides the flexibility to use different combinations of colors in the display layer without having to provide for photodetection. Note that although only three micro-LEDs 564 and two dedicated photodetectors 592 in alternative locations are shown in FIG. 5H for purposes of simplifying the figure, it should be understood that each layer may contain many more micro-LEDs and dedicated photodetectors.

Figure 5I:
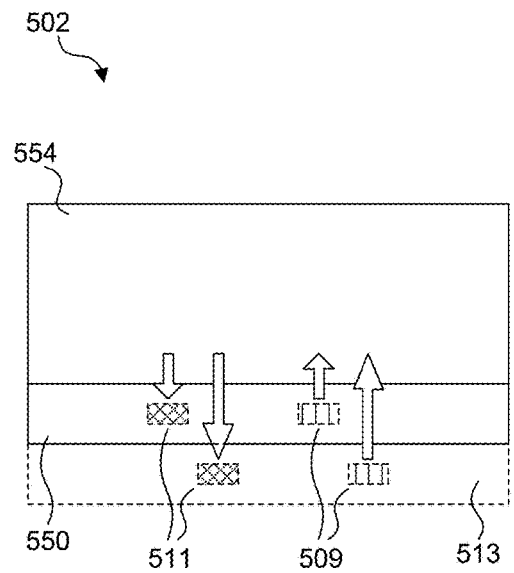

FIG. 5I illustrates a cross-sectional view of a portion of integrated touch screen 502 including alternative illuminator and photodetector embodiments according to examples of the disclosure. In one embodiment within the example of FIG. 5I, conductive layer 550 is a display layer including an array of near infrared (NIR) micro-LEDs 509 configured to emit NIR light, and an array of NIR-sensitive photodetectors 511 (though only one of each is shown in the display layer in FIG. 5I for purposes of simplifying the figure). Note also that the display layer includes other display micro-LEDs that are not shown in FIG. 5I for purposes of simplifying the figure.

In another embodiment within the example of FIG. 5I, the array of NIR micro-LEDs 509 and NIR-sensitive photodetectors 511 are both formed on a different layer 513 below the display layer (though only one of each is shown in layer 513 in FIG. 5I for purposes of simplifying the figure). In other embodiments, NIR micro-LEDs 509 can be formed on either layer 550 or 513, and NIR-sensitive photodetectors 511 can be formed on the other layer. Utilizing an array of NIR illuminators and photodetectors on a separate layer 513 can be advantageous in that the design of the display layer is not disrupted, and the use or NIR can make photodetection invisible to the user.

Figure 5J:
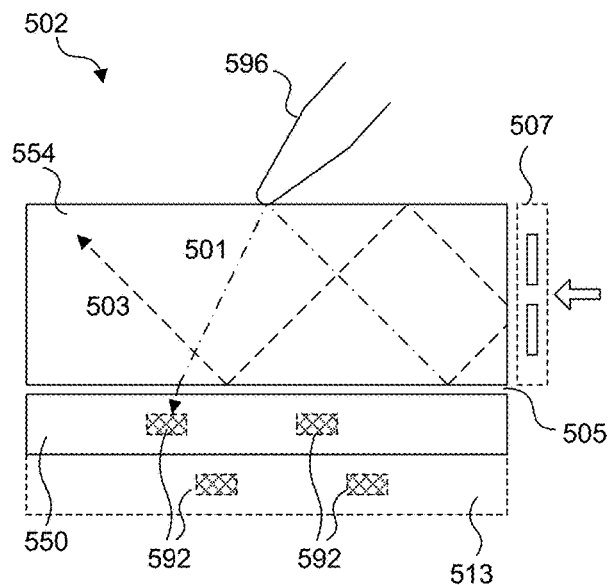

FIG. 5J illustrates a cross-sectional view of a portion of integrated touch screen 502 including alternative illuminator and photodetector embodiments according to examples of the disclosure. In the example of FIG. 5J, conductive layer 550 is a display layer including display micro-LEDs that are not shown in FIG. 5J for purposes of simplifying the figure. An illuminator (not shown in FIG. 5J) is optically coupled to cover material 554 and is configured to emit and pass light through filter 507, which directs the light laterally into cover material 554 as indicated by the wide arrow in FIG. 5J. Filter 507 can be a pinhole, slit, optical element, or a collimator to emit light into cover material 554. In various embodiments, an array of dedicated photodetectors 592 can either be formed in the display layer, or on a different layer 513 below the display layer (although only two of each are shown in layers 550 and 513 for purposes of simplifying the figure).

In the embodiment of FIG. 5J, layer 505 can separate cover material 554 from the display layer. Layer 505 can be an air gap, or a layer of optically clear adhesive (OCA) (with an index of refraction of 1.3, for example) that bonds the cover material to the display layer, or other material that is not index matched to the cover material. Filter 507 can ensure that light entering cover material 554 from the side is at or beyond the critical angle at which light 503 internally reflects and propagates within cover material 554 without escaping the boundary established by the cover material and air or OCA interface. For example, because of the principle of total internal reflection (TIR), light 503 does not escape the bottom surface of cover material 554, and is not detected by photodetectors 592. However, FIG. 5J illustrates that when light reflects off the detection surface of cover material 554 at a location where an object such as a stylus 596 is present (and the index of refraction of the object is similar to that of the cover material), the standing waves can be "broken," and the light can change its angle of reflection as shown at 501. This changed angle can cause the light to pass through the lower boundary of cover material 554 and refract into layer 550 and optionally layer 513 where photodetectors 592 are located, enabling the detection of the object. Note that in the embodiment of FIG. 5J, angular filtering (discussed below) is not required.

Figure 5K:
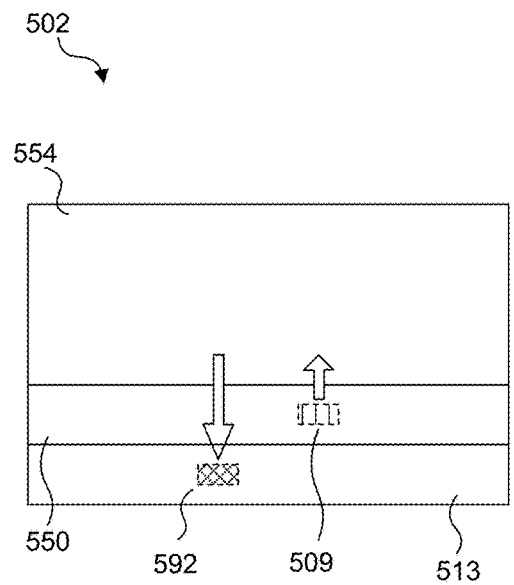

FIG. 5K illustrates a cross-sectional view of a portion of integrated touch screen 502 including alternative illuminator and photodetector embodiments according to examples of the disclosure. In the example of FIG. 5K, conductive layer 550 is a display layer including display micro-LEDs that are not shown in FIG. 5K for purposes of simplifying the figure. The display layer includes an array of dedicated illuminators 509 (e.g., illuminators that are discrete/separate from display LEDs) configured to emit light (although only one is shown in FIG. 5K for purposes of simplifying the figure). An array of photodetectors 592 are formed on a different layer 513 below the display layer (although only one is shown in FIG. 5K for purposes of simplifying the figure). Note that although FIG. 5K illustrates illuminators 509 in the display layer and photodetectors 592 in layer 513, in other examples the illuminators can be formed in layer 513 and the photodetectors can be formed in the display layer.

As discussed above, in some examples of the disclosure, some angular filtering of reflected or refracted light that is received from, or through, the cover material can be advantageous to detect objects such as a stylus, while minimizing false detections of those objects due to water or internal reflections. Additionally, in some examples of the disclosure, some angular filtering of light that is generated by a micro-LED can be advantageous to minimize false detection of objects due to water or internal reflections. To accomplish this, in some examples of the disclosure, light blocking or light permitting elements can be formed in one or more opaque layers of the integrated touch screen.

Figure 6A:
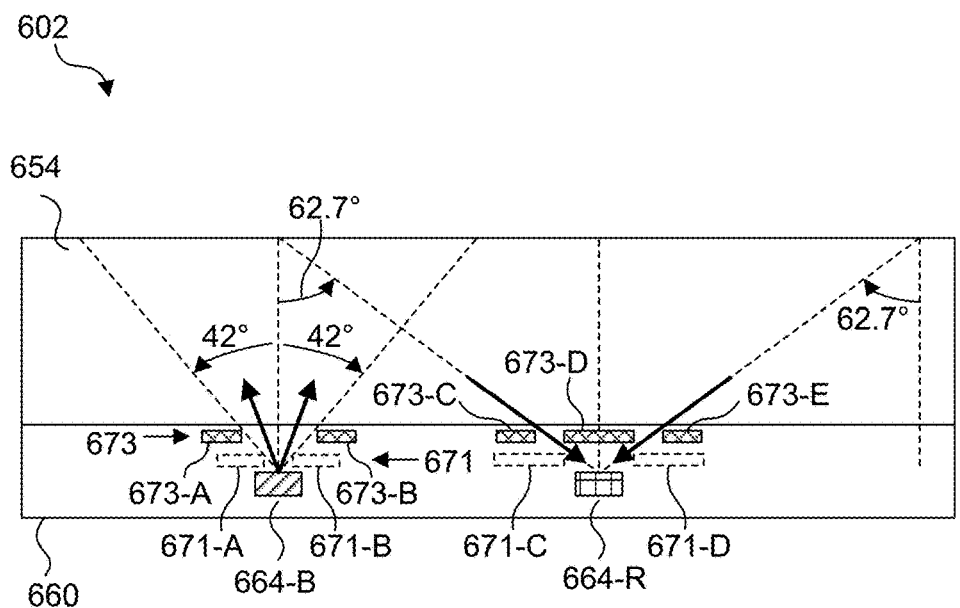
FIG. 6A illustrates a cross-sectional view of a portion of an integrated touch screen including representative micro-LEDs, cover material, light-blocking layer, and the transmission and reception of light through the light-blocking layer according to examples of the disclosure.

FIG. 6A illustrates a cross-sectional view of a portion of an integrated touch screen 602 including representative micro-LEDs 664, cover material 654, light-blocking layer 673, and the transmission and reception of light through the light-blocking layer according to examples of the disclosure. In some examples, light-blocking layer 673 can be an opaque mask layer, an opaque passivation layer, or any other opaque layer. In the example of FIG. 6A, an aperture or opening can be formed between portions 673-A and 673-B of light-blocking layer 673 to create an illuminator angular filter that allows light from micro-LED 664-B (configured as an illuminator) having an illumination angle of between +/−42 degrees to pass through, in accordance with FIG. 5G. It should be understood that although portions 673-A and 673-B of light-blocking layer 673 are shown in FIG. 6A as having outer edges at which the light-blocking layer ends, those outer edges are merely for simplification of the figure, and the light-blocking layer may continue beyond those outer edges to more extensively block light.

In some embodiments, one or more additional light-blocking layers (symbolically illustrated as a single layer 671) can be employed with portions 671-A and 671-B that create apertures or openings aligned or coordinated with the apertures or openings in light-blocking layer 673 to preserve the desired illumination angles. In one illustrative example, the apertures or openings in both layers can be about the same size to create a "point source" with a very narrow illumination angle, if so desired.

In the example of FIG. 6A, one or more apertures can be formed between portions 673-C and 673-E of light-blocking layer 673 to create a detector angular filter that allows light at detection angles greater than +/−62.7 degrees to be received and detected at micro-LED 664-R (configured as a detector), in accordance with FIG. 5D. It should be understood that although portions 673-C and 673-E of light-blocking layer 673 are shown in FIG. 6A as having outer edges at which the light-blocking layer ends, those outer edges are merely for simplification of the figure, and the light-blocking layer may continue beyond those outer edges to more extensively block light.

Although the example of FIG. 5D discussed above describes permitted detection angles of greater than +/−62.7 degrees, allowing all angles between +/−62.7 degrees may permit some undesirable reflections and refractions to be detected by micro-LED 664-R. Thus, portion 673-D can be included in light-blocking layer 673 to limit the detection angles to very narrow ranges, such as within plus or minus a degree (or some fixed percentage) of +/−62.7 degrees. In one example, portion 673-D in conjunction with portions 673-C and 673-E can pass light between a first detection angle (e.g., 62.7 degrees) and a second detection angle a fixed percentage or a fixed number of degrees greater than the first detection angle.

In some embodiments, the one or more additional light-blocking layers 671 can include portions 671-C and 671-D that create apertures coordinated with the apertures in light-blocking layer 673 to preserve the desired detection angles.

Figure 6B:
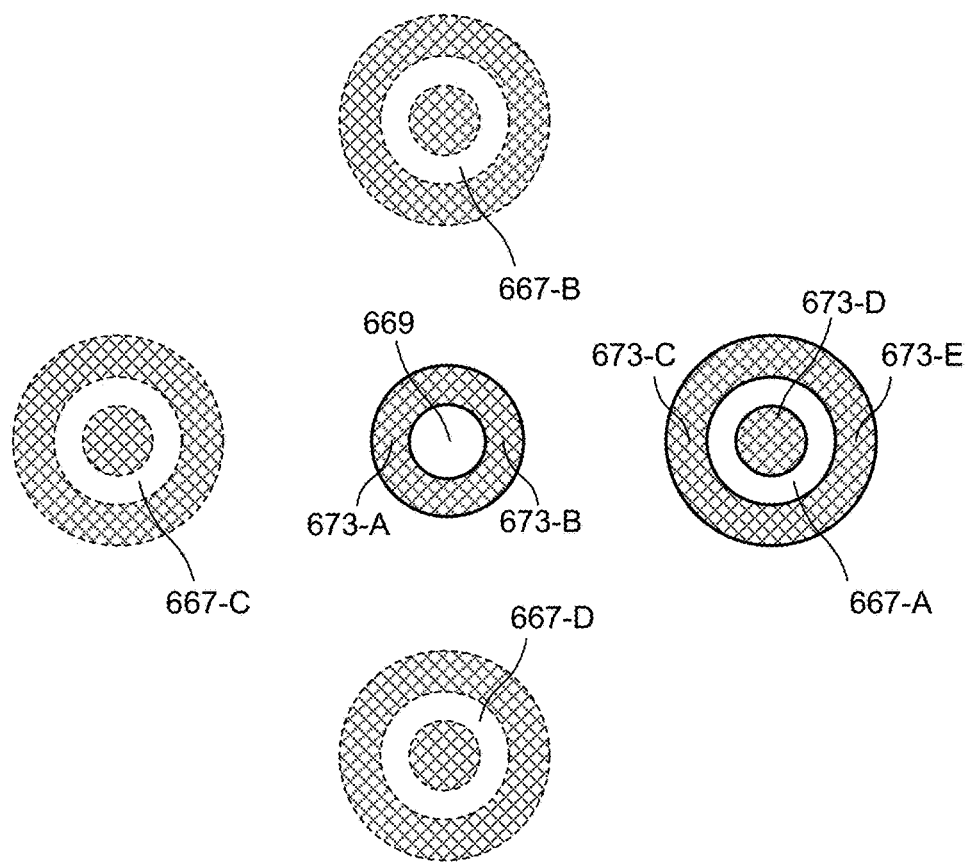
FIG. 6B illustrates a top view of a portion of the integrated touch screen of FIG. 6A showing the light blocking layer according to examples of the disclosure.

Note that the spacing between micro-LED 664-B, configured as an illuminator, and micro-LED 664-R, configured as a detector, is merely one example, and that other spacings between illuminator and detector, such as 1.25 mm, are also contemplated. Furthermore, it should be understood that although FIG. 6A shows micro-LED 664-B configured to generate light and micro-LED 664-R configured to detect light, other micro-LEDs such as micro-LEDs configured for NIR, IR or UV light generation and detection can also be employed FIG. 6B illustrates a top view of a portion of the integrated touch screen 602 of FIG. 6A showing light blocking layer 673 according to examples of the disclosure. The top view of FIG. 6B reveals that in some examples, portions 673-A and 673-B of light-blocking layer 673 can form a ring surrounding opening 669 to allow light from an underlying illuminator (not shown in FIG. 6B) having an illumination angle of between +/−42 degrees to pass through. It should be understood that although portions 673-A and 673-B of light-blocking layer 673 are shown in FIGS. 6A and 6B as having outer edges at which the light-blocking layer ends, those outer edges are merely for simplification of the figure, and the light-blocking layer may continue beyond those outer edges to more extensively block light. In addition, portions 673-A and 673-B of light-blocking layer 673 need not form a ring, but instead can form non-contiguous light-blocking portions.

The top view of FIG. 6B also reveals that in some examples, portions 673-C, 673-D and 673-E of light-blocking layer 673 can define a donut-shaped aperture 667-A to allow light at an angle of about +/−42 degrees to pass through and be received by an underlying detector (not shown in FIG. 6B). It should be understood that although portions 673-C and 673-E of light-blocking layer 673 are shown in FIGS. 6A and 6B as having outer edges at which the light-blocking layer ends, those outer edges are merely for simplification of the figure, and the light-blocking layer may continue beyond those outer edges to more extensively block light. In additional, portions 673-C, 673-D and 673-E of light-blocking layer 673 need not form a donut-shaped aperture between them, but instead can form non-contiguous light-blocking portions. FIG. 6B also illustrates other optional areas of light-blocking layer 673 having light-blocking portions that create openings 667-B, 667-C and 667-D for allowing light at a certain angle to pass through and be received by an underlying detector. Various arrangements of light-blocking areas corresponding to illuminators and detectors can be arranged across the integrated touch screen.

After the angularly filtered light is detected by the micro-LEDs configured as detectors, the resultant illumination pattern (e.g., the touch or target location of a stylus) can be processed to compute various parameters (e.g., the centroid of the illumination pattern representing the touch or target location) and perform various operations (e.g., stylus tracking). However, the mere determination of one or more illumination patterns may not be sufficient to compute other parameters needed to perform accurate stylus operations, and may limit the functionality of the stylus as an input device. For example, determining the hover distance and the tilt angle of a stylus above a detection surface can enable additional and more accurate stylus operations.

Figure 7A:
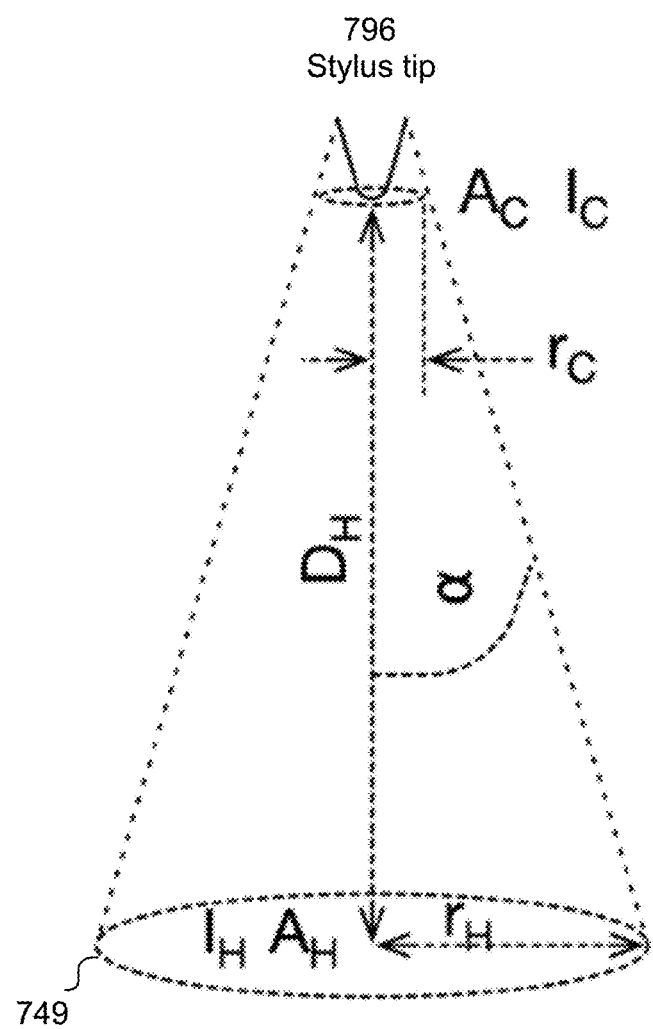
FIG. 7A illustrates a geometric perspective view of a stylus hovering in a perpendicular orientation with respect to a detection surface and generating an illumination pattern according to examples of the disclosure.

FIG. 7A illustrates a geometric perspective view of stylus 796 hovering in a perpendicular orientation with respect to a detection surface and generating an illumination area 749 according to examples of the disclosure. FIG. 7A represents the simplest orientation of a hovering stylus with zero tilt angle. As will be explained below, for a perpendicular stylus, given the known parameters of the light source (for an active stylus) and a determined mean light intensity $I_H$ determined at the detection surface, the hover distance $D_H$ can be computed. Hover distance $D_H$ is a function of the light intensity $I_c$ (e.g., illumination intensity) at the stylus and the projection of that light onto the detection surface, and is related to the ratio of the area of light projection at the stylus and the illumination area on the detection surface. In the geometric perspective view of FIG. 7A, $A_c$ is the known effective illumination area at the stylus tip, $I_c$ is the known illumination intensity at the stylus tip, $r_c$ is the known radius of the effective illumination area at the stylus tip, and $\delta$ is the known illumination divergence angle of the light emanating from the stylus tip. If the mean illumination intensity $I_H$ (and optionally the illumination area $A_H$ and the illumination radius $r_H$ at the detection surface) is determined from the illumination pattern captured and processed according to one of the modes for detecting received light described above, the hover distance $D_H$ can be computed as:

$$D_H = \frac{r_C}{\tan(\delta) * \sqrt{\frac{I_C}{I_H}}} \quad (1)$$

Figure 7B:
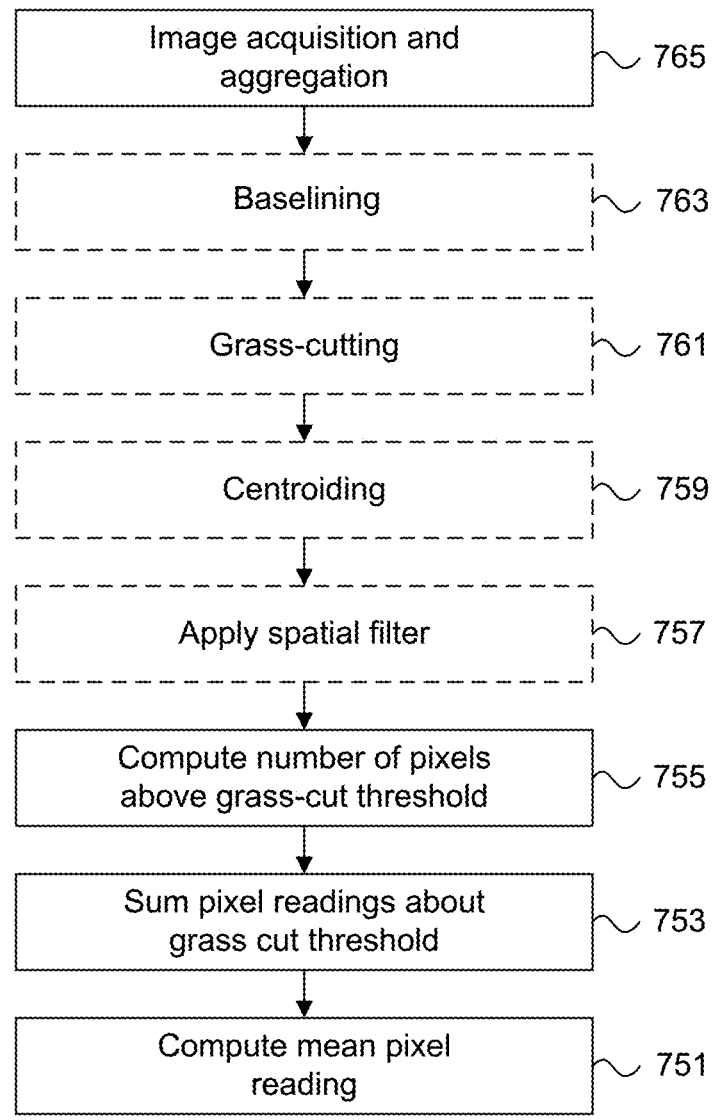
FIG. 7B illustrates a flow diagram for a method of computing the illumination pattern of a stylus oriented perpendicular to the detection surface according to examples of the disclosure.

FIG. 7B illustrates a flow diagram for a method of computing the illumination area or pattern of a stylus oriented perpendicular to the detection surface according to examples of the disclosure. Note that in the example of FIG. 7B, the illumination pattern is a cone. However, many other illumination structured patterns are possible, including axially symmetrical shapes such as a hollow cone, rectangular cone or star cone, which can yield circular, square or star-like projections onto the coverglass at zero tilt, and stretched versions at non-zero tilt. Illumination patterns may be chosen based on accuracy required, sensor pitch, etc. For example, a star pattern may yield improved detection of the azimuth (e.g., the angle between a vector representative of the direction of the stylus projected onto the x-y plane and a reference direction or vector on the x-y plane). Other detection algorithms, such as AI-based image recognition algorithms, could be used to disambiguate certain features in the structured illumination pattern. As for the detection algorithms described below, the ellipse algorithm is a structural algorithm that measures structural elements of the illumination pattern (e.g. circles and ellipses), while a Principal Component Analysis (PCA) based algorithm looks at the beam pattern distribution and associated statistics.

In the example of FIG. 7B, an image can be acquired at 765 by aggregating a plurality of illumination intensity results from a plurality of touch node electrodes (which may be referred to herein as pixels) configured and operating in accordance with one or more of the image acquisition modes described above. A two-dimensional image of pixels having non-zero illumination intensity values can be referred to herein as the illumination area or pattern, and a three-dimensional image of pixels having non-zero illumination intensity values, with the illumination intensity values plotted in a third dimension, can be referred to here as an irradiance profile. When operating in the DC photoconduction mode, baselining can optionally be performed at 763 to compensate for micro-LED dark current by removing the dark current contribution to the illumination signals in the irradiance profile. Grass-cutting can be optionally be performed at 761 to exclude noisy touch node electrodes (pixels) whose illumination intensity values are primarily caused by noise. To perform grass-cutting, an optionally adaptive grass-cutting threshold can be used to ignore pixels whose illumination intensity values are below the threshold. By removing such pixels, noise is removed from the computation of illumination patterns and other parameters such as the centroid of an illumination pattern, and the signal-to-noise ratio (SNR) can be increased. Optionally, the centroid and other parameters can then be computed from the optionally baselined, grass-cut pixels at 759. Spatial (and temporal) filtering can optionally be applied to the X and Y coordinates of the computed illumination patterns at 757 to eliminate some pixels from further computations based on their location in the integrated touch screen or within a touch node electrode, and based on the time of their capture. The number of pixels whose illumination intensity values exceed the grass-cut threshold can be determined at 755, and the illumination intensity values of those pixels can be summed at 753. The mean illumination intensity value $I_H$ can be computed at 751 by dividing the summed illumination intensity values by the number of pixels whose illumination intensity values exceed the grass-cut threshold (or by the ellipse area PI*a*b, with a and b being the major and minor semiaxis of the ellipse). This mean illumination intensity value $I_H$ can then by used in Equation (1) above to compute the hover distance $D_H$.

A stylus oriented perpendicular to the detection surface represents a simplified case of the more general and complex orientation of a stylus hovering a certain distance above the detection surface in an orientation (a tilt) that is not perpendicular with the detection surface.

Figure 8A:
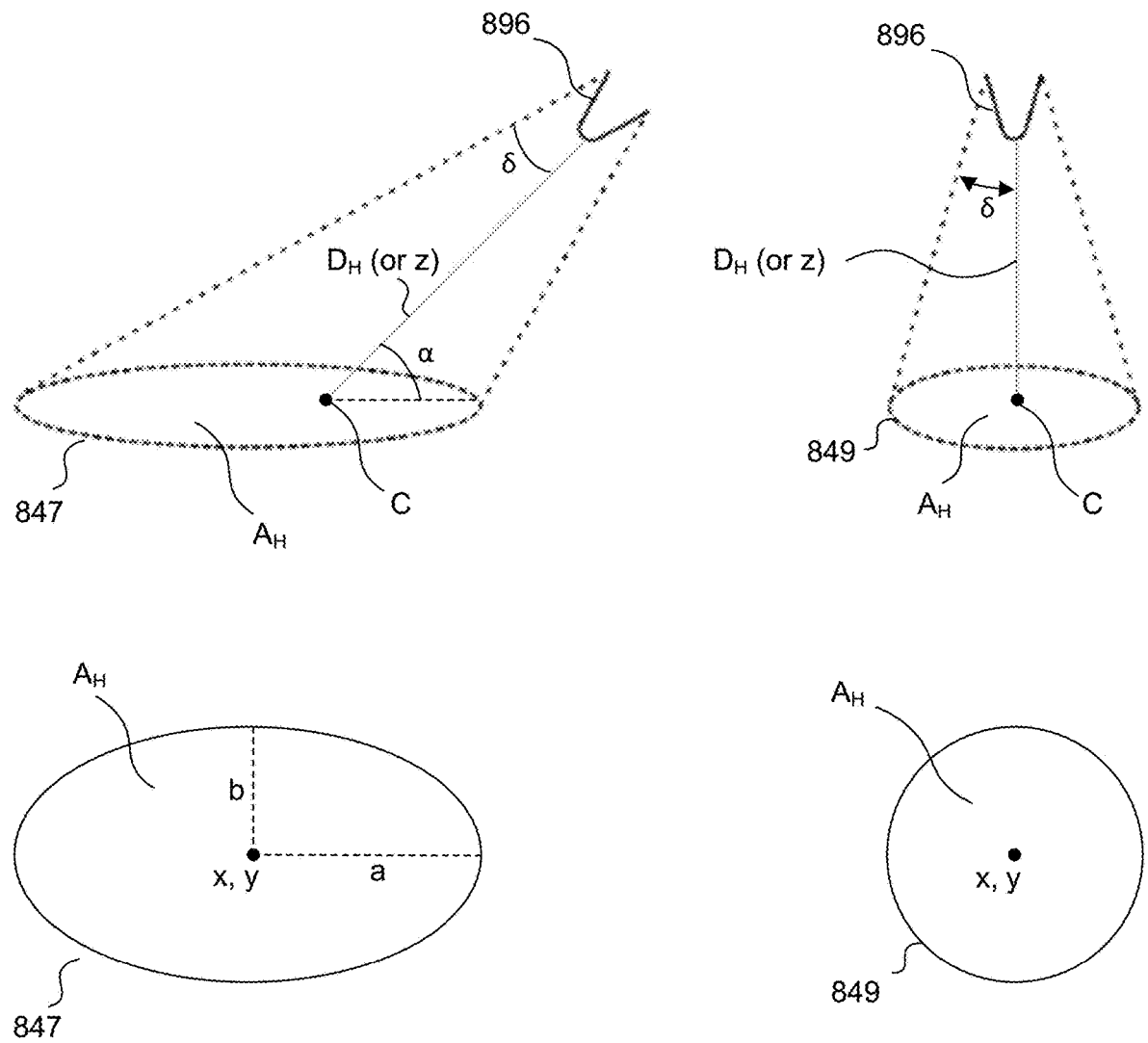
FIG. 8A illustrates a visual comparison between a perpendicular stylus and a tilted stylus and the elliptical illumination pattern created by the tilted stylus according to examples of the disclosure.

FIG. 8A illustrates a visual comparison between a perpendicular stylus and a tilted stylus and the elliptical illumination pattern created by the tilted stylus according to examples of the disclosure. In FIG. 8A, a stylus 896 oriented perpendicular to a detection surface produces a circular illumination pattern 849, and the hover distance $D_H$ can be computed by determining the illumination intensity $I_H$ of the illumination pattern as discussed above with respect to FIGS. 7A and 7B. However, when a stylus is tilted, the illumination pattern 847 becomes elliptical and the illumination area $A_H$ increases, and it may become necessary to compute the tilt angle and hover distance of the stylus. The light cone can be described by the following expression:

$$(\tan(\delta) \cdot (z \cdot \cos(\alpha) - x \cdot \sin(\alpha)))^2 = (z \cdot \sin(\alpha) + x \cdot \cos(\alpha))^2 + y^2 \quad (2)$$

where δ is the divergence angle of the light cone, α is the tilt angle of the light cone, and x, y and z are the coordinates in x, y and z, respectively. For example, for z<0, a divergence angle of 22.5 deg. and tilt angle of 0 deg. and 45 deg., the projection on the sensor area can be round and elliptical, respectively, as shown in FIG. 8A.

Figure 8B:
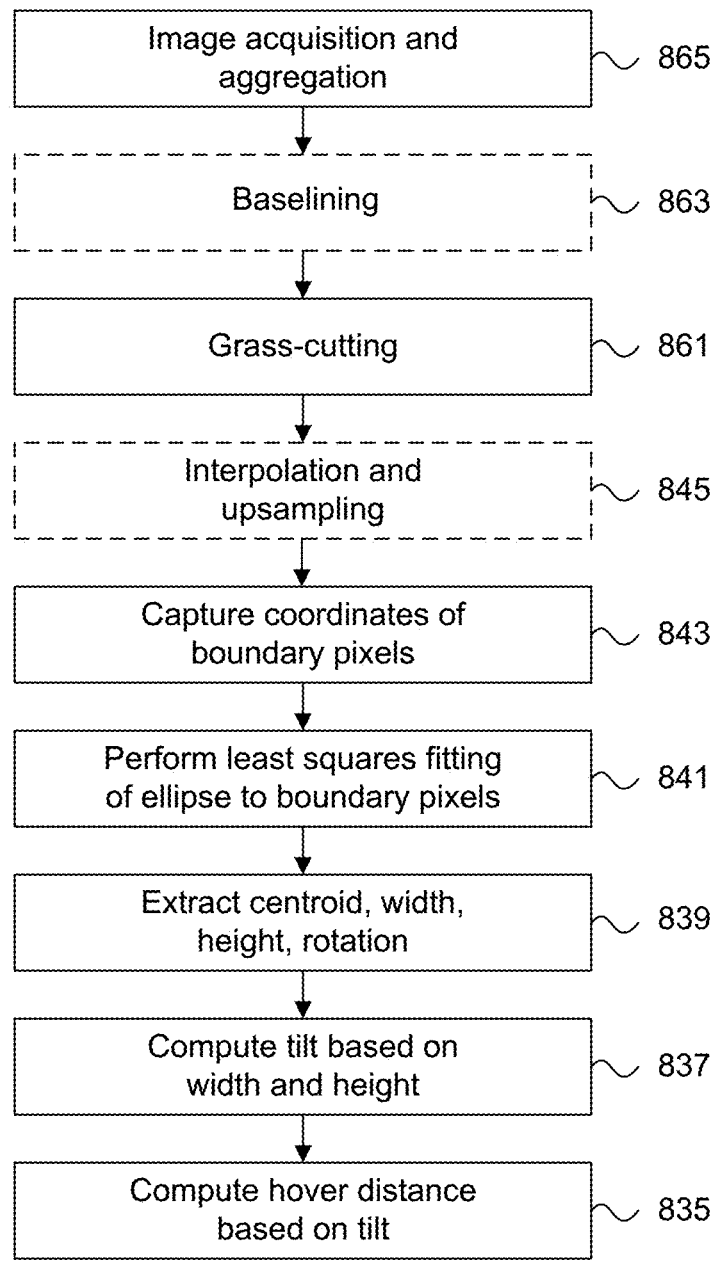
FIG. 8B illustrates a flow diagram for a method of computing the illumination pattern of a stylus that is tilted with respect to the detection surface according to examples of the disclosure.

FIG. 8B illustrates a flow diagram for a method of computing the illumination pattern of a stylus that is tilted with respect to the detection surface according to examples of the disclosure. In the example of FIG. 8B, an image can be acquired at 865 by aggregating a plurality of illumination intensity values from a plurality of touch node electrodes (pixels) configured and operating in accordance with one or more of the image acquisition modes described above. When operating in the DC photoconduction mode, baselining can optionally be performed at 863 to compensate for micro-LED dark current by removing the dark current contribution to the illumination intensity values. Grass-cutting can be performed at 861 to exclude noisy pixels whose illumination value is primarily caused by noise. To perform grass-cutting, an optionally adaptive grass-cutting threshold can be used to ignore pixels whose illumination intensity values are below the threshold by setting those noisy pixels to have a zero illumination intensity value. By removing such pixels, noise is removed from the computation of illumination patterns and other parameters such as the centroid of an illumination pattern, and the signal-to-noise ratio (SNR) can be increased. The illumination intensity values of those pixels above the grass-cutting threshold can optionally be interpolated and up-sampled at 845 to increase the granularity of the illumination pattern. The coordinates of boundary pixels can be captured at 843, and a least squares fitting of an ellipse can be applied at 841 to the boundary pixels. After the ellipse is computed, parameters such as the centroid, width, height and rotation of the ellipse can be extracted at 839, and the tilt of the stylus can be computed at 837 based on the width and height of the ellipse. The hover distance of the stylus can then be computed from the tilt at 835. These steps will be discussed in greater detail below.

Figure 9A:
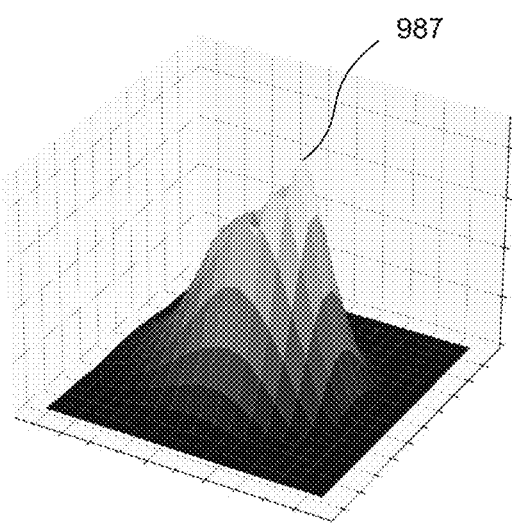
FIG. 9A illustrates an irradiance profile of a plurality of touch node electrodes in a portion of an integrated touch screen according to one example of the disclosure.

FIG. 9A illustrates irradiance profile 987 of a plurality of touch node electrodes in a portion of an integrated touch screen according to one example of the disclosure. FIG. 9A is a three-dimensional plot of an array of touch node electrodes arranged on the X-Y plane and the illumination intensity of those touch node electrodes along the Z axis. In one example, each touch node electrode in the array dimensions of 1.25 mm×1.25 mm. In the example of FIG. 9A, irradiance profile 987 can be the result of one or more of the operations 865, 863 and 861 in FIG. 8B, such that an illumination signal from all touch node electrodes have been acquired, aggregated and grass-cut, such that all touch node electrodes with an illumination intensity below the grass-cut threshold are set to zero.

Figure 9B:
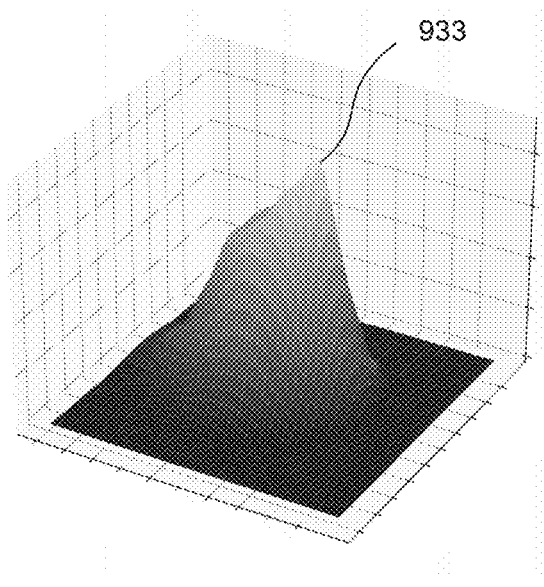
FIG. 9B illustrates an irradiance profile after interpolation and up-sampling has been performed on the irradiance profile of FIG. 9A to increase the granularity of the illumination pattern according to one example of the disclosure.

FIG. 9B illustrates irradiance profile 933 after interpolation and up-sampling has been performed on the irradiance profile 987 of FIG. 9A to increase the granularity of the illumination pattern according to one example of the disclosure. The irradiance profile of FIG. 9B can be the result of operation 845 in FIG. 8B. In general, interpolation is used to estimate a function y=f(x) based on a given distribution of N points $(x_i, y_i)$ where i=0 . . . N−1 and $x_{grid}=(x_i-x_{i+1})$ is the uniform grid pitch, and then after the estimation, evaluate the resulting function at a finer resolution over M points $(x_j, y_j)$ where j=0 . . . M−1 and M/N>1 is the upsampling ratio and $x_j-x_{j+1}$ is the finer grid, wherein the process is performed across all rows and columns of the captured image. In some examples, linear interpolation can be employed, where the function y=f(x) is approximated with a linear function, e.g., $y(x)=m*x+y_0$, piecewise between points $x_i$, $x_i+1$, where i=0 to N−2. In some examples, non-linear polynomial interpolation can be employed, where the function y=f(x) is approximated with a non-linear (e.g., $3^{rd}$ order) polynomial function, e.g., $y(x)=a_0+a_1*x+a_2*x^2+a_3*x^3$, where $a_0$, $a_1$ and $a_2$ are the polynomial coefficients and y(x) is derived based on all points $(x_i, y_i)$ where i=0 . . . N−1. In some examples, nonlinear spline (cubic) interpolation can be employed, where the function y=f(x) is approximated with a non-linear (e.g., $3^{rd}$ order) spline between points $x_i$, $x_{i+1}$, where i=0 to N−2 and the slope at points $x_i$ is consistent, guaranteeing that the piecewise interpolated function is smooth. Cubic interpolation is used to effectively increase the sampling rate several times in both x and y in order to get more spatial resolution of the boundary pixels. In general terms, cubic interpolation receives the irradiance profile of the illumination pattern (e.g., the profile of the varying strengths of the illumination signals at every touch node electrode above the grass-cut threshold) and matches a third order polynomial to that profile. Alternatively, linear interpolation or $5^{th}$ order interpolation can be performed as well. After the polynomial is computed, the polynomial can be sub-sampled to increase the granularity of the irradiance profile. The result is much finer granularity than the granularity of a touch node electrode (e.g., much finer than 1.25 mm×1.25 mm).

Due to the interpolation and up-sampling, the number of samples in each of the X and Y directions can be increased an order of magnitude, in some examples. Intuitively, it can be seen from FIG. 9B that a boundary of the irradiance profile, which can be indicative of the illumination pattern and the presence of an object such as a hovering stylus, can be determined (in one example) by identifying those illumination signals (from both actual touch node electrodes and up-sampled illumination signals) whose illumination intensity is non-zero (and optionally above some threshold value) and also adjacent to a neighboring touch node electrode whose illumination intensity has been set to zero due to grass-cutting.

Figure 9C:
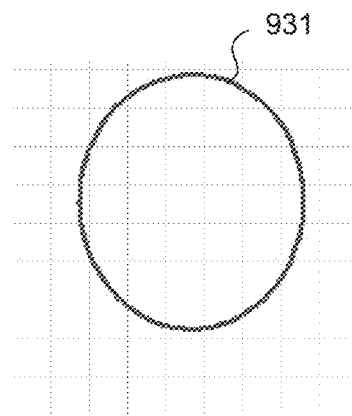
FIG. 9C illustrates a two-dimensional plot of those touch node electrodes that have been identified as boundary touch node electrodes in the irradiance profile of FIG. 9B according to one example of the disclosure.

FIG. 9C illustrates two-dimensional plot 931 of those touch node electrodes that have been identified as boundary touch node electrodes in the irradiance profile 933 of FIG. 9B according to one example of the disclosure. Boundary plot 931 can be the result of operation 843 in FIG. 8B. In the example of FIG. 9C, because of the earlier interpolation and up-sampling and the increased number of illumination signal samples, the identified boundary can be generally elliptical in shape, though with irregular edges due to the individual touch node electrode boundary determinations.

Figure 9D:
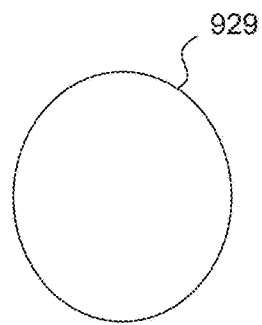
FIG. 9D illustrates an ellipse that is the result of fitting an ellipse to the boundary plot of FIG. 9C according to one example of the disclosure.

FIG. 9D illustrates ellipse 929 that is the result of fitting an ellipse to boundary plot 931 of FIG. 9C according to one example of the disclosure. Ellipse 929 can be the result of operation 841 in FIG. 8B. In one example, a least squares fitting of an ellipse to boundary plot 931 can be performed in accordance with the algorithm described in an article entitled "Numerically Stable Direct Least Squares Fitting of Ellipses" by Halir and Flusser, 1998, the entire contents of which are incorporated by reference in its entirety for all purposes. Note that for the general expression of an ellipse, $F(x,y)=ax^2+bxy+cy^2+dx+ey+f=0$, F(x,y) is defined as the geometric distance, which is essentially the deviation of points $(x_i, y_i)$ from the fitted ellipse. For the points $(x_i, y_i)$ that are not on the fitted ellipse, the polynomial F(x) is not zero. For the points $(x_i, y_i)$ that are on the ellipse, then F(x, y)=0. The purpose of the algorithm is essentially to derive parameters a to f where $F(x_i, y_i)$ is LMS minimized across all points I=0 to N−1 (where N is 20 is one example. The general expression of an ellipsoid in matrix format is Fa(x)= x*a=0, and the general expression for least mean square estimation is:

$$\min_a \sum_{i=1}^{N} F(x_i, y_i)^2 = \min_a \sum_{i=1}^{N} (F_a(x_i))^2 \quad (3)$$
$$= \min_a \sum_{i=1}^{N} (x_i \cdot a)^2$$

The purpose is to minimize the mean sum of the squares of the geometric distances between points $(x_i, y_i)$ to the ellipse as a function of parameters a to f.

Figure 9E:
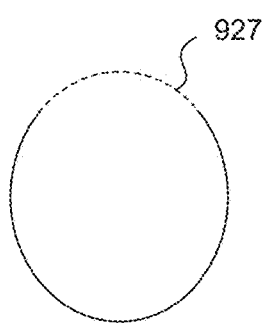
FIG. 9E illustrates an ellipse that is the result of fitting an ellipse to the boundary plot of FIG. 9C, except in the instance where the boundary plot is incomplete according to one embodiment of the disclosure.

FIG. 9E illustrates ellipse 927 that is the result of fitting an ellipse to the boundary plot 931 of FIG. 9C, except in the instance where boundary plot 931 is incomplete in the dashed area of FIG. 9E according to one embodiment of the disclosure. Although not shown in FIG. 9C, in some instances a complete boundary cannot be constructed from illumination data, such as when a stylus is located near an edge of an integrated touch screen and therefore does not cause light be detected over a complete elliptical illumination pattern. In such an instance, the ellipse fitting algorithm may still be able to generate the mathematical expression for a full ellipse 927 based on partial boundary data. After the mathematical expression for the ellipse is generated, all points on the ellipse can be estimated, including the missing portion indicated by a dashed line, although with a possible loss of fidelity. The azimuth of the optical stylus can be computed as $\tan(2\phi)=b/(a-c)$, where parameters a, b and c are the parameters from the general expression of the ellipse.

Referring again to FIG. 8B, after the mathematical expression for the ellipse is generated at 841, all points along the ellipse can be computed, and parameters such as the centroid, width, height and rotation of the ellipse (relative to the X or Y axis) can be computed at 839. The tilt of the stylus can be computed at 837 based on the width and height of the ellipse, and the hover distance of the stylus can then be computed from the tilt at 835, as will be explained in further detail below.

The general form of an ellipse is:

$$\frac{(x-x_C)^2}{a^2} + \frac{(y-y_C)^2}{b^2} = 1 \quad (4)$$

where $x_c$ and $y_c$ represent the coordinates of the center of the ellipse. With the following substitutions for a, b, $x_c$ and $y_c$ the following equations are obtained:

$$x_C = \frac{z}{2} \cdot \left( \frac{(\cos(\alpha) \cdot \tan(\delta) + \sin(\alpha))}{(-\cos(\alpha) + \sin(\alpha) \cdot \tan(\delta))} + \frac{(\cos(\alpha) \cdot \tan(\delta) - \sin(\alpha))}{(\cos(\alpha) + \sin(\alpha) \cdot \tan(\delta))} \right) \quad (5)$$

$$y_C = 0$$

$$a = \frac{z}{2} \cdot \left( \frac{(\cos(\alpha) \cdot \tan(\delta) + \sin(\alpha))}{(-\cos(\alpha) + \sin(\alpha) \cdot \tan(\delta))} - \frac{(\cos(\alpha) \cdot \tan(\delta) - \sin(\alpha))}{(\cos(\alpha) + \sin(\alpha) \cdot \tan(\delta))} \right) \quad (6)$$

$$b = sqrt\left( \left( \tan(\delta) \cdot \sin(\alpha) \cdot \left( z \cdot \frac{\cos(\alpha)}{\sin(\alpha)} - x_c \right) \right)^2 - \cos(\alpha) \cdot \left( z \cdot \frac{\sin(\alpha)}{\cos(\alpha)} + x_c \right)^2 \right)$$

where z is the hover distance (also referred to as $D_H$ herein). For a tilted stylus, given the known divergence angle $\delta$ of the light source at the stylus, after the ellipse length a and width b are extracted from the boundary data, the values of a and b can be plugged into the ellipse equations above and solved for tilt angle $\alpha$ and hover distance z.

However, because there are two equations and two unknowns, an a/b ratio can be computed as:

$$\frac{a}{b} = \frac{z}{2} \cdot \frac{\left( \frac{(\cos(\alpha) \cdot \tan(\delta) + \sin(\alpha))}{(-\cos(\alpha) + \sin(\alpha) \cdot \tan(\delta))} - \frac{(\cos(\alpha) \cdot \tan(\delta) - \sin(\alpha))}{(\cos(\alpha) + \sin(\alpha) \cdot \tan(\delta))} \right)}{sqrt\left( \left( \tan(\delta) \cdot \sin(\alpha) \cdot \left( z \cdot \frac{\cos(\alpha)}{\sin(\alpha)} - z \cdot x_{c0} \right) \right)^2 - \left( \cos(\alpha) \cdot \left( z \cdot \frac{\sin(\alpha)}{\cos(\alpha)} + z \cdot x_{c0} \right) \right)^2 \right)} \quad (7)$$

wherein the hover distance z is isolated in both the numerator and denominator using the substitution:

$$x_{C0} = \frac{1}{2} \cdot \left( \frac{(\cos(\alpha) \cdot \tan(\delta) + \sin(\alpha))}{(-\cos(\alpha) + \sin(\alpha) \cdot \tan(\delta))} + \frac{(\cos(\alpha) \cdot \tan(\delta) - \sin(\alpha))}{(\cos(\alpha) + \sin(\alpha) \cdot \tan(\delta))} \right) \quad (8)$$

where $x_{c0}$ is the x-axis coordinate of the center of the ellipse, set to zero. By pulling the hover distance z in the denominator out of the sqrt( ) term, z can be eliminated, leading to the expression:

$$\frac{a}{b} = \frac{\left( \frac{(\cos(\alpha) \cdot \tan(\delta) + \sin(\alpha))}{(-\cos(\alpha) + \sin(\alpha) \cdot \tan(\delta))} - \frac{(\cos(\alpha) \cdot \tan(\delta) - \sin(\alpha))}{(\cos(\alpha) + \sin(\alpha) \cdot \tan(\delta))} \right)}{2 \cdot sqrt\left( \left( \tan(\delta) \cdot \sin(\alpha) \cdot \left( \frac{\cos(\alpha)}{\sin(\alpha)} - x_{c0} \right) \right)^2 - \left( \cos(\alpha) \cdot \left( \frac{\sin(\alpha)}{\cos(\alpha)} + x_{c0} \right) \right)^2 \right)} \quad (9)$$

In Equation (9), the ratio a/b is now purely a function of divergence angle $\delta$ and the tilt angle $\alpha$, but because the divergence angle $\delta$ is known, the equation can be solved for the tilt angle $\alpha$. In some embodiments of the disclosure, rather than having these computations performed by one or more processors, a lookup table can be generated and stored in the computing device that produces the tilt angle $\alpha$ when the ellipse length a and width b are provided. In some examples, a separate lookup table can be stored for different divergence angles $\delta$ of different expected styluses and their known light sources.

With the tilt angle $\alpha$ now known, the hover distance z can be computed using Equation (6):

$$b = sqrt\left( \left( \tan(\delta) \cdot \sin(\alpha) \cdot \left( z \cdot \frac{\cos(\alpha)}{\sin(\alpha)} - z \cdot x_{c0} \right) \right)^2 - \left( \cos(\alpha) \cdot \left( z \cdot \frac{\sin(\alpha)}{\cos(\alpha)} + z \cdot x_{c0} \right) \right)^2 \right) \quad (10)$$

and the substitution of Equation (8). In some examples, Equation (8) for ellipse width b can be selected for use because as the stylus is tilted, the illumination profile drops off (less illumination intensity will be detected) with increasing distance between the stylus and the detection surface (e.g., at the far end of the ellipse). The ellipse width b can be used because the light level around the minor axis at the ellipse width b will remain fairly constant over increasing stylus tilt angle $\alpha$. Solving for the hover distance z leads to:

$$z = \frac{b}{sqrt\left(\left(\tan(\delta)\cdot\sin(\alpha)\cdot\left(\frac{\cos(\alpha)}{\sin(\alpha)} - x_{c0}\right)\right)^2 - \left(\cos(\alpha)\cdot\left(\frac{\sin(\alpha)}{\cos(\alpha)} + x_{c0}\right)\right)^2\right)} \quad (11)$$

In some embodiments of the disclosure, rather than having these computations performed by one or more processors, a lookup table can be generated and stored in the computing device that produces the hover distance z when the ellipse width b is provided. In some examples, a separate lookup table can be stored for different divergence angles S of different expected styluses and their known light sources.

Figure 8C:
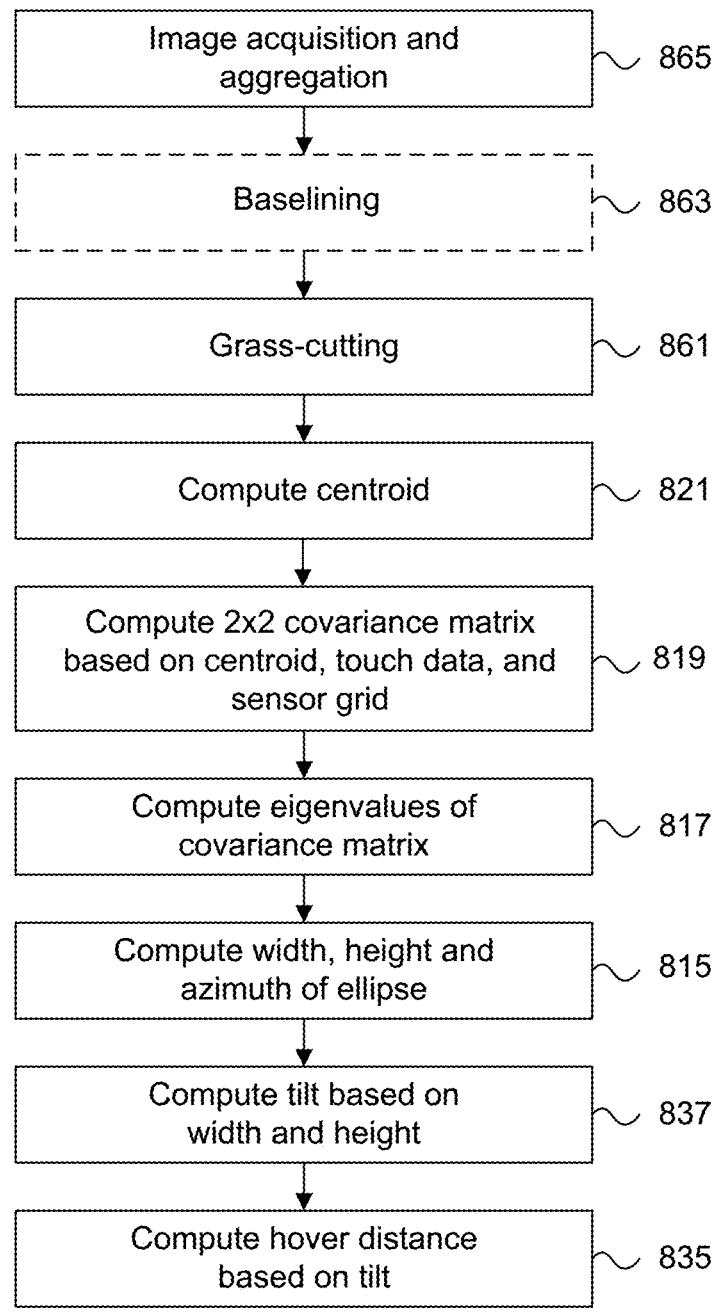
FIG. 8C illustrates a flow diagram for an alternative method of computing the illumination pattern of a stylus that is tilted with respect to the detection surface according to examples of the disclosure.

FIG. 8C illustrates a flow diagram for an alternative method of computing the illumination pattern of a stylus that is tilted with respect to the detection surface according to examples of the disclosure. Instead of using the ellipse fitting portion of FIG. 8B involving interpolating and up-sampling the illumination intensity values of those pixels above the grass-cutting threshold, capturing the coordinates of boundary pixels, performing a least squares fitting of an ellipse to the boundary pixels, and extracting the centroid, width, height, and rotation of the ellipse (e.g., blocks 845, 843, 841 and 839 of FIG. 8B), a Principal Component Analysis (PCA) methodology is used.

In the example of FIG. 8C, the centroid of the pixels above the grass-cutting threshold is computed at 821. A 2×2 covariance matrix (a measure of the relationship between variables) can be computed at 819 that is based on the computed centroid, the touch data (e.g., the pixels above the grass-cutting threshold; the irradiance profile), and the sensor grid. The 2×2 covariance matrix can be represented as:

$$\begin{bmatrix} C_{xx} & C_{xy} \\ C_{yx} & C_{yy} \end{bmatrix} \quad (12)$$

where $C_{xx}$ and $C_{yy}$ are the variance of touch data in X and Y, respectively, $C_{xy}$ is the covariance in data between x and y, and $C_{yx}=C_{xy}$.

The eigenvalues of the covariance matrix are then computed at 817. The eigenvalues of the covariance matrix can be represented as $det(A-\lambda *I)=0$, where det is the determinant, A is the covariance matrix, $\lambda$ are the eigenvalue(s), and I is the identity matrix. The computation of the eigenvalues will yield a quadratic equation with two solutions, one for each semi-axis. The actual width (a) and height (b) of an ellipse that fits the captured and grass-cut touch pixels can be computed from the eigenvalues at 815 as $a=SQRT(\beta *\lambda\ 1)$ and $b=SQRT(\beta *\lambda\ 2)$, where $\beta$ is a scaler that can be derived during calibration. The azimuth of a stylus that generates the elliptical illumination area can also be computed at 815 using arc $tan(\lambda\ 1-C_{xx},C_{xy})$. The remaining blocks, computing the tilt based on the width and height at 837, and computing the hover distance based on the tilt at 835, remain unchanged.

In some instances, the centroid computed at 821 can shift due to an imbalance of the beam profile when the stylus is tilted for a given azimuth as computed at 815. Therefore, in some examples, centroid compensation may be necessary to compensate for the offset between the stylus tip location and the computed centroid for a given tilt and azimuth. To accomplish this, in some examples a 2D lookup table can be allocated which contains x,y centroid offset correction as a function of stylus tilt and azimuth. The lookup table values can be derived as part of factory calibration where the offset between stylus tip location and centroid is captured across the tilt and azimuth range. The centroid offset correction can then be applied to the centroid to complete the centroid compensation.

In some examples, the choice of whether to use an ellipse fitting methodology (FIG. 8B) or a PCA methodology (FIG. 8C) can depend on the location of the stylus with respect to the sensor. In some instances, the PCA methodology may not be as accurate when part of the illumination profile is outside of the sensor area, as in the example of FIG. 9E. Thus, in some examples, when part of the illumination pattern is outside of the sensor area (e.g., on an edge or corner), the ellipse fitting methodology of FIG. 8B can be used, but if the illumination pattern is within the sensor area, the PCA methodology of FIG. 8C can be used.

As discussed above with respect to FIG. 5A, light generated from illuminators in an optical sensing system can impinge upon a passive stylus in contact with a detection surface of the optical sensing system and reflect back to detectors in the optical sensing system at any number of reflection angles (if no angular filtering is employed). However, in alternative embodiments of the disclosure, passive styluses with various reflective surfaces can be employed to reflect light with a consistent angular reflection profile and/or pattern, as will be discussed below. These reflection profiles can be evaluated to determine one or more of the touch location, hover distance, tilt angle, orientation and rotation of the stylus.

FIG. 10A illustrates a cross-sectional view of a portion of an optical stylus system with passive diffusive reflector stylus 1000 and optical sensing system 1002 with an array of optical light emitting and/or detecting devices 1004 according to some examples of the disclosure. Optical devices 1004 can include separate light emitting devices and light detecting devices, or devices that can be configured as either light emitting or light detecting devices, or combinations thereof. As used herein, light emitting devices can refer to either exclusively light emitting devices or devices that have been configured as light emitting devices, and light detecting devices can refer to either exclusively light detecting devices or devices that have been configured as light detecting devices. In the example of FIG. 10A, passive diffusive reflector stylus 1000 (only a portion of which is shown in FIG. 10A) includes a stylus body with a tip and sides, with at least a portion of the tip and sides having diffusive reflective surface 1006 that reflects light 1008 emitted from light emitting devices 1004 in optical sensing system 1002 at various locations along the tip and sides of the stylus body. Reflected light 1008 from the various locations can exhibit diffuse reflection within a relatively wide (e.g., >90 degrees) but consistent angular reflection profile (range of reflection angles) 1010 regardless of the stylus tilt angle γ with respect to a surface normal (a vector perpendicular to the surface of the optical sensing system). However, in other examples, diffusive reflective surface 1006 can be designed to reflect light with diffuse reflection within a relatively narrow angular reflection profile. In either instance, the angular reflection profile of reflected light can be consistent at the various locations of reflection to within manufacturing tolerances of diffusive reflective surface 1006, and in other examples can be consistent to within +/−1%, +/−2%, +−5%, +/−10%, or +/−20% across various locations of reflection. Different stylus tilt angles γ can generate different distributions of reflected light energy received at light detecting devices 1004, and these variations in reflected light energy across the surface of optical sensing system 1002 (reflected energy profiles) can be evaluated by one or more processors executing software or firmware within the optical sensing system to determine the target location, hover distance (if any) and tilt angle of the stylus.

In some examples, light emitting devices 1004 can be micro-LEDs (such as those described with respect to FIG. 4E) with illumination angles 1012 (e.g., +/−30 degrees) that are not subject to total internal reflection (e.g., angles up to the critical angle (in optics) of the surface material) and will not interfere with any other detection scheme being employed, such as water agnostic detectors, and yet provide an acceptable angular distribution when the light refracts into the surrounding air. In some examples, light emitting devices 1004 can be any type of device that generates light either in the visible, infrared or near-infrared spectrum. Near-infrared light emitting devices 1004 can generate light with wavelengths between 800 nm and 2500 nm, and in some examples between 980 nm and 1 micron, and in some specific implementations at 850 nm or 940 nm. However, in other embodiments, light emitting devices 1004 with wavelengths 1 micron and above, such as 1.3 microns (and corresponding light detecting devices) can be employed, as well as LEDs and detectors in the visible spectrum. In some examples, light detecting devices 1004 can be micro-LEDs configured as detectors such as those described with respect to FIGS. 4E and 4F.

Passive diffusive reflector stylus 1000 can utilize diffusive reflective surface 1006 to reflect light 1008 with an angular reflection profile 1010 that is invariant of the stylus tilt angle γ with respect to the surface normal. In some examples, diffusive reflective surface 1006 (e.g., a diffusive reflector) can be formed from a volumetric scattering material that reflects light within a desired angular reflection profile 1010. Diffusive reflective surface 1006 can be a matte or textured surface whose luminance can be isotropic and whose luminous intensity obeys Lambert's cosine law, and in some examples has a reflectance of greater than 99% over the range of near-infrared or visible light wavelengths (400-1500 nm) received at the surface (a Lambertian reflector). In some examples, diffusive reflective surface 1006 can be continuous and uniform across the portion of passive diffusive reflector stylus 1000 expected to be in contact with or in close proximity to optical sensing system 1002. However, in other examples, diffusive reflective surface 1006 can be designed to have different reflection characteristics in different areas of passive diffusive reflector stylus 1000 (e.g., concentric rings around the stylus wherein the reflection characteristics within each concentric ring are the same, but each ring has different reflection characteristics). In still other examples, diffusive reflective surface 1006 can be patterned to be present and absent in different areas of the stylus (e.g., columns of volumetric scattering material arranged along a length of the stylus that are separated by areas that are not diffusive), such that the energy profile of reflected light impinging on optical sensing system 1002 can vary in accordance with a distinct reflectivity pattern, creating a spatial signature that can be utilized by one or more processors executing software or firmware within the optical sensing system to determine stylus orientation and rotation. In some examples, the spatial signature of the reflected energy profile captured by the one or more processors can be tracked over time to determine stylus orientation (e.g., stylus static axial position with respect to optical sensing system 1002) and stylus rotation (e.g., pivoting about the axis of the stylus with respect to the optical sensing system).

FIG. 10B illustrates a cross-sectional view of a portion of an optical stylus system with passive diffusive reflector stylus 1000 and optical sensing system 1002 with a single light emitting device 1004 (for purposes of explanation only) according to some examples of the disclosure. In the example of FIG. 10B, passive diffusive reflector stylus 1000 (only a portion of which is shown in FIG. 10B) includes diffusive reflective surface 1006 that reflects light 1008 emitted from light emitting device 1004 in optical sensing system 1002, and has a stylus tilt angle γ with respect to the surface normal. It should be appreciated that as the stylus tilt angle changes, the energy profile of reflected light received at optical sensing system 1002 can change. Theta θ represents the angle of incidence of emitted light 1008 upon passive diffusive reflector stylus 1000, measured with respect to a stylus surface normal (a vector perpendicular to the surface of the stylus at the point of incidence), and Beta β represents a particular angle of light scatter within angular reflection profile 1010 off the stylus, measured with respect to the stylus surface normal.

FIG. 10C illustrates a plot of reflected light intensity versus angle of scatter R for light reflecting off passive diffusive reflector stylus 1000 according to some examples of the disclosure. In the example of FIG. 10C, it can be seen that reflected light intensity diminishes with increasing angle of scatter, the rolloff being a cosine function. Regardless of the angle of the incident ray θ, the angle of scatter β will have a cosine angular distribution.

Figures 1, 10D:
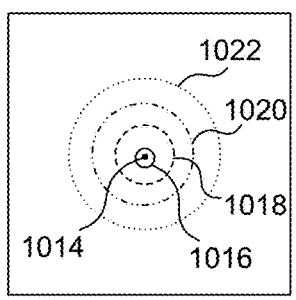
FIGS. 10D-1 to 10D-3 illustrate reflected energy profiles of light that has reflected off a diffusive reflective surface of a passive diffusive reflector stylus at three different tilt angles and is now impinging on an array of detectors in an optical sensing system according to examples of the disclosure.
Figures 2, 10D:
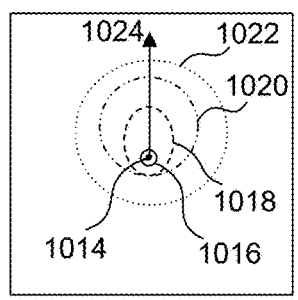
Figures 3, 10D:
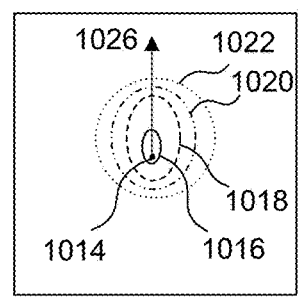

FIGS. 10D-1 to 10D-3 illustrate reflected energy profiles of light that has reflected off diffusive reflective surface 1006 of passive diffusive reflector stylus 1000 at three different tilt angles and is now impinging on an array of detectors in optical sensing system 1002 according to examples of the disclosure. When reflected light hits optical sensing system 1002, some of the light reflects off the surface of the optical sensing system, while the remainder of the light refracts and enters the optical sensing system, where it is received by an array of light detecting devices 1004. In some examples, light detecting devices are configured to detect light with near-infrared wavelengths. Because of the relatively wide angular distribution of light reflected off diffusive reflective surface 1006, the energy return to light detecting devices 1004 is relatively low. Examples of the energy profiles of the received reflected light when passive diffusive reflector stylus 1000 has a tilt angle of 0 degrees, 30 degrees, and 60 degrees are shown in FIGS. 10D-1 to 10D-3, respectively. As can be seen in FIG. 10D-1, when passive diffusive reflector stylus 1000 has a 0 degree tilt angle, the energy distribution of the reflected energy profile is relatively symmetrical around the stylus tip location 1014. However, as can be seen in FIGS. 10D-2 and 10D-3, as the tilt angle increases as represented by tilt vectors 1024 and 1026, respectively, the energy distribution becomes increasingly asymmetrical in the direction of tilt. Although the examples of FIGS. 10D-1 to 10D-3 represent energy profiles for all reflected light received at an array of light detecting devices 1004, in some examples, angular filters can be employed at the optical sensing system to restrict the light received at the light detecting devices to only certain angles and block unwanted light.

As the array of light detecting devices 1004 captures the energy level of reflected light, a plurality of thresholds can be used by one or more processors executing software or firmware within the optical sensing system to generate various energy distribution patterns from the reflected energy profiles. In the examples of FIGS. 10D-1 to 10D-3, a first energy threshold representing reflected energy above a certain amount (e.g., 0.0025 W/mm$^2$) can define pattern 1016, while a second energy threshold lower than the first energy threshold (e.g., 0.0010 W/mm$^2$) can define pattern 1018, a third energy threshold lower than the second energy threshold (e.g., 0.0005 W/mm²) can define pattern 1020, and a fourth energy threshold lower than the third energy threshold (e.g., 0.0002 W/mm²) can define pattern 1022. Algorithms can be applied to these patterns to determine the stylus contact location, whether passive diffusive reflector stylus 1000 is in contact with or hovering over optical sensing system 1002, stylus tilt direction, and the stylus angle of tilt. It should be understood that the thresholds and patterns described above and shown in FIGS. 10D-1 to 10D-3 are for purposes of illustration only, and that thresholds can be selected to define patterns that provide the most accurate information. For example, pattern 1016 does not provide a very clear indication of the direction of stylus tilt, as can be seen from the similar patterns in FIGS. 10D-1 (no tilt) and 10D-2 (some tilt). Instead, a threshold that defines pattern 1018 can be selected to provide a more accurate indication of the direction of stylus tilt. However, pattern 1016, which is a relatively small pattern of high reflected light energy, or alternatively its centroid, can be used to determine where passive diffusive reflector stylus 1000 is in contact with optical sensing system 1002. In another example, the distance between the centroid of pattern 1016 and the centroid of pattern 1018 can indicate the amount of stylus tilt, and a vector between those centroids can indicate the direction of tilt.

FIG. 11A illustrates a cross-sectional view of a portion of an optical stylus system with passive retroreflective stylus 1100 and optical sensing system 1102 with an array of optical light emitting and/or detecting devices 1104 according to some examples of the disclosure. In general, retroreflection occurs when a surface reflects a large portion of received light back to its source. Optical devices 1104 can include separate light emitting devices and light detecting devices, or devices that can be configured as either light emitting or light detecting devices, or combinations thereof. As used herein, light emitting devices 1104 can refer to either exclusively light emitting devices or devices that have been configured as light emitting devices, and light detecting devices 1104 can refer to either exclusively light detecting devices or devices that have been configured as light detecting devices. In the example of FIG. 11A, passive retroreflective stylus 1100 (only a portion of which is shown in FIG. 11A) includes a stylus body with a tip and sides, with at least a portion of the tip and sides having retroreflective surface 1106 that reflects light 1108 emitted from light emitting devices 1104 in optical sensing system 1102 at various locations along the tip and sides of the stylus body with a relatively narrow but consistent angular reflection profile (range of reflection angles) 1110 as compared to the angle of incoming light, regardless of the stylus tilt angle γ with respect to a surface normal (a vector perpendicular to the surface of the optical sensing system). This narrow angular reflection profile causes the reflected light to be returned parallel to, or substantially parallel to, the incoming light (e.g., toward the source of the incoming light). In one example, the angular reflection profile of reflected light (as compared to the incoming light) can be consistent at the various locations of reflection to within manufacturing tolerances of retroreflective surface 1106, and in other examples can be consistent to within +/−1%, +/−2%, +−5%, +/−10%, or +/−20% at the various locations of reflection. Different stylus tilt angles γ can generate different energy profiles of reflected light received at light detecting devices 1104, and these different reflected energy profiles can be evaluated by one or more processors executing software or firmware within optical sensing system 1102 to determine the target location, hover distance (if any) and tilt angle of the stylus.

In some examples, light emitting devices 1104 can be micro-LEDs (such as those described with respect to FIG. 4E) with illumination angles 1112 (e.g., +/−30 degrees) that are not subject to total internal reflection (e.g., angles up to the critical angle of the surface material) and will not interfere with any other detection scheme being employed, such as water agnostic detectors, and yet provide an acceptable angular distribution when the light refracts into the surrounding air. In some examples, light emitting devices 1104 can be any type of device that generates light either in the visible, infrared or near-infrared spectrum. Near-infrared light emitting devices 1104 can generate light with wavelengths between 800 nm and 2500 nm, and in some examples between 980 nm and 1 micron, and in some specific implementations at 850 nm or 940 nm. However, in other embodiments, light emitting devices 1104 with wavelengths 1 micron and above, such as 1.3 microns (and corresponding light detecting devices) can be employed, as well as LEDs and detectors in the visible spectrum. In some examples, light detecting devices 1104 can be micro-LEDs configured as detectors such as those described with respect to FIGS. 4E and 4F.

In general, retroreflective surface 1106 can be designed to shape the return distribution of reflected light, and return the reflected light in the direction of its source. In doing so, the energy level of the reflected light can be increased because more of the return energy is redirected and confined to light detecting devices in the general area of the stylus contact or hover location. In addition, by concentrating reflected light to the general area of the stylus contact or hover location, a more accurate and recognizable pattern of the stylus can be generated from the energy profile of the reflected light. To accomplish this, passive retroreflective stylus 1100 can utilize retroreflector facets 1130 (symbolically illustrated as triangles in FIG. 11A) on retroreflective surface 1106 or within a transparent stylus tip to reflect light 1108 emitted from light emitting devices 1104 in optical sensing system 1102 such that the reflected light 1110 is parallel to, or substantially parallel to, the incoming light. In some examples, retroreflector facets 1130 can be produced by forming a sawtooth pattern in retroreflective surface 1106 (e.g., a surface relief structure). Alternatively, retroreflector facets 1130 can be implemented as separate pyramid-shaped facets or depressions in retroreflective surface 1106. In either instance, the sawtooth pattern or pyramid-shaped depressions can be formed with interior surfaces that are at right angles (90 degrees) to produce retroreflection. Retroreflective surface 1106 can reflect light with an angular retroreflection profile and pattern that does not change even as the stylus tilt angle changes. In other words, whether incoming light is impinging on the side or the tip of the stylus, the reflected light will return at the same angle as the incident light (e.g., towards the source), regardless of stylus tilt.

In some examples, retroreflector facets 1130 can be continuously and uniformly formed across those portions of retroreflective surface 1106 on passive retroreflective stylus 1100 expected to be in contact with or in close proximity to optical sensing system 1102. However, in other examples, retroreflector facets 1130 can be patterned to be present and absent in different areas of retroreflective surface 1106, such that the energy profile of reflected light impinging on optical sensing system 1102 can vary in accordance with a distinct pattern and can be utilized by one or more processors executing software or firmware within the optical sensing system to determine stylus orientation and rotation. For example, in the rightmost passive retroreflective stylus 1100 in FIG. 11A, retroreflector facets 1130 are shown symbolically in a linear arrangement of diverging columns or asymmetric patterns. These columns or asymmetric patterns can be formed from a large number of retroreflector facets 1130 that reflect light back towards the direction of the emitted light. The reflections from these columns or patterns create columns, patterns or flares of high energy reflected light to impinge on optical sensing system 1102, creating a spatial signature that can be utilized by one or more processors executing software or firmware within the optical sensing system to determine stylus orientation and rotation. In some examples, the spatial signature of the reflected energy profile captured by the one or more processors can be tracked over time to determine stylus orientation (e.g., stylus static axial position with respect to optical sensing system 1102) and stylus rotation (e.g., pivoting about the axis of the stylus with respect to the optical sensing system).

FIG. 11B illustrates a symbolic representation of a cross-section of a retroreflector facet 1130 to illustrate the principles of retroreflection according to some examples of the disclosure. In the example of FIG. 11B, two opposing sides of retroreflector facet 1130 are formed at right angles. Incoming light 1108-A can impinge on a first side at a 45 degree angle with respect to a surface normal, reflect off that first side at a 45 degree angle, then impinge on a second side at a 45 degree angle, reflect off that second side at a 45 degree angle, and exit the retroreflector facet parallel to the incoming light. Similarly, incoming light 1108-B can impinge on the first side at an angle greater than 45 degrees with respect to the surface normal, reflect off both sides, and exit retroreflector facet 1130 parallel to the incoming light.

FIG. 11C-1 illustrates a portion of an optical stylus system with passive retroreflective stylus 1100 having a retroreflective surface 1106 including retroreflector facets 1130 according to some examples of the disclosure. In the example of FIG. 11C, retroreflector facets 1130 can be pyramid-shaped and can be arranged in an array that forms both gradually diverging columns of facets (generally along the axis of the stylus) and rings of increasing circumference around the axis of stylus 1100 (only a portion of which is shown in FIG. 11C-1). In some examples, retroreflector facets 1130 can be four-sided pyramids, with each interior surface forming a right angle with respect to its opposing surface to provide retroreflection, although in one variation, the pyramids can have cut-off points such that the back of the pyramid is a flat wall while still providing retroreflection in some instances. In some examples, retroreflector facets 1130 face outward and have an axis oriented normal to the surface or body of stylus 1100, with openings having edges that are either oriented in the same general direction as the axis of the stylus, or oriented perpendicular to the axis of the stylus. In other examples, some of the facets may be individually rotated around their own axes such that the facets have nonuniform orientations, or tilted on their axes such that they are oriented with a non-zero angle with respect to the surface normal of the stylus body, to provide a desired retroreflection at a particular location.

FIG. 11C-2 illustrates a retroreflector facet 1130 according to some examples of the disclosure. In the example of FIG. 11C-2, retroreflector facet 1130 is shown as a full four-sided pyramid, although in one variation mentioned above, the pyramid can be cut off at plane 1132 (e.g., cut off at the pyramid's tip or point). Each side 1134 of retroreflector facet 1130 can be formed at a 45 degree angle with respect to its planar opening, such that opposing sides are at right angles (note that FIG. 11C-2 is not to scale in this regard). In some examples, each retroreflector facet 1130 can have a 0.05 mm×0.05 mm opening, and adjacent retroreflector facets can have 0.25 mm center-to-center spacings, although other dimensions are also contemplated.

FIGS. 11D-1 to 11D-3 illustrate energy profiles for light that has reflected off retroreflective surface 1106 of passive retroreflective stylus 1100 at three different tilt angles and is now impinging on an array of detectors in optical sensing system 1102 according to examples of the disclosure. When reflected light hits the surface of optical sensing system 1102, some of the light reflects off the surface, while the remainder of the light refracts and enters the optical sensing system, where it is received by an array of light detecting devices 1104. In some examples, light detecting devices are configured to detect light with near-infrared wavelengths. Because of the relatively narrow angular distribution of light reflected off retroreflective surface 1106, the energy return to light detecting devices 1104 is relatively high as compared to a diffusive reflective surface. Examples of the energy profiles of the received reflected light when passive retroreflective stylus 1100 has a tilt angle of 0 degrees, 30 degrees, and 60 degrees are shown in FIGS. 11D-1 to 11D-3, respectively. As can be seen in FIG. 11D-1, when passive retroreflective stylus 1100 has a 0 degree tilt angle, the energy distribution of the reflected energy profile is relatively symmetrical around the stylus tip location 1114. However, as can be seen in FIGS. 11D-2 and 11D-3, as the tilt angle increases as represented by tilt vectors 1124 and 1126, respectively, the energy distribution becomes increasingly asymmetrical in the direction of tilt. Although the examples of FIGS. 11D-1 to 11D-3 represent energy profiles for all reflected light received at an array of light detecting devices 1104, in some examples, angular filters can be employed at the optical sensing system to restrict the light received at the light detecting devices to only certain angles and block unwanted light.

As the array of detectors captures the energy level of reflected light, a plurality of thresholds can be used by one or more processors executing software or firmware within the optical sensing system to generate various energy distribution patterns. In the examples of FIGS. 11D-1 to 11D-3, a first energy threshold representing reflected energy above a certain amount (e.g., 0.0025 W/mm$^2$) can define pattern 1116, while a second energy threshold lower than the first energy threshold (e.g., 0.0010 W/mm$^2$) can define pattern 1118, a third energy threshold lower than the second energy threshold (e.g., 0.0005 W/mm$^2$) can define pattern 1120, and a fourth energy threshold lower than the third energy threshold (e.g., 0.0002 W/mm$^2$) can define pattern 1122. Algorithms can be applied to these patterns to determine the stylus contact location, whether passive retroreflective stylus 1100 is in contact with or hovering over optical sensing system 1102, stylus tilt direction, and the stylus angle of tilt. It should be understood that the thresholds and patterns described above and shown in FIGS. 11D-1 to 11D-3 are for purposes of illustration only, and that thresholds can be selected to define patterns that provide the most accurate information. For example, pattern 1116 does not provide a very clear indication of the direction of stylus tilt, as can be seen from the similar patterns in FIGS. 11D-1 (no tilt) and 11D-2 (some tilt). Instead, a threshold that defines pattern 1118 can be selected to provide a more accurate indication of the direction of stylus tilt. However, pattern 1116, which is a relatively small pattern of high reflected light energy, or alternatively its centroid, can be used to determine where passive retroreflective stylus 1100 is in contact with the surface of optical sensing system 1102. In another example, the distance between the centroid of pattern 1116 and the centroid of pattern 1118 can indicate the amount of stylus tilt, and a vector between those centroids can indicate the direction of tilt.

Figure 12A:
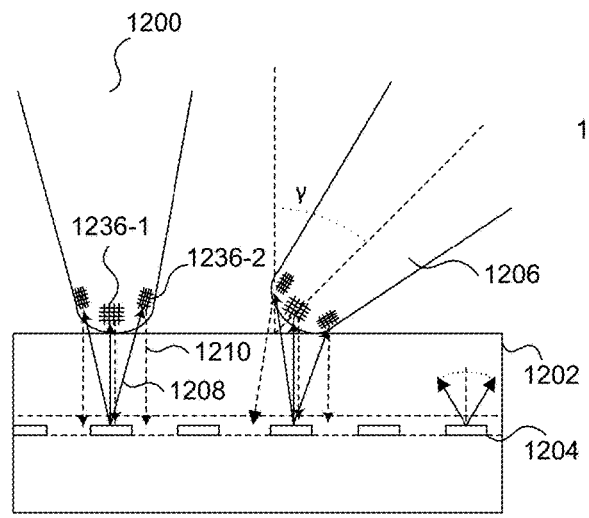
FIG. 12A illustrates a cross-sectional view of a portion of an optical stylus system with a passive diffractive reflector stylus and an optical sensing system with an array of light emitting and/or detecting devices according to some examples of the disclosure.

FIG. 12A illustrates a cross-sectional view of a portion of an optical stylus system with passive diffractive reflector stylus 1200 and optical sensing system 1202 with an array of light emitting and/or detecting devices 1204 according to some examples of the disclosure. In the example of FIG. 12A, passive diffractive reflector stylus 1200 (only a portion of which is shown in FIG. 12A) includes a stylus body with a tip and sides, with at least a portion of the tip and sides having diffractive reflective surface 1206 that reflects light 1208 emitted from light emitting devices 1204 in optical sensing system 1202 at various locations along the tip and sides of the stylus body such that the reflected light 1210 is returned back to the optical sensing system in a consistent reflected light pattern regardless of the stylus tilt angle γ with respect to a surface normal (a vector perpendicular to the surface of the optical sensing system). In one example, the reflected light patterns at the various locations of reflection can be consistent to within manufacturing tolerances of diffractive reflective surface 1206, and in other examples can be consistent to within +/−1%, +/−2%, +−5%, +/−10%, or +/−20% at the various locations of reflection. Different stylus tilt angles γ can generate different energy (or phase) distributions of reflected light patterns received at light detecting devices 1204, and these different energy (or phase) distributions (reflected energy profiles) of the reflected light patterns can be evaluated by one or more processors executing software or firmware within optical sensing system 1202 to determine one or more of the target location, hover distance (if any), tilt angle, orientation and rotation of the stylus.

In some examples, light emitting devices 1204 can be micro-LEDs (such as those described with respect to FIG. 4E) with illumination angles 1212 (e.g., +/−30 degrees) that are not subject to total internal reflection (e.g., angles up to the critical angle of the surface material) and will not interfere with any other detection scheme being employed, such as water agnostic detectors, and yet provide an acceptable angular distribution when the light refracts into the surrounding air. In some examples, light emitting devices 1204 can be any type of device that generates light in the visible, infrared or near-infrared spectrum. Near-infrared light emitting devices 1204 can generate light with wavelengths between 800 nm and 2500 nm, and in some examples between 980 nm and 1 micron, and in some specific implementations 850 nm or 940 nm. However, in other embodiments, other light emitting devices 1204 with wavelengths 1 micron and above, such as 1.3 microns (and corresponding light detecting devices) can be employed, as well as LEDs and detectors in the visible spectrum. In some examples, light detecting devices 1204 can be micro-LEDs configured as detectors such as those described with respect to FIGS. 4E and 4F and capable of detecting near-infrared light.

In general, diffractive reflective surface 1206 utilizes the wave nature of light to shape the return distribution of reflected light, and in essence return the reflected light in a pattern to optical sensing system 1202. In doing so, the energy level of the reflected light can be increased because more of the return energy is redirected and confined to a pattern at the light detecting devices in the general area of the stylus contact or hover location. In addition, by concentrating a reflected light pattern within the general area of the stylus contact or hover location, a more accurate and recognizable pattern of the stylus can be generated from the energy profile of the reflected light. To accomplish this, diffractive reflective surface 1206 can include stylus patterns 1236 (illustrated as an X-Y grid of materials of different (higher and lower) reflectivity in FIG. 12A) on the surface or within a transparent stylus tip to reflect light 1208 emitted from light emitting devices 1204 in optical sensing system 1202 such that the reflected light 1210 is returned back to the optical sensing system in a pattern. Although stylus patterns 1236 are illustrated as separate patches in FIG. 12A for simplicity, it should be understood that the stylus patterns can be continuously and uniformly formed across most or all of the stylus surface, or in other examples the patterns may be selectively formed on only some areas of the stylus surface. In some examples, stylus patterns 1236 can be a plurality of diffractive optical elements that are implanted into the curved tip of passive diffractive reflector stylus 1200 and optionally in the sides of the stylus. In various examples, the diffractive optical elements can be microstructures or other surface relief textures of different heights, kinoform surfaces, volume diffracting gratings, volume holograms, or reflective surface patterns without a surface profile but with varying amounts of reflectivity to produce both shiny and opaque areas. As shown in FIG. 12A, stylus patterns 1236 at different locations on stylus 1200 can reflect light back to optical sensing system 1202 in the general area of the stylus tip with a reflection pattern that does not change even as the stylus tilt angle changes. For example, whether emitted light is impinging on a stylus pattern 1236 on the tip of the stylus or the side of the stylus (due to stylus tilt), the same pattern of reflected light will appear at optical sensing system 1202 in the general area of the stylus tip. In some examples, the spatial signature of the reflected energy profile of the reflected light pattern captured by the one or more processors can be tracked over time to determine stylus orientation (e.g., stylus static axial position with respect to optical sensing system 1202) and stylus rotation (e.g., pivoting about the axis of the stylus with respect to the optical sensing system).

Figure 12B:
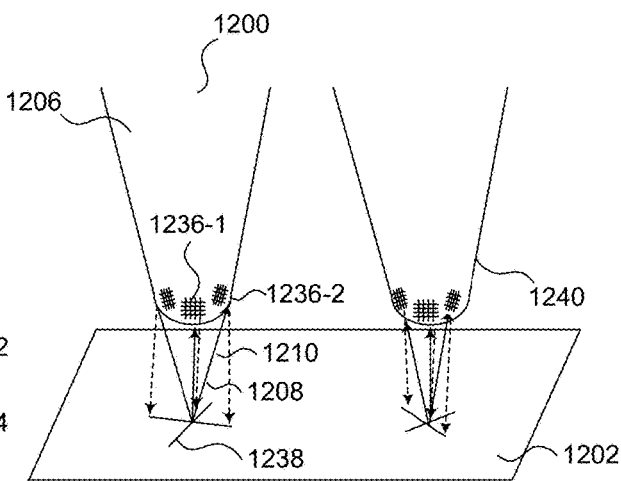
FIG. 12B illustrates a perspective view of a portion of an optical stylus system with a passive diffractive reflector stylus and an optical sensing system according to some examples of the disclosure.

FIG. 12B illustrates a perspective view of a portion of an optical stylus system with passive diffractive reflector stylus 1200 and optical sensing system 1202 according to some examples of the disclosure. In the example of FIG. 12B, passive diffractive reflector stylus 1200 (only a portion of which is shown in FIG. 12B) includes diffractive reflective surface 1206 with stylus patterns 1236 (symbolically illustrated as grids in FIG. 12B) that reflect light 1208 emitted from light emitting devices in optical sensing system 1202 such that the reflected light 1210 is returned back to the optical sensing system in reflected light pattern 1238 (illustrated as crosshairs in FIG. 12B). Although reflected light pattern 1238 appears to be a single crosshairs, the pattern can be a composite of multiple reflected light patterns reflected back to the general area of the stylus tip, where the wave nature of light is used to create constructive and destructive interference at optical sensing system 1202. In the crosshairs example of FIG. 12B, the two axes or dimensions of the crosshairs can be unique (e.g., different lengths, thicknesses, etc.) so that stylus orientation and rotation can be more easily tracked by one or more processors executing software or firmware within optical sensing system 1202. It should be understood that crosshairs is just an example, and that other patterns can be similarly utilized.

In addition, the number or density of features in reflected light pattern 1238 can be dependent on the number of light detecting devices 1204 utilized in optical sensing system

1202. For example, if the density of light detecting devices 1204 is relatively high, fewer features in reflected light pattern 1238 may be needed, and the arrangement of stylus patterns 1236 can be simplified (e.g., the density of the stylus pattern can be reduced), because small changes (e.g., rotations) of the sparse reflected light pattern can be detected with the dense array of light detecting devices. On the other hand, if the density of light detecting devices 1204 is relatively low, more features in reflected light pattern 1238 may be needed to enable small changes (e.g., rotations) in the pattern to be detected with the sparse array of light detecting devices. Different stylus rotations 1240 (and tilt angles not shown in FIG. 12B) can generate different orientations and energy profiles of reflected light patterns 1238, and these different orientations and energy profiles can be detected and evaluated to determine one or more of the target location, hover distance (if any), tilt angle, orientation and rotation of the stylus.

Figure 12C:
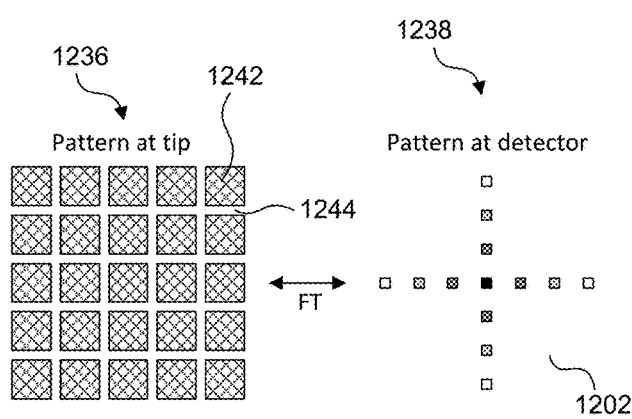
FIG. 12C illustrates a stylus pattern and a corresponding reflected light pattern appearing at an optical sensing system according to some examples of the disclosure.

FIG. 12C illustrates a stylus pattern 1236 and a corresponding reflected light pattern 1238 appearing at optical sensing system 1202 according to some examples of the disclosure. As noted above, stylus patterns 1236 can be microstructures that are implanted into the curved tip of passive diffractive reflector stylus 1200 and optionally in the sides of the stylus. In the example of FIG. 12C, stylus pattern 1236 is a grid of surface areas with higher reflectivity 1244 that separate surface areas of lower reflectivity 1242 that may be lithographically produced, but in other examples the pattern may be any arrangement of areas of lower and higher reflectivity (e.g., a binary pattern) that produces a detectable reflected light pattern 1238 at optical sensing system 1202. Alternatively, stylus pattern 1236 can be formed from areas of different characteristics where light is reflected back with different reflection phase shifts or changes, and light detecting devices 1204 can be designed to detect these phase shifts.

FIG. 12C also illustrates reflected light pattern 1238 resulting from light reflecting off stylus pattern 1236 located on passive diffractive reflector stylus 1200. As light reflects off the horizontal and vertical grids in stylus pattern 1236 and returns to optical sensing system 1202, the reflected light from these grids can become spherical waves that constructively and destructively interfere to form reflected light pattern 1238, with the strongest light energy at the origin of the pattern and crosshairs of lower light energy appearing on the horizontal and vertical axes. A Fourier transform relationship between stylus pattern 1236 and reflected light pattern 1238 can be exploited in the design phase to determine the stylus pattern for a given desired reflected light pattern, as will be explained in further detail below. Over sufficiently large distances, the light 1208 emitted from light emitting devices 1204 and impinging on stylus pattern 1236 on passive diffractive reflector stylus 1200 will be coherent (e.g., having the same frequency and waveform) and exhibit a diffraction effect as it reflects and returns to optical sensing system 1202 as a series of spherical waves with different diffraction orders, where it can combine and constructively interfere for specific multiples of the path length.

The condition for constructive interference is that the path lengths for two reflected light patterns are each multiples of the wavelength of the light within the coherence length of the light (though if the light is monochromatic (a single frequency), then coherence can be presumed). In the example of FIG. 12C, reflections off each of the slits or lines of higher reflectivity 1244 in a particular direction (either vertical or horizontal) in stylus pattern 1236 will produce cosine patterns in that direction. The reflections off the slits or lines in a particular direction can be combined at optical sensing system 1202 with different matching (or mismatched) path conditions based on their wavelengths, with the energy of the combined light being related to the cosine of the path length difference. As a result, the majority of destructive interference occurs within the quadrants of reflected light pattern 1238, while constructive interference occurs along the cardinal axes, producing crosshairs of varying reflected energy levels as shown in the example of FIG. 12C. By detecting the crosshairs (or other reflected light pattern 1238 generated as a result of stylus pattern 1236) and optionally the reflected energy levels within the crosshairs, one or more processors executing software or firmware within optical sensing system 1202 can determine one or more of the target location, hover distance (if any), tilt angle, orientation and rotation of the stylus.

Figure 12D:
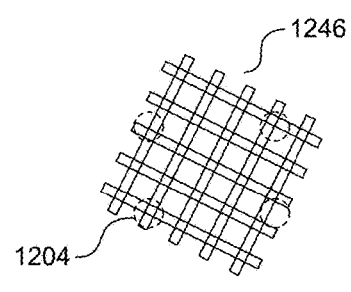
FIG. 12D illustrates an alternative reflected light pattern appearing at an optical sensing system according to some examples of the disclosure.

FIG. 12D illustrates an alternative reflected light pattern 1246 appearing at optical sensing system 1202 according to some examples of the disclosure. Although FIGS. 12B and 12C illustrate reflected light pattern 1238 having a single crosshairs, FIG. 12D illustrates an embodiment in which stylus patterns 1236 are designed to reflect light back to optical sensing system 1202 in a pattern of multiple distinct crosshairs. An array of light detecting devices 1204 can detect the amount of reflected light being received at each light detecting device. From these readings, a weighted reflected energy profile across the light detecting devices 1204 can be computed by one or more processors executing software or firmware within optical sensing system 1202, and the center of touch, orientation and rotation of passive diffractive reflector stylus 1200 can be determined. A dense reflected light pattern 1246 such as that shown in FIG. 12D can require fewer light detecting devices 1204 (e.g., a sparse array) to detect the location, hover distance (if any), tilt angle, orientation and rotation of the stylus, while a sparse reflected light pattern 1238 (e.g., a single crosshairs) such as that shown in FIGS. 12B and 12C can require more light detecting devices.

As noted above, the Fourier transform relationship between stylus pattern 1236 and reflected light pattern 1238 can be employed in the design phase to determine the stylus pattern at any particular location on passive diffractive reflector stylus 1200 for a given desired reflected light pattern. Stylus patterns 1236 can be determined by starting with a desired reflected light pattern 1238 (e.g., crosshairs or other pattern) to appear on a surface of optical sensing system 1202, which itself may represent a design tradeoff between the number of light detecting devices 1204 in optical sensing system 1202 and the complexity (e.g., number of features) in the reflected light pattern. After the desired reflected light pattern 1238 is identified, a Fourier transform can be performed on the desired reflected light pattern to generate stylus pattern 1236 at various locations around passive diffractive reflector stylus 1200, in some instances taking into account locational parameters such as the light reflection angle and the path length of the reflected light. For example, to determine stylus pattern 1236 that should be formed at a particular location on the side of passive diffractive reflector stylus 1200 such that it produces a desired reflected light pattern 1238 at the general location of the stylus tip, a Fourier transform can be performed on the desired reflected light pattern to identify a particular stylus pattern at the particular location on the side of the stylus. The identified stylus pattern 1236 at the particular location on the side of passive diffractive reflector stylus 1200 can be a modified version of the default stylus pattern at the stylus tip, including changes to one or more of the orientation of the pattern, a compression of the pattern, or a tilting of the pattern with respect to the surface normal of the stylus. This modification is illustrated in FIG. 12A, where modified stylus pattern 1236-2 is a modified version of default stylus pattern 1236-1 at the stylus tip. Additionally, the generation of stylus patterns 1236 can be dependent on whether spherical or plane waves are impinging on passive diffractive reflector stylus 1200. For example, spherical waves can require an incremental change in the spacing of features (e.g., producing a chirp (a change in frequency or spacing) in the grids) of stylus pattern 1236 at various positions on the stylus surface.

FIG. 13A illustrates a plan view of a portion of optical sensing system 1302 including an array 1350 of light emitting devices 1304 operative with a semi-active light detecting stylus according to some examples of the disclosure. In the example of FIG. 13A, each light emitting device 1304 in array 1350 can emit light at a particular modulation frequency, such that within the array, light at a plurality of different modulation frequencies can be emitted from a plurality of light emitting devices. In some examples, each light emitting device 1303 can emit light at a different modulation frequency, but in other examples, a group of light emitting devices (e.g., either a closely spaced cluster of devices, or a spread of devices) can emit light at the same modulation frequency, while other groups can emit light at different modulation frequencies. The semi-active light detecting stylus, described in more detail below, can received the modulated light from those light emitting devices 1304 in proximity to the stylus. One or more processors executing software or firmware within the optical stylus (e.g., within a computing system similar to the system shown in FIG. 2B that is within the semi-active light detecting stylus) can determine the amplitudes of the received light at the various modulation frequencies, and utilize the amplitude information to determine the location of the stylus at optical sensing system 1302. By equipping the stylus with only a receiver instead of a transceiver, low energy return signals from the stylus can be avoided, and the higher energy signals received at the semi-active stylus can enable an improved signal-to-noise ratio (SNR) of the detected signal.

In some examples, light emitting devices 1304 can be micro-LEDs (such as those described with respect to FIG. 4E) with illumination angles 512 (e.g., +/−30 degrees) that are not subject to total internal reflection (e.g., angles up to the critical angle of the surface material) and will not interfere with any other detection scheme being employed, such as water agnostic detectors, and yet provide an acceptable angular distribution when the light refracts into the surrounding air. In some examples, light emitting devices 1304 can be any type of device that generates light either in the visible, infrared or near-infrared spectrum. Near-infrared light emitting devices 1304 can generate light with wavelengths between 800 nm and 2500 nm, and in some examples between 980 nm and 1 micron, and in some specific implementations at 850 nm or 940 nm. However, in other embodiments, light emitting devices 1304 with wavelengths 1 micron and above, such as 1.3 microns (and corresponding light detecting devices) can be employed.

FIG. 13B illustrates semi-active stylus 1300 with light detecting device 1348-1 embedded within the tip of the stylus according to some examples of the disclosure. In some examples, light detecting device 1348-1 can be a micro-LED configured as a detector such as those described with respect to FIG. 4C. The tip of semi-active stylus 1300 (only a portion of which is shown in FIG. 13B) can be transparent to enable light to enter the stylus and be detected by light detecting device 1348-1. In the example of FIG. 13B, semi-active stylus (only a portion of which is shown in FIG. 13B) includes a stylus body with a tip and sides. The tip contains light detecting device 1348-1 (e.g., a photodetector, photodiode), which is capable of detecting the amplitude of modulated light at each modulation frequency generated by light emitting devices 1304 in array 1350, although only those light emitting devices closest to the light detecting device will actually be detected. A transimpedance amplifier can be coupled to light detecting device 1348-1 to generate output signals from the amplitude detector. Because photodiodes have a spectral responsivity (the ratio of photocurrent to incident power) that varies according to wavelength, in examples of the disclosure where light detecting device 1348-1 is a photodiode, a Fourier transform can be applied to the output signal from the light detecting device by one or more processors executing software or firmware within the optical stylus to extract its frequency components and determine the incident power (amplitude of modulated light) at various modulation frequencies (e.g., determine its frequency response) representative of nearby light emitting devices 1304.

When semi-active stylus 1300 is placed on or above optical sensing system 1302, light detecting device 1348-1 can detect the amplitude of modulated light from one or more light emitting devices 1304 in sufficient proximity to the light detecting device. In some instances, the time domain signals from those light emitting devices 1304 can be received and transformed using a Fast-Fourier Transform (FFT) into the frequency domain by one or more processors executing software or firmware within the optical stylus. Because the location of each light emitting device 1304 and its modulation frequency is known, the amplitude(s) of the detected modulated light from one or more light emitting devices 1304 can be utilized to compute a location of semi-active stylus 1300, and in some instances the proximity of the stylus to optical sensing system 1302. For example, triangulation or similar algorithms can be employed to determine the location of semi-active stylus 1300, and the amplitudes can be used to determine whether the stylus is in contact with the surface of optical sensing system 1302 or hovering above it at a certain distance. In some examples, the amplitude and frequency information can be transmitted from semi-active stylus 1300 to a device encompassing optical sensing system 1302 for processing using any suitable wireless or wired communication protocol. In other examples, processing of the amplitude and frequency information can be performed using a digital signal processor (DSP) or other processor in the optical stylus.

FIG. 13C-1 illustrates a semi-active stylus with light detecting device 1348-1 embedded within the tip of semi-active stylus 1300 and additional light detecting devices 1348-2 embedded within the sides of the stylus according to some examples of the disclosure. The example of FIG. 13C-1 is similar to the example of FIG. 13B, except for the addition of light detecting devices 1348-2. The tip and sides of semi-active stylus 1300 (only a portion of which is shown in FIG. 13C-1) can be transparent to enable light to enter the stylus and be detected by light detecting device 1348-1 and 1348-2. Although FIG. 13C-1 shows two light detecting devices 1348-2 on the side of stylus 1300, in some examples only one light detecting device or more than two light detecting devices may be employed on the side of the stylus. In the example of FIG. 13C-1, light detecting devices 1348-1 and 1348-2 (e.g., photodetectors, photodiodes) are capable of detecting the amplitude of modulated light at each modulation frequency generated by light emitting devices 1304 in array 1350. A Fourier transform can then be applied to the output signals of light detecting devices 1348-1 and 1348-2 to determine their frequency response, which can then be used to estimate stylus location at optical sensing system 1302. The unique locations of light detecting devices 1348-2 on the sides of stylus 1300 can enable these devices to better detect the modulated light from light emitting devices 1304 when the stylus is tilted, and thus provide a better estimate of stylus location. In some examples, the frequency response (and therefore the location) of light detecting devices 1348-2 can be computed by the one or more processors and tracked over time to determine stylus orientation (e.g., stylus static axial position with respect to optical sensing system 1302) and stylus rotation (e.g., pivoting about the axis of the stylus with respect to the optical sensing system).

FIG. 13C-2 illustrates a view of semi-active stylus 1300 along its axis with light detecting devices 1348-1 and 1348-2 according to some examples of the disclosure. In the example of FIG. 13C-2, three light detecting devices 1348-2 are arranged radially about the axis of semi-active stylus 1300 (only a portion of which is shown in FIG. 13C-2), although it should be understood that other arrangements are possible and may be dependent on a desired rotational accuracy (e.g., a more dense arrangement of detectors when higher rotational accuracy is desired). Although FIG. 13C-2 illustrates each light detecting device 1348-2 in an elongated linear arrangement, in other examples the light detecting devices can be other shapes, such as circles, and can be formed from a single detector (e.g., a single photodiode) or multiple detectors (e.g., a row of photodiodes). In addition, although FIG. 13C-2 shows three light detecting devices 1348-2, in some examples one, two, or more than three light detecting devices may be employed. Each light detecting device 1348-2 can detect the amplitude of modulated light at nearby light emitting devices 1304, but because these detectors are located around semi-active stylus 1300 rather than along its axis (e.g., on its tip), they will be located next to different light emitting devices with different modulation frequencies, and accordingly their measurements will be different. These different measurements from different light emitting devices 1304 can be used by one or more processors executing software or firmware within the optical stylus to determine stylus orientation, rotation and tilt, as described with respect to FIG. 13C-1.

Figure 13D:
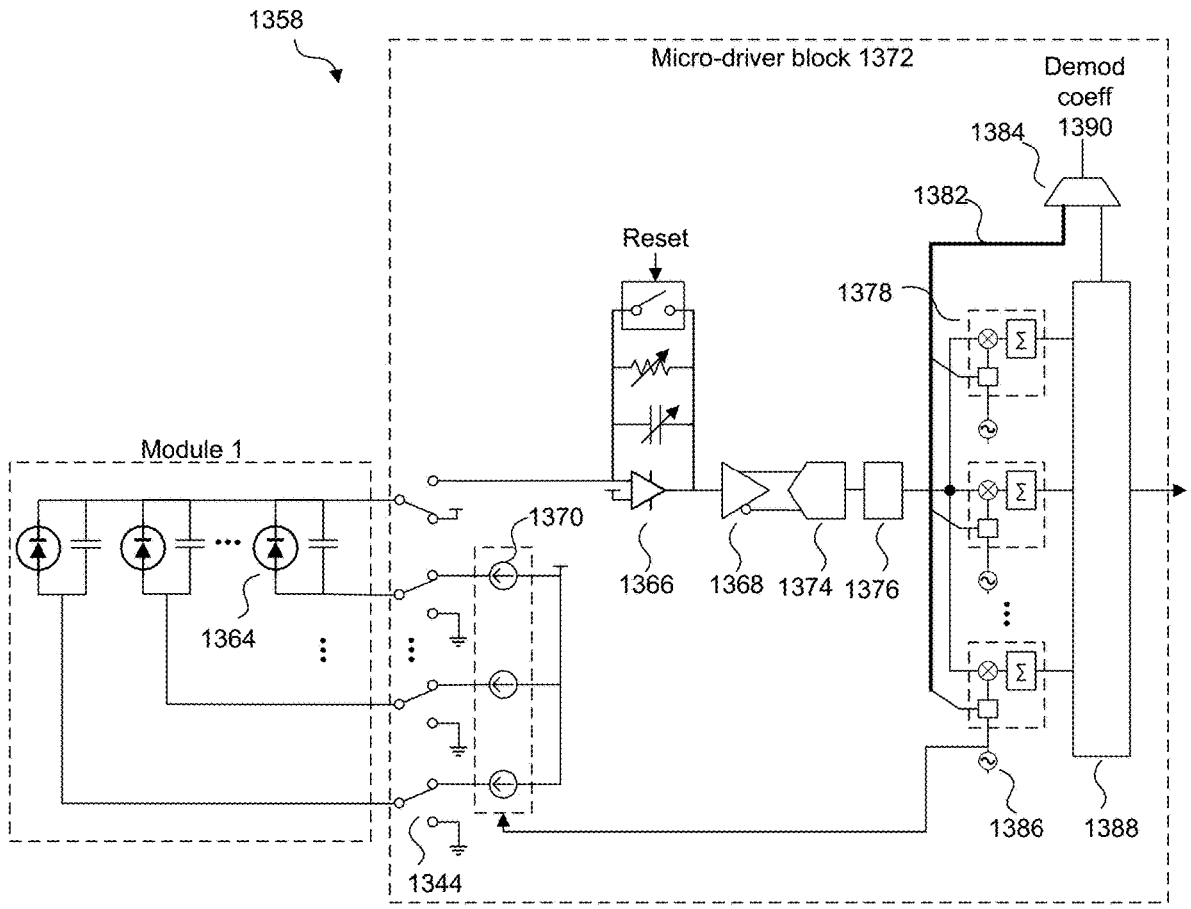
FIG. 13D illustrates a touch node electrode implemented within the portion of the optical sensing system shown in FIG. 13A and including a micro-LED module and a micro-driver block configured for transmitting modulated light to a semi-active stylus according to some examples of the disclosure.

FIG. 13D illustrates touch node electrode 1358 implemented within the portion of the optical sensing system shown in FIG. 13A and including a micro-LED module and micro-driver block 1372 configured for transmitting modulated light to a semi-active stylus according to some examples of the disclosure. In some examples, the micro-LED module and micro-driver block 1372 of FIG. 13D correspond to the touch node electrode of FIG. 4D, with some components shown in FIG. 13D being optional and dependent on the desired configurability of the optical sensing system. For example, amplifier 1366 and other downstream electronics such as demodulators 1378 may not be required if only micro-drivers 1370 and waveform generator 1386 are used to drive micro-LEDs 1364. In the example of FIG. 13D, modulated light (in the visible, near-infrared or infrared spectrum) can be generated by a plurality of micro-LEDs 1364 configured as light illuminators. These micro-LEDs 1364 can correspond to light-emitting devices 1304 in array 1350 of FIG. 13A, and in some examples can correspond to the display pixels in the electronic devices shown in FIGS. 1A-1E. This modulated light can be received by one or more light detecting devices (e.g., photodetectors such as micro-LEDs configured as light detectors) capable of detecting light in the visible, near-infrared or infrared spectrum within a semi-active stylus (not shown in FIG. 13D).

In the example of FIG. 13D, micro-LEDs 1364 in Module 1 can be configured as illuminators by coupling their anodes to micro-drivers 1370 (e.g., current sources) in micro-driver block 1372 (which are coupled to a reference voltage such as 1.29V) using switches 1344, while their cathodes can be biased by being coupled to a reference voltage such as −3.7V. Micro-drivers 1370 can be modulated by receiving a stimulus signal from waveform generator 1386. In some examples, waveform generator 1386 can be a precision waveform generator based on the Minsky algorithm that generates a sinusoid with a frequency set by a frequency code. In some examples, the sinusoidal signal can then be converted by a 1.5b DAC to an analog signal with three levels. The 1.5b DAC can generate a gated square wave optical transmit signal with a 33% duty cycle having no third-order harmonic distortion (HD3) component (the first major harmonic distortion component being HD5) to provide an optimal tradeoff between complexity and crosstalk with other frequencies. In other embodiments that require improved spectral purity, a higher bit DAC could be used. However, in other examples, a digital comparator can be used instead of the DAC to create the optical transmit signal, though with odd harmonics. The analog signal from waveform generator 1386 can drive micro-drivers 1370, which can provide a current to micro-LEDs 1364 that is proportional to the modulation voltage. Micro-LEDs 1364 can then generate modulated light at frequencies set by the frequency code.

In some examples, each micro-LED 1364 can generate modulated light with a unique optical transmit frequency (and optionally a particular phase), where the number of micro-LEDs can be equal to the number of bins in the FFT that processes the received light (discussed below). However, in other examples, some micro-LEDs 1364 within the array of micro-LEDs (see, e.g., FIG. 13A) can generate modulated light with the same frequency. To disambiguate locations in an optical sensing system having multiple micro-LEDs 1364 emitting modulated light with the same frequency (and optionally the same phase), unique patterns of frequencies (and optionally phases) can be generated by the micro-LEDs and detected individually (but evaluated as a group) by a light detecting device in the stylus. For example, the optical sensing system may group micro-LEDs 1364 into multiple 3×3 arrays, with a unique arrangement of frequencies (and optionally phases) in each array, although the same frequency (and optionally the same phase) may be repeated in the micro-LEDs of other arrays. In one specific example for purposes of illustration only, although the upper right micro-LED 1364 in one 3×3 array may have the same modulation frequency as the lower left micro-LED in another 3×3 array, the other micro-LEDs in each of the two 3×3 arrays form unique patterns, distinguishable from each other, that can be detected by one or more light detecting devices in the semi-active stylus to determine the location of the stylus.

Figure 13E:
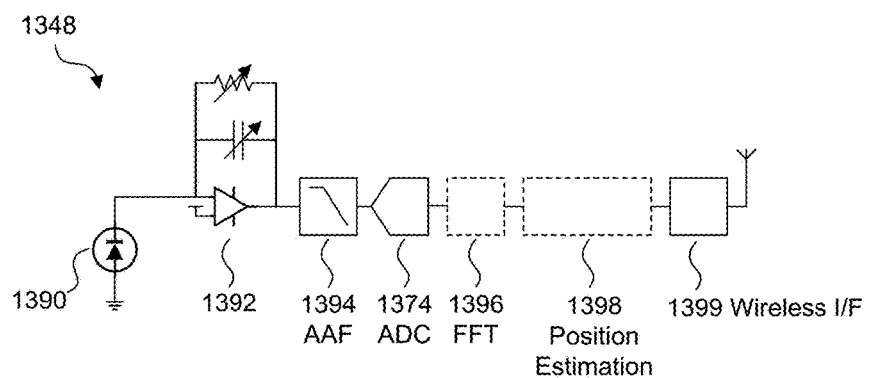
FIG. 13E illustrates a light detecting device that can be embedded within the semi-active stylus shown in FIG. 13B, 13C-1 or 13C-2 and configured for detecting modulated light transmitted from one or more light-emitting devices in the array of FIG. 13A according to some examples of the disclosure.

FIG. 13E illustrates light detecting device 1348 that can be embedded within the semi-active stylus shown in FIG. 13B, 13C-1 or 13C-2 and configured for detecting modulated light transmitted from one or more light-emitting devices 1304 in array 1350 of FIG. 13A according to some examples of the disclosure. In the example of FIG. 13E, a photodiode can be configured as a photodetector 1390 by coupling its anode to a reference voltage such as ground, while its cathode is coupled to the inverting input of amplifier 1392. Amplifier 1392 can be configured as a transimpedance amplifier or charge amplifier to convert current on its inverting input (indicative of the intensity of light received at photodetector 1390) to a voltage on its output using the feedback network of the amplifier. In some examples, the analog output of amplifier 1392 can be filtered using anti-aliasing filter (AAF) 1394 and converted to a digital signal using ADC 1374, which in some examples can be a Nyquist ADC (such as a SAR ADC), to generate raw light detection data. In the example of FIG. 13E, amplifier 1392, AAF 1394 and ADC 1374 can be collectively function as the AFE. However, in other examples, AAF 1394 and ADC 1374 can be replaced with a sigma-delta ADC. In case ADC is a continuous time sigma-delta ADC, the AAF may not be required. FFT block 1396 can extract the magnitudes and phases of the raw light detection data at the FFT bin frequencies, and position estimation block 1398 (discussed in further detail below) can estimate the location of the optical stylus based on the light intensities (magnitudes) and optionally the phases received from the one or more light-emitting devices 1304 in array 1350 of FIG. 13A. Note that in some examples, FFT 1396 and position estimation block 1398 can be implemented by one or more processors executing software or firmware within the optical stylus (see FIG. 2B), and estimated position information can be passed along to other devices via wireless interface (I/F) 1399 as shown in FIG. 13E. However, in other examples, FFT 1396 and position estimation block 1398 can be implemented in components of the optical sensing system other than the stylus. In these examples, the stylus can pass the digitized data from ADC 1374 (e.g., the raw light detection data) to these components via wireless I/F 1399.

As noted above, the light intensity and optionally phase information of the various modulation frequencies received at light detecting device 1348 can be used to estimate the position of a semi-active stylus on or above an optical sensing system that includes an array of light-emitting devices. This estimation relies upon constructing a stylus touch/proximity image by associating the magnitude and optionally the phase information from the FFT frequency bins with actual light emitting device locations in the optical sensing system. This association is possible because the modulation frequency (and optionally the phase) and location of each light emitting device 1304 in array 1350 is known a priori, or in other examples the location and arrangement of frequencies (and optionally the phases) of groups of light emitting devices is known. Accordingly, a map of the location of the light emitting devices (or groups of light emitting devices) and their different modulation frequencies (and optionally their phases) (or patterns of modulation frequencies (and optionally their phases) within the groups) can be stored in advance.

Figure 13F:
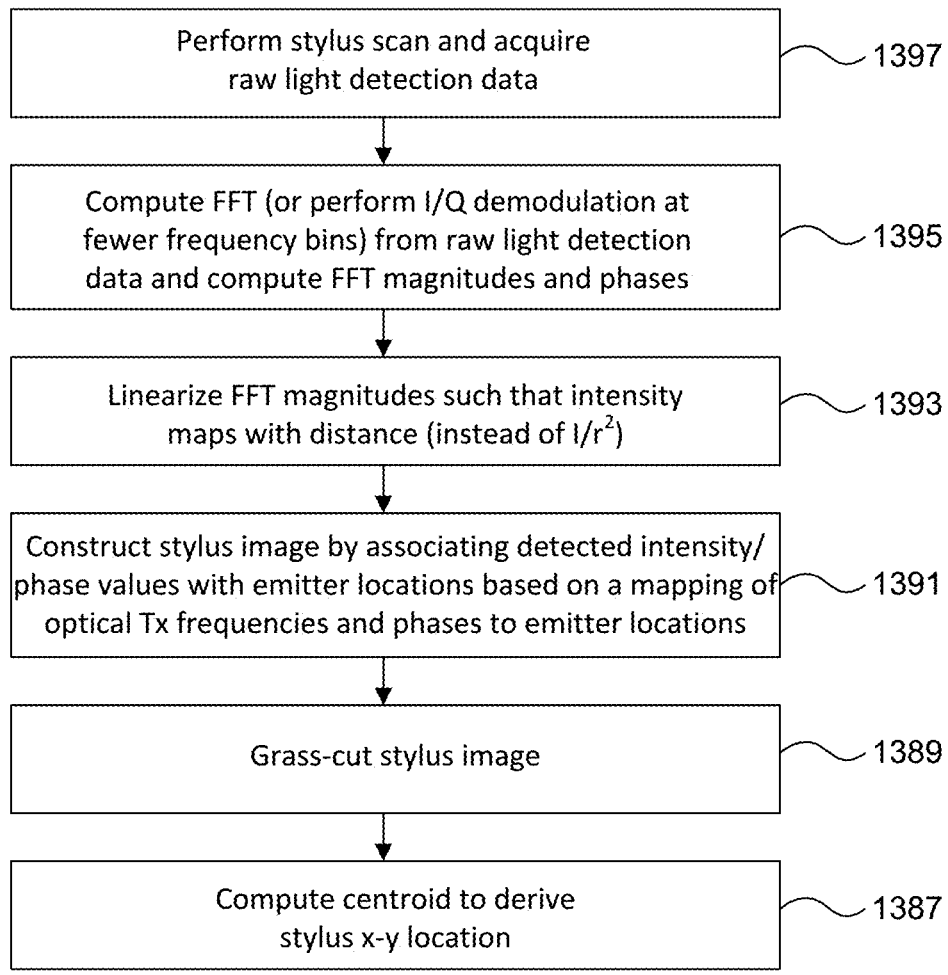
FIG. 13F is a flowchart for estimating the position of a semi-active stylus on or above an optical sensing system that includes an array of light-emitting devices according to some examples of the disclosure.

FIG. 13F is a flowchart for estimating the position of a semi-active stylus on or above an optical sensing system that includes an array of light-emitting devices according to some examples of the disclosure. In the example of FIG. 13F, a scan of the optical sensing system can first be performed to acquire raw light detection data (e.g., measurements from light detecting device 1348 within the semi-active stylus) at block 1397. This raw light detection data (e.g., the raw photo-signals) can then be digitized within device 1348.

An FFT can then be concurrently applied to the digitized raw light detection data (e.g., the digitized raw photo-signals) to extract the magnitudes (and optionally phase information) at the FFT bin frequencies at block 1395. Alternatively, as will be explained in further detail below, I/Q demodulation can be performed using fewer frequencies than the number of frequency bins of the FFT to compute the magnitudes (and optionally the phases) of the raw light detection data. After computing the FFT magnitudes, the values can be linearized such that intensity maps with distance (instead of $1/r^2$) at block 1393, if needed, to be operable with various downstream processes (e.g., a centroiding algorithm that assumes linear mapping). This can be achieved by creating a lookup table that maps non-linear distance $1/r^2$ to linear distance. An initial image of the location of the semi-active stylus on optical sensing system 1302 can be constructed at block 1391 by associating the extracted and linearized intensity values with the locations of light-emitting devices 1304 using the previously stored map of the modulation frequency (and optionally the phase) of each light emitting device and its location. Grass-cutting of the stylus image can then be performed at block 1389 to remove values whose illumination intensity values are indicative of noise, and a centroiding algorithm can be applied at block 1387 to derive the x-y location of the semi-active stylus.

A pictorial illustration of an example construction of initial images of the locations of two semi-active styluses in an optical sensing system at block 1391 of FIG. 13F will now be provided for purposes of explanation.

FIGS. 13G-1, 13G-2 and 13G-3 illustrate a symbolic optical sensing system with 16 light emitting devices 1304 and two semi-active stylus locations (0,0) and (1,1) according to some examples of the disclosure. In the illustration of FIG. 13G-1, a semi-active stylus located at point (0,0) would detect the highest light intensity (after grass-cutting) at modulation frequencies f1, f2, f5 and f6 from four light emitting devices indicated by shading 1385 in FIG. 13G-2. A semi-active stylus located at point (1,1) would detect the highest light intensity at modulation frequency f11 from the light emitting device indicated by shading 1383 in FIG. 13G-3. In addition, lower light intensity values would be detected at modulation frequencies f7, f10, f12 and f15 from the four light emitting devices indicated by shading 1381 in FIG. 13G-3, and the lowest light intensity values would be detected at modulation frequencies f6, f8, f14 and f16 from the four light emitting devices indicated by shading 1379 in FIG. 13G-3. These light intensities can be adjusted such that the FFT magnitudes linearly scale in accordance with the distance between the semi-active stylus and the light emitting device of interest. A centroiding algorithm can then be performed on the four shaded micro-LEDs in FIG. 13G-2, in some instances taking into account the light intensities of the four shaded micro-LEDs (an alternative would be to treat all four as having the same light intensity to simplify the determination), to compute a location of the stylus. Similarly, a centroiding algorithm can then be performed on the nine shaded micro-LEDs in FIG. 13G-3, in some instances taking into account the light intensities of the nine shaded micro-LEDs, to compute a location of the stylus.

Because light intensity is a function of distance, the distance between a given light source (e.g., light emitting device) associated with a specific modulation frequency (and optionally a specific phase) can be determined based on the detected light intensity. For a Lambertian light source, the light intensity on the surface of a semi-sphere is $I_0/2\pi \cdot r^2$, where r is the distance between the semi-active stylus and the light emitting device of interest, and $I_0$ is the irradiance of the light emitting device at its source. For a given photodetector area $A_S$, the relationship between the photodetector area and distance is $I(r)=A_S \cdot I_0/2\pi \cdot r^2$, which means that $r=\text{SQRT}(A_S \cdot I_0/2\pi \cdot I(r))$. Therefore, given a determined light intensity $I(r)$ detected at the photodetector, the known irradiance of the light emitting device at its source $I_0$, and the known photodetector area $A_S$, the distance to the light emitting device r can be computed. This equation demonstrates that light intensity is non-linear and drops off rapidly with distance from the source, significantly reducing the relevance of light-emitting devices as their distance from the photodetector increases. Accordingly, the grouping of micro-LEDs 1364 into unique arrays to identify stylus location, as discussed above, can be limited to small arrays (e.g., 3×3 arrays) without a significant loss of fidelity.

As noted above, in addition to using modulation frequencies and magnitudes to identify stylus location, in other examples phase information can be employed as well. For example, a plurality of phases can be associated with the plurality of modulation frequencies generated by the light emitting devices. The use of phase information can enable fewer modulation frequencies to be used while still providing sufficient information to determine stylus location, in some examples without needing to perform an FFT. In one specific example for purposes of illustration, instead of having 1024 FFT bins, only nine modulation frequencies can be used, and nine I/Q demodulators can be employed instead of an FFT. (See, e.g., FIG. 13E, where FFT 1396 can be replaced with nine I/Q demodulators). I/Q demodulation can be performed using Goerzel filters as they are less susceptible to harmonics due to the fact that illumination may not be sinusoidal. In one example, each light emitting device can be represented by a unique modulation frequency and phase combination, and a map of the location of the light emitting devices (or groups of light emitting devices) and their different modulation frequencies and phases (or patterns of modulation frequencies and phases within the groups) can be stored in advance. When magnitude and phase information for a particular modulation frequency is extracted by the light detecting device, the stored map can be used to disambiguate and determine the stylus location, even when two different light detecting devices have the same modulation frequency.

As mentioned above, light emitting devices 1304 in array 1350 of FIG. 13A can be configured to emit modulated light at a plurality of different frequencies (and optionally with a plurality of phases). In some examples, each light emitting device 1304 can emit light at a unique frequency (and optionally with a particular phase), and the modulated light from each light emitting device can be detected and analyzed individually to determine stylus location. In other examples, groups of light emitting devices 1304 can be used instead of individual light emitting devices. For example, each group of light emitting devices 1304 (e.g., a 3×3 array of light emitting devices) within a plurality of groups of light emitting devices can emit light with a unique arrangement of frequencies (and optionally phases), and these arrangements can be detected and analyzed to identify a particular group and its location on the panel, and thereafter determine stylus location, as will be explained in further detail below.

FIG. 13G-4 illustrates a group of nine light emitting devices 1304 that can emit light at up to nine different modulation frequencies and with up to nine different phases according to some examples of the disclosure. The 3×3 array of FIG. 13G-4 is an example of one particular grouping of light-emitting devices with a unique arrangement of frequencies and phases that can be evaluated together for purposes of determining the location of the stylus. Note that the 3×3 grouping of light emitting devices 1304 in FIG. 13G-4 is only a subset of the entire array 1350 of light emitting devices 1304 shown in FIG. 13A. The entire array 1350 can be designed in advance from a plurality of 3×3 groups of light emitting devices 1304, with each group having light emitting devices that emit modulated light with a unique arrangement of frequencies and phases.

Referring back to FIG. 13D, in some examples of the disclosure, nine unique frequency codes can be utilized to set the frequencies of waveform generator 1386 and modulate micro-drivers 1370 with the nine frequencies. In addition, waveform generator 1386 can be programmed with nine start phases. Using these nine frequencies and nine phases, the number of possible unique groups (e.g., the number of unique 3×3 arrays) that can be employed to identify a unique location on the touchscreen or touch panel is $2^9=512$. The optical sensing system can configure each group of light emitting devices at each location on the touchscreen or panel to generate the desired unique arrangement of frequencies and phases. After a stylus scan of the touchscreen or panel is performed (block 1397 in FIG. 13F), and data has been extracted and processed (see blocks 1397, 1395 and 1393 in FIG. 13F), an initial image of the location of the semi-active stylus can be constructed by associating the extracted and linearized intensity values with specific groups of light-emitting devices using a previously stored map of the location and frequency/phase arrangements for each group of light emitting devices. FIG. 13G-4 can represent a so-called "heat map" (e.g., intensity map) of a group of light emitting devices after grass-cutting has been performed in block 1389 of FIG. 13F. Because this particular group of light emitting devices is associated with a particular known location on the panel, a coarse stylus location can be determined. A centroid of the image of FIG. 13G-4 can then be performed (see block 1387 in FIG. 13F) to derive a more specific x-y location of the stylus.

The examples of FIGS. 13D, 13E, 13F, and 13G-1 through 13G-4 were described in the context of a single light detecting device 1348-1 at the tip of semi-active stylus 1300 as shown in FIG. 13B. However, when multiple detectors are employed at semi-active stylus 1300, such as detectors 1348-2 in FIGS. 13C-1 and 13C-2, each detector can include its own amplifier 1392 and associated AFE circuitry as shown in FIG. 13E, and the flowchart of FIG. 13F can be performed to obtain a separate stylus location determination from each light detecting device. The stylus position information from each detector can be input into further algorithms to determine stylus tilt angle and tilt direction, along with stylus location. For example, the angle of stylus tilt can be derived by mapping the intensity of the received light at the multiple light detecting devices to distances between light emitting and light detecting devices according to the aforementioned equations and then computing the tilt angle based on the known relative locations of the light emitting devices and their aforementioned distances to the light detecting devices based on the known locations of the light detecting devices in the stylus.

The previously discussed examples of the disclosure employed light emitting devices within the optical sensing system. The examples of FIGS. 13A to 13C-2 further employed light detecting devices within the stylus to avoid the need for light reflections and low energy return signals from reflected light. In other examples to be discussed below, light emitting devices may be located within the stylus and light detecting devices may be located within the optical sensing system, which can also avoid the need for light reflections and low energy return signals from reflected light. The light emitting devices can direct light onto and through a pattern generator to produce patterns (e.g., crosshairs) on a optical sensing system. Determining the location and energy of the patterns can enable the determination of target location, hover distance (if any), tilt angle, orientation and rotation of the stylus. As discussed above in previous examples, the number or density of features in the patterns can be dependent on the number of light detecting devices to be employed within the optical sensing system.

Figure 14A:
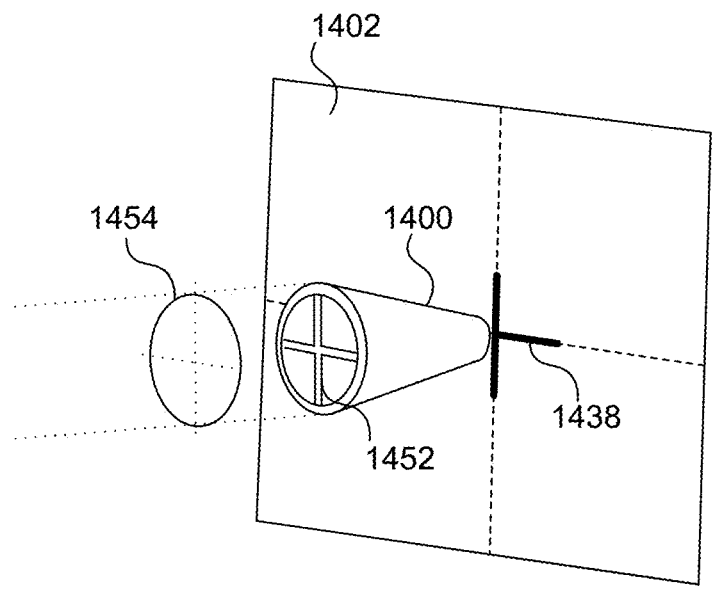
FIG. 14A illustrates a perspective view of a portion of an optical stylus system with an optical sensing system and an active light emitting stylus including a light emitting device according to some examples of the disclosure.

FIG. 14A illustrates a perspective view of a portion of an optical stylus system with optical sensing system 1402 and active light emitting stylus 1400 including light emitting device 1454 according to some examples of the disclosure. In the example of FIG. 14A, light emitting device 1454 in active stylus 1400 (only a portion of which is shown in FIG. 14A) can be a light-emitting diode (LED) that emits light through patterned aperture 1452 and out through the tip of the stylus. Patterned aperture 1452 can be crosshairs as shown in FIG. 14A, or other opening shaped to cause a desired reflected light pattern 1438 to appear at optical sensing system 1402. An array of light detecting devices within optical sensing system 1402 can detect the location and energy of reflected light pattern 1438, and one or more processors executing software or firmware within the optical stylus (e.g., within a computing system similar to the system shown in FIG. 2A that is in communication with optical sensing system 1402) to determine the target location, hover distance (if any), tilt angle, orientation and rotation of the stylus.

In some examples, light emitting device 1454 can be a micro-LED (such as those described with respect to FIG. 4E). In other examples, light emitting device 1454 can be any type of device that generates light either in the visible, infrared or near-infrared spectrum. Near-infrared light emitting device 1454 can generate light with wavelengths between 800 nm and 2500 nm, and in some examples between 980 nm and 1 micron, and in some specific implementations at 850 nm or 940 nm. However, in other embodiments, light emitting device 1454 with wavelengths 1 micron and above, such as 1.3 microns (and corresponding light detecting devices) can be employed.

Figure 14B:
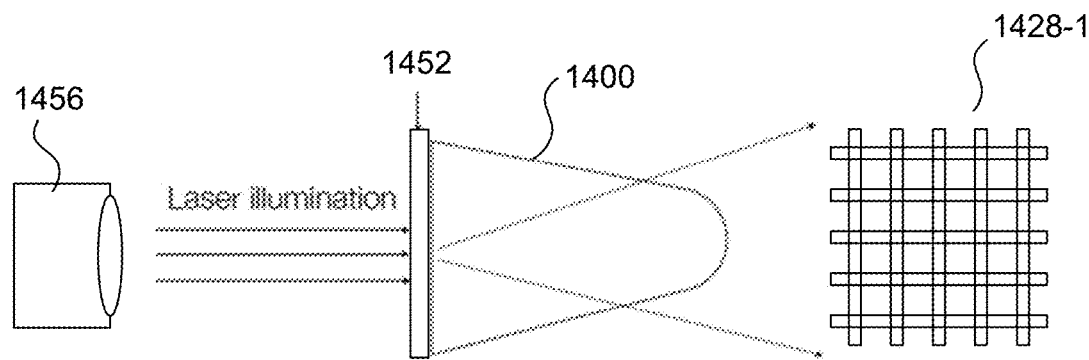
FIG. 14B illustrates a portion of an optical stylus system with an active stylus including a laser and a patterned aperture according to some examples of the disclosure.

FIG. 14B illustrates a portion of an optical stylus system with active stylus 1400 including laser 1456 and patterned aperture 1452 according to some examples of the disclosure. In the example of FIG. 14B, laser 1456 in active stylus 1400 (only a portion of which is shown in FIG. 14B) emits coherent light through patterned aperture 1452 and out through the tip of the stylus. Laser 1456 can generate light of any wavelength that produces sufficient diffraction, such as light in the visible or infrared spectrum. In some examples, laser 1456 can be frequency modulated by one or more processors executing software or firmware within the optical stylus. Patterned aperture 1452 can be designed to produce a single crosshairs similar to that shown in FIG. 14A or a multiple crosshairs illumination pattern 1428-1 as shown in FIG. 14B, or other opening shaped to cause a desired pattern to appear at optical sensing system 1402. In the crosshairs example of FIG. 14A, the two axes or dimensions of the crosshairs can be unique (e.g., different lengths, thicknesses, etc.) so that stylus orientation and rotation can be more easily tracked by one or more processors executing software or firmware within optical sensing system 1402. It should be understood that crosshairs is just an example, and that other patterns can be similarly utilized. In some examples, patterned aperture 1452 can be a diffractive pattern generator similar to those described with respect to FIGS. 9A-9D, although in the example of FIG. 14B, light passes or refracts through the patterned aperture rather than reflecting off it.

Ambient light can also be detected along with patterned light from laser 1456 at light detecting devices within optical sensing system 1402. To reduce the impact of ambient light on stylus detection, in some examples a lock-in amplifier can employ a homodyne detection scheme and low-pass filtering to measure the amplitude and phase of the patterned laser light relative to periodic reference, effectively rejecting all other frequency components (ambient light) other than the modulated patterned light from laser 1456.

Figure 14C:
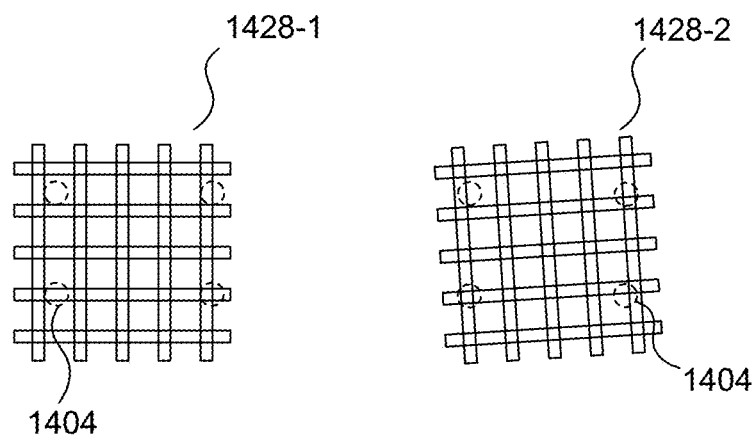
FIG. 14C illustrates two illumination patterns appearing at an optical sensing system having an array of light detecting devices according to some examples of the disclosure.

FIG. 14C illustrates two illumination patterns 1428-1 and 1428-2 appearing at an optical sensing system having an array of light detecting devices 1404 according to some examples of the disclosure. In some examples, light detecting devices 1404 can be micro-LEDs configured as detectors such as those described with respect to FIG. 4D and capable of detecting near-infrared light. In the example of FIG. 14C, illumination pattern 1428-2 is a rotated image of illumination pattern 1428-1, resulting from a small rotation of a stylus generating the illumination pattern. As FIG. 14C illustrates, light detecting devices 1404 can receiving varying amounts of light energy depending on the rotation of illumination pattern 1428-2. In other examples, light detecting devices 1404 can receive varying amounts of light energy depending on the tilt of the stylus. These variations in energy can be detected as an illumination pattern having an illumination energy profile, and the illumination pattern and energy profile can be processed by one or more processors executing software or firmware within the optical sensing system to determine target location, hover distance (if any), tilt angle of the stylus. In some examples, the spatial signature of the illumination energy profile captured by the one or more processors can be tracked over time to determine stylus orientation (e.g., stylus static axial position with respect to optical sensing system 1402) and stylus rotation (e.g., pivoting about the axis of the stylus with respect to the optical sensing system).

The quantity or density of light detecting devices 1404 utilized in optical sensing system 1402 can be dependent on the number of features in illumination pattern 1428-1. For example, if the density of illumination pattern 1428-1 is relatively high (e.g., multiple crosshairs as shown in FIG. 14C), fewer light detecting devices 1404 may be needed, because small changes (e.g., rotations) of the sparse illumination pattern can be detected with the dense array of light detecting devices. On the other hand, if the density of illumination pattern 1428-1 is relatively low (e.g., a single crosshairs as shown in FIG. 14A), more light detecting devices 1404 may be needed to enable small changes (e.g., rotations) in the illumination pattern to be detected with the sparse array of light detecting devices. As mentioned above, different stylus rotations (and tilt angles not shown in FIG. 14C) can generate different orientations and energy profiles of illumination patterns 1428-1 and 1428-2, and these different orientations and illumination energy profiles can be detected and evaluated to determine one or more of the target location, hover distance (if any), tilt angle, orientation and rotation of the stylus.

Figure 15A:
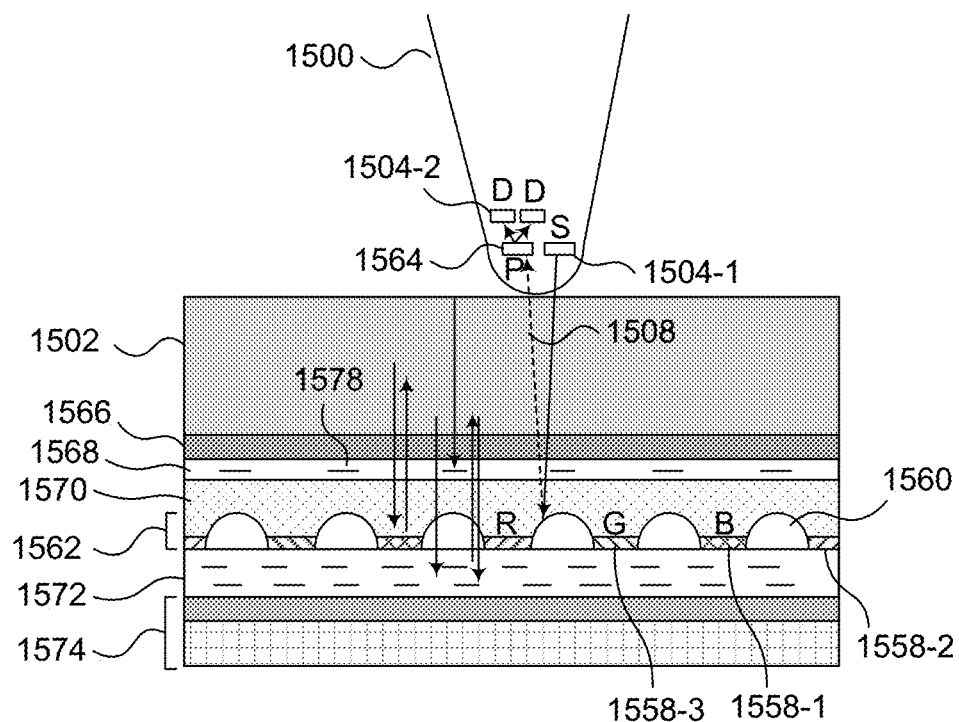
FIG. 15A illustrates a cross-sectional view of a portion of an optical stylus system including an active stylus with a light emitting device, a splitting element, and a plurality of light detecting devices in contact with or hovering above an optical sensing system of a display device according to some examples of the disclosure.

FIG. 15A illustrates a cross-sectional view of a portion of an optical stylus system including active stylus 1500 with light emitting device 1504-1, splitting element 1564, and a plurality of light detecting devices 1504-2 in contact with or hovering above optical sensing system 1502 of a display device according to some examples of the disclosure. In some examples, light emitting devices 1504-1 in active stylus 1500 (only a portion of which is shown in FIG. 15A) can be micro-LEDs with illumination angles that are subject to total internal reflection (e.g., angles up to the critical angle of the stylus surface material) and will not interfere with any other detection scheme being employed, such as water agnostic detectors. In some examples, light emitting devices 1504-1 can be any type of device that generates light in the visible, infrared or near-infrared spectrum. Near-infrared light emitting devices 1504-1 can generate light with wavelengths between 800 nm and 2500 nm, and in some examples between 980 nm and 1 micron, and in some specific implementations 850 nm or 940 nm. However, in other embodiments, other emitters with wavelengths 1 micron and above, such as 1.3 microns (and corresponding detectors) can be employed.

Splitting element 1564 in active stylus 1500 can be formed from a grating, prism or other optical wavelength beam splitter to distribute or split incoming reflected light 1510 into separate wavelengths of light, such as red and blue light. In some examples, a plurality of light detecting devices 1504-2 can be configured to receive the separate wavelengths of light from splitting element 1564 and generate one or more output signals. In some examples, light detecting devices 1504-2 can be micro-LEDs configured as detectors such as those described with respect to FIG. 4D and capable of detecting near-infrared light. One or more processors executing software or firmware within the optical stylus (e.g., within a computing system similar to the system shown in FIG. 2B that is within active stylus 1500) can determine the wavelength (e.g., color) and optionally the intensity of reflected light 1510 using the output signals from the plurality of light detecting devices 1504-2, in one example by computing a ratio of two photodiodes responsive to two different wavelengths, or other suitable means. As will be explained in further detail below, one or more determinations of the wavelength and optionally the intensity of reflected light 1510 at one or more locations along optical sensing system 1502 can be used to estimate a location of active stylus 1500 at the optical sensing system.

FIG. 15A also illustrates a stackup of optical sensing system 1502, which can include a transparent cover material, polarizer 1566, touch sensor layer 1568 with encapsulant, buffer layer 1570, pixel definition layer (PDL) 1562 having retroreflector layer 1560 and display elements 1558-1 to 1558-3 such as blue, red and green OLEDs, electrical layer 1572 containing circuitry and traces for display updating, and structural layers 1574.

Figure 15B:
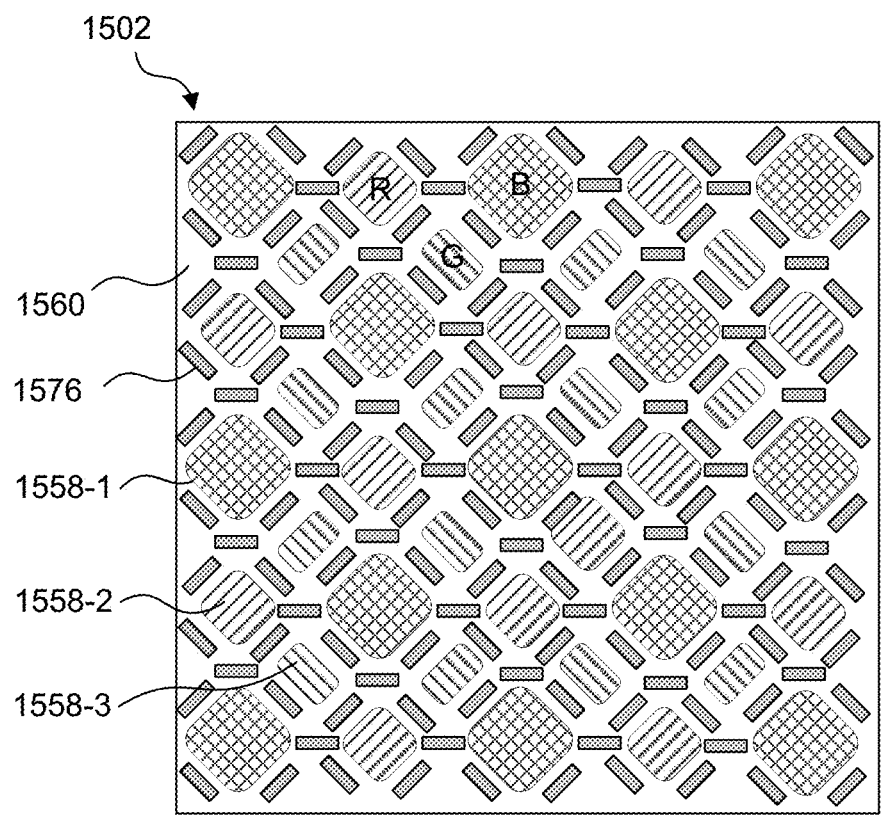
FIG. 15B illustrates a plan view of a portion of an optical sensing system with display elements and a retroreflector layer according to some examples of the disclosure.

FIG. 15B illustrates a plan view of a portion of optical sensing system 1502 with display elements 1558-1 to 1558-3 and retroreflector layer 1560 according to some examples of the disclosure. In some examples, slits or holes 1576 can be formed in retroreflector layer 1560 to allow light to pass through the display for other purposes. Retroreflector layer 1560, although appearing to be a uniform layer in the example of FIG. 15B, can be formed with different retroreflective properties at different locations across optical sensing system 1502. In some examples, retroreflector layer 1560 can be a diffractive grating with a chirp (a spatially changing periodicity) to enable spectral shifting of the reflected light. In one specific example, the periodicity of the grating of retroreflector layer 1560 can be gradually changed from reflecting light in the blue spectrum in the upper left corner of optical sensing system 1502 to reflecting light in the red spectrum in the lower left corner of the optical sensing system, and a spectrum map can be computed for all locations on the optical sensing system. By sensing the wavelength (e.g., color) of reflected light in active stylus 1500 at one or more locations in optical sensing system 1502 in conjunction with the spectrum map, a location of the stylus on the optical sensing system can be estimated by one or more processors executing software or firmware within the optical sensing system. It should be understood, however, that although examples of the disclosure described herein refer to retroreflector layer 1560 with a chirp spanning two reflection colors (red and blue) and a stylus configured to detect those two colors, in other examples different reflection colors (more than two) can be produced by the retroreflector layer and detected by active stylus 1500, and different spectrum maps of varying reflection colors over multiple locations of optical sensing system 1502 can be computed and utilized to determine stylus location.

Although the previous discussion focused on utilizing the gradually changing retroreflective properties of retroreflector layer 1560 to determine stylus location, in other examples of the disclosure, differences in the reflective properties of structures other than the retroreflector layer can also be utilized to determine stylus location. In some examples, the reflective properties of the red, green and blue display elements (1558-2, 1558-3 and 1558-1, respectively) can be different from the surrounding retroreflector layer 1560 because of underlying metal content or other reflective material that may not be present under the retroreflector layer. Similarly, holes 1576 in retroreflector layer 1560 can permit reflections off of different materials that also produce different reflective properties. As the arrows in the example of FIG. 15A indicate, light from active stylus 1500 can reflect off the conductive touch electrodes 1578 in touch sensor layer 1568, display elements 1558, and conductive layers in electrical layer 1572, as well as off retroreflector layer 1560, to illustrate just a few examples.

Accordingly, spatially varying reflectivity is present across optical sensing system 1502, and these variations can be mapped to different locations across the surface and stored to assist in the determination of stylus location. Active stylus 1500 can be designed to spatially resolve these differences in reflectivity and produce a time domain signal as the stylus is moved across the surface of the optical sensing system. Characteristics of this time domain signal (e.g., amplitude) can be processed by one or more processors executing software or firmware within the optical stylus to determine the location and optionally the rate of motion of active stylus 1500. For example, although a detected reflection off display element 1558-2, without more, will not be dispositive of stylus location due to the presence of numerous display elements 1558-2 across detection surface 1502, if a reflection off retroreflector layer 1560 with a certain color is also detected at about the same time, the color of the reflection off the retroreflector layer can be used to narrow the location of active stylus 1500 to a certain area of detection surface 1502, and the reflection off the display element can be used to narrow the location even more.

Therefore, according to the above, some examples of the disclosure are directed to an integrated touch screen for performing display operations and optical object sensing, comprising a cover material having a detection surface, an array of photodetectors arranged below the cover material, and a first light-blocking layer arranged between the photodetectors and the cover material, the first light-blocking layer including a plurality of first apertures configured as detector angular filters for blocking light having a detection angle less than a first critical angle from impinging on the photodetectors, wherein the first critical angle is determined in accordance with the cover material and a first medium in contact with the cover material, and is defined with respect to a normal to the detection surface. Additionally or alternatively to one or more of the examples disclosed above, in some examples the photodetectors include a plurality of light-emitting diodes (LEDs) configured as light detectors and formed in a display layer. Additionally or alternatively to one or more of the examples disclosed above, in some examples the photodetectors include a plurality of discrete photodetectors, the discrete photodetectors separate from a plurality of light-emitting diodes (LEDs) configured as display elements in a display layer. Additionally or alternatively to one or more of the examples disclosed above, in some examples the photodetectors are formed in a second layer separate from the display layer. Additionally or alternatively to one or more of the examples disclosed above, in some examples the photodetectors include a plurality of near infrared (NIR) sensitive photodetectors. Additionally or alternatively to one or more of the examples disclosed above, in some examples the photodetectors are formed in a first layer separate from a second layer, the second layer including a plurality of discrete illuminators. Additionally or alternatively to one or more of the examples disclosed above, in some examples the first medium is water, and the first critical angle is +/−62.7 degrees+/−1 degree. Additionally or alternatively to one or more of the examples disclosed above, in some examples the first critical angle is less than at least one first reflection angle determined in accordance with the cover material and a second medium in contact with the cover material. Additionally or alternatively to one or more of the examples disclosed above, in some examples the plurality of first apertures are configured to pass light between the first critical angle and a second detection angle a fixed number of degrees greater than the first critical angle. Additionally or alternatively to one or more of the examples disclosed above, in some examples the first critical angle is the greater of the first critical angle and a second critical angle that is determined in accordance with the cover material and a second medium in contact with the cover material. Additionally or alternatively to one or more of the examples disclosed above, in some examples the second medium is air, and the second critical angle is +/−42 degrees+/−1 degree. Additionally or alternatively to one or more of the examples disclosed above, in some examples the integrated touch screen further comprises a second light-blocking layer arranged between the photodetectors and the first light-blocking layer, the second light-blocking layer including a plurality of second apertures aligned with the plurality of first apertures and configured as part of the detector angular filters for blocking light that is less than the first critical angle. Additionally or alternatively to one or more of the examples disclosed above, in some examples the integrated touch screen further comprises an array of illuminators, wherein the first light-blocking layer includes a plurality of second apertures configured as illuminator angular filters for blocking light from the illuminators having an illumination angle greater than a second critical angle, and the second critical angle is determined in accordance with the cover material and a second medium in contact with the cover material, and is defined with respect to the normal to the detection surface. Additionally or alternatively to one or more of the examples disclosed above, in some examples the illuminators include a plurality of light-emitting diodes (LEDs) configured as light illuminators. Additionally or alternatively to one or more of the examples disclosed above, in some examples the illuminators include a plurality of near infrared (NIR) micro-LEDs configured to emit NIR light. Additionally or alternatively to one or more of the examples disclosed above, in some examples the illuminators are separate from a plurality of light-emitting diodes (LEDs) configured as display elements in a display layer. Additionally or alternatively to one or more of the examples disclosed above, in some examples the illuminators are formed in a first layer separate from a second layer, the second layer including a plurality of discrete photodetectors. Additionally or alternatively to one or more of the examples disclosed above, in some examples the second critical angle is the lesser of the second critical angle and a third critical angle that is determined in accordance with the cover material and a third medium in contact with the cover material. Additionally or alternatively to one or more of the examples disclosed above, in some examples the second medium is air, and the second critical angle is +/−42 degrees+/−1 degree. Additionally or alternatively to one or more of the examples disclosed above, in some examples the third medium is water, and the third critical angle is +/−62.7 degrees+/−1 degree. Additionally or alternatively to one or more of the examples disclosed above, in some examples the integrated touch screen further comprises a second light-blocking layer arranged between the illuminators and the first light-blocking layer, the second light-blocking layer including a plurality of third apertures aligned with the plurality of second apertures and configured as part of the illuminator angular filters for blocking light that is greater than the second critical angle.

Some examples of the disclosure are directed to a method for angularly filtering light at a touch sensing device to improve object detection, comprising determining a first critical angle in accordance with a cover material of the touch sensing device and a first medium in contact with the cover material, and blocking light having a detection angle less than the first critical angle from impinging on a plurality of photodetectors located below the cover material. Additionally or alternatively to one or more of the examples disclosed above, in some examples the method further comprises detecting light having the detection angle greater than the first critical angle at a plurality of first light-emitting diodes configured as the plurality of photodetectors. Additionally or alternatively to one or more of the examples disclosed above, in some examples the method further comprises allowing light having the detection angle greater than the first critical angle to impinge on the plurality of photodetectors through a plurality of first apertures in a first light-blocking layer located between the plurality of photodetectors and the cover material. Additionally or alternatively to one or more of the examples disclosed above, in some examples the first critical angle is less than at least one first reflection angle determined in accordance with the cover material and a second medium in contact with the cover material. Additionally or alternatively to one or more of the examples disclosed above, in some examples the method further comprises allowing light having the detection angle between the first critical angle and a second detection angle a fixed number of degrees greater than the first critical angle to impinge on the plurality of photodetectors through the plurality of first apertures. Additionally or alternatively to one or more of the examples disclosed above, in some examples the method further comprises determining a second critical angle in accordance with the cover material and a second medium in contact with the cover material, and determining the first critical angle as the greater of the first critical angle and the second critical angle. Additionally or alternatively to one or more of the examples disclosed above, in some examples the method further comprises allowing the light having the detection angle greater than the first critical angle to impinge on the plurality of photodetectors through a plurality of second apertures in a second light-blocking layer located between the plurality of photodetectors and the first light-blocking layer. Additionally or alternatively to one or more of the examples disclosed above, in some examples the method further comprises determining a second critical angle in accordance with the cover material of the touch sensing device and a second medium in contact with the cover material, and blocking light emitted from a plurality of illuminators located below the cover material having an illumination angle greater than the second critical angle. Additionally or alternatively to one or more of the examples disclosed above, in some examples the method further comprises emitting light from a plurality of second light-emitting diodes configured as the plurality of illuminators. Additionally or alternatively to one or more of the examples disclosed above, in some examples the method further comprises determining a third critical angle in accordance with the cover material and a third medium in contact with the cover material, and determining the second critical angle as the lesser of the second critical angle and the third critical angle. Additionally or alternatively to one or more of the examples disclosed above, in some examples the method further comprises allowing light having the illumination angle less than the second critical angle through a plurality of first apertures in a first light-blocking layer located between the plurality of illuminators and the cover material.

Some examples of the disclosure are directed to an integrated touch screen for performing display operations and optical object sensing, comprising a cover material having a detection surface, an illuminator optically coupled to the cover material for transmitting light laterally into the cover material at a first angle that is equal to or greater than a critical angle of the cover material for causing internal reflections at the first angle within the cover material, and an array of photodetectors arranged below the cover material, wherein the critical angle is defined with respect to a normal to the detection surface in accordance with the cover material and one or more media in contact with the cover material. Additionally or alternatively to one or more of the examples disclosed above, in some examples the integrated touch screen further comprises a layer between the cover layer and the array of photodetectors that is not index matched with the cover material. Additionally or alternatively to one or more of the examples disclosed above, in some examples the cover material is selected for causing a change in the internal reflections from the first angle to a second angle when the light being reflected within the cover material contacts the detection surface at a location of an object in contact with the detection surface, and the internal reflections at the second angle are capable of being received and detected at one or more of the photodetectors.

Some examples of the disclosure are directed to a method for determining a hover distance of a proximate stylus comprising, at a touch sensing device including one or more processors and a plurality of light detecting pixels configured for detecting light from a stylus proximate to a detection surface of the touch sensing device, capturing an irradiance profile by aggregating a plurality of illumination intensity values from the plurality of pixels, determining an ellipse from the irradiance profile, determining a tilt of the stylus from a width and height of the ellipse, and determining a hover distance of the stylus from the tilt. Additionally or alternatively to one or more of the examples disclosed above, in some examples the method further comprises determining an azimuth of the stylus as an angle between a projection of the stylus onto the detection surface and a reference direction on the detection surface. Additionally or alternatively to one or more of the examples disclosed above, in some examples determining the ellipse from the irradiance profile comprises identifying a plurality of boundary pixels in the irradiance profile, and fitting an ellipse to the plurality of boundary pixels. Additionally or alternatively to one or more of the examples disclosed above, in some examples the method further comprises baselining the irradiance profile by removing dark current from the plurality of illumination intensity values in the irradiance profile. Additionally or alternatively to one or more of the examples disclosed above, in some examples the method further comprises grass-cutting the irradiance profile by setting the illumination intensity values of those pixels in the irradiance profile having illumination intensity values below a grass-cutting threshold to zero. Additionally or alternatively to one or more of the examples disclosed above, in some examples the method further comprises interpolating and upsampling the irradiance profile to generate additional illumination intensity values within the irradiance profile. Additionally or alternatively to one or more of the examples disclosed above, in some examples the method further comprises identifying the plurality of boundary pixels in the irradiance profile by identifying those illumination intensity values within the irradiance profile that have a non-zero illumination intensity value and are adjacent to pixels in the irradiance profile that have a zero illumination intensity value. Additionally or alternatively to one or more of the examples disclosed above, in some examples the method further comprises fitting the ellipse to the plurality of boundary pixels by performing a least squares ellipse fitting algorithm on the plurality of boundary pixels to derive parameters for a mathematical expression that represents the ellipse. Additionally or alternatively to one or more of the examples disclosed above, in some examples the method further comprises computing the width and height of the ellipse by using the mathematical expression for the ellipse to compute a centroid, minor axis and major axis of the ellipse. Additionally or alternatively to one or more of the examples disclosed above, in some examples the method further comprises determining the tilt of the stylus by applying the computed width and height of the ellipse to a lookup table. Additionally or alternatively to one or more of the examples disclosed above, in some examples the method further comprises determining a hover distance of the stylus by applying the determined tilt of the stylus to a lookup table. Additionally or alternatively to one or more of the examples disclosed above, in some examples determining the ellipse from the irradiance profile comprises computing a centroid from the irradiance profile, computing a covariance matrix based on the centroid, the irradiance profile and a sensor grid, computing eigenvalues of the covariance matrix, and computing the width, height and an azimuth of an ellipse corresponding to the irradiance profile from the eigenvalues of the covariance matrix. Additionally or alternatively to one or more of the examples disclosed above, in some examples the method further comprises baselining the irradiance profile by removing dark current from the plurality of illumination intensity values in the irradiance profile. Additionally or alternatively to one or more of the examples disclosed above, in some examples the method further comprises grass-cutting the irradiance profile by setting the illumination intensity values of those pixels in the irradiance profile having illumination intensity values below a grass-cutting threshold to zero. Additionally or alternatively to one or more of the examples disclosed above, in some examples the method further comprises determining a tilt of the stylus by applying the computed width and height of the ellipse to a lookup table. Additionally or alternatively to one or more of the examples disclosed above, in some examples the method further comprises determining a hover distance of the stylus by applying the determined tilt of the stylus to a lookup table. Additionally or alternatively to one or more of the examples disclosed above, in some examples the method further comprises compensating for shift in the centroid by determining a centroid offset correction value as a function of the tilt and azimuth and applying the offset correction value to the computed centroid. Additionally or alternatively to one or more of the examples disclosed above, in some examples the method further comprises, in accordance with a determination that the stylus is located partially outside the detection surface of the touch sensing device, the determining of the ellipse from the irradiance profile comprises identifying a plurality of boundary pixels in the irradiance profile, and fitting an ellipse to the plurality of boundary pixel, and in accordance with a determination that the stylus is not located partially outside the detection surface of the touch sensing device, the determining of the ellipse from the irradiance profile comprises computing a centroid from the irradiance profile, computing a covariance matrix based on the centroid, the irradiance profile and a sensor grid, computing eigenvalues of the covariance matrix, and computing the width, height, and an azimuth of an ellipse corresponding to the irradiance profile from the eigenvalues of the covariance matrix.

Some examples of the disclosure are directed to a method for computing a hover distance of an object proximate to a detection surface of a touch sensing device, comprising, at the touch sensing device including one or more processors and a plurality of light detectors configured for detecting light from the object proximate to the detection surface of the touch sensing device, capturing an irradiance profile by aggregating a plurality of illumination intensity values from the plurality of light detectors, computing a mean illumination intensity value $I_H$ from the plurality of illumination intensity values, and computing a hover distance from the mean illumination intensity value $I_H$, a radius $r_c$ of an illumination source of the object, a divergence angle δ of light emanating from the illumination source, and a light intensity $I_c$ at the illumination source. Additionally or alternatively to one or more of the examples disclosed above, in some examples the method further comprises capturing the irradiance profile in an axially symmetrical shape. Additionally or alternatively to one or more of the examples disclosed above, in some examples the axially symmetrical shape includes one of a cone, a hollow cone, a rectangular cone, or a star cone. Additionally or alternatively to one or more of the examples disclosed above, in some examples the object is a stylus and the method further comprises capturing the irradiance profile of modulated light received from the stylus by performing analog demodulation on the received light at the plurality of light detectors and aggregating the plurality of illumination intensity values from the plurality of light detectors.

Some examples of the disclosure are directed to an integrated touch screen for performing display operations and optical object sensing, comprising an array of light-emitting diodes (LEDs) configured as light detectors, at least one analog front end (AFE) including at least one amplifier couplable to the array of light detectors, and a plurality of demodulators coupled to the at least one AFE, at least some of the plurality of demodulators configured in a first configuration to demodulate signals received from the light detectors at a plurality of demodulation frequencies, wherein the plurality of demodulation frequencies correspond to modulation frequencies of a plurality of styluses. Additionally or alternatively to one or more of the examples disclosed above, in some examples the plurality of demodulators include a plurality of pairs of demodulators, each pair of demodulators configured for demodulating an in-phase (I) component and a quadrature (Q) component of a particular demodulation frequency corresponding to the modulation frequency of one of the plurality of styluses. Additionally or alternatively to one or more of the examples disclosed above, in some examples the integrated touch screen further comprises at least some of the plurality of demodulators configured in a second configuration to identify incoming modulation frequencies, and control logic configured to deactivate those pairs of demodulators that do not match any identified incoming modulation frequencies.

Some examples of the disclosure are directed to an optical stylus operative with an optical sensing system for performing stylus sensing, comprising a stylus body having a tip and sides, and a reflective surface on at least a portion of the tip and sides of the optical stylus, wherein the reflective surface is configured to reflect incoming light received from the optical sensing system at a plurality of locations with a consistent angular reflection profile regardless of an angle of stylus tilt with respect to a surface normal of the optical sensing system. Additionally or alternatively to one or more of the examples disclosed above, in some examples the reflective surface comprises volumetric scattering material. Additionally or alternatively to one or more of the examples disclosed above, in some examples the volumetric scattering material comprises a diffusive reflector. Additionally or alternatively to one or more of the examples disclosed above, in some examples the volumetric scattering material comprises a Lambertian reflector. Additionally or alternatively to one or more of the examples disclosed above, in some examples the volumetric scattering material has a reflectance of greater than 99% for incoming light having wavelengths between 400-1500 nm. Additionally or alternatively to one or more of the examples disclosed above, in some examples the volumetric scattering material is formed in one or more patterns on the stylus that are configured to generate a spatial signature of reflected light for use in stylus orientation and rotation detection. Additionally or alternatively to one or more of the examples disclosed above, in some examples the angular reflection profile is greater than 90 degrees. Additionally or alternatively to one or more of the examples disclosed above, in some examples the volumetric scattering material is configured to produce an angle of scatter with a cosine angular distribution. Additionally or alternatively to one or more of the examples disclosed above, in some examples the reflective surface comprises a retroreflective surface. Additionally or alternatively to one or more of the examples disclosed above, in some examples the retroreflective surface comprises a sawtooth surface relief structure. Additionally or alternatively to one or more of the examples disclosed above, in some examples the retroreflective surface comprises a plurality of retroreflector facets. Additionally or alternatively to one or more of the examples disclosed above, in some examples at least some of the plurality of retroreflector facets comprise pyramid-shaped facets. Additionally or alternatively to one or more of the examples disclosed above, in some examples at least sone of the pyramid-shaped facets have cut-off points. Additionally or alternatively to one or more of the examples disclosed above, in some examples each pyramid-shaped facet has at least two opposing interior surfaces oriented at 90 degrees to produce retroreflection. Additionally or alternatively to one or more of the examples disclosed above, in some examples an axis of at least some of the plurality of retroreflector facets is oriented normal to the stylus body. Additionally or alternatively to one or more of the examples disclosed above, in some examples at least one of the plurality of retroreflector facets is rotated along an axis of the retroreflector facet. Additionally or alternatively to one or more of the examples disclosed above, in some examples an axis of at least some of the plurality of retroreflector facets is oriented with a non-zero angle with respect to a surface normal of the stylus body. Additionally or alternatively to one or more of the examples disclosed above, in some examples the retroreflective surface is formed in one or more patterns on the stylus that are configured to generate a spatial signature of reflected light for use in stylus orientation and rotation detection. Additionally or alternatively to one or more of the examples disclosed above, in some examples the retroreflective surface is configured to concentrate reflected light back to a location of a source of the incoming light to improve stylus detection. Additionally or alternatively to one or more of the examples disclosed above, in some examples the angular reflection profile is consistent with an angle of the incoming light. Additionally or alternatively to one or more of the examples disclosed above, in some examples an energy distribution of the angular reflection profile varies depending on a tilt angle of the stylus.

Some examples of the disclosure are directed to an optical sensing system operative with an optical stylus for performing stylus sensing, comprising a plurality of optical devices, some of the plurality of optical devices configured as light emitting devices having illumination angles less than a critical angle, and some of the plurality of optical devices configured as light detecting devices to capture a reflected energy profile of reflected light, and one or more processors programmed to determine stylus location and tilt from the reflected energy profile. Additionally or alternatively to one or more of the examples disclosed above, in some examples the light emitting devices are configured to emit light with near-infrared wavelengths. Additionally or alternatively to one or more of the examples disclosed above, in some examples the light emitting devices are configured to emit light with wavelengths between 980 nm and 1 micron. Additionally or alternatively to one or more of the examples disclosed above, in some examples the light detecting devices are configured to detect reflected light with near-infrared wavelengths. Additionally or alternatively to one or more of the examples disclosed above, in some examples the one or more processors are further programmed to track the reflected energy profile over time to determine stylus orientation and rotation. Additionally or alternatively to one or more of the examples disclosed above, in some examples the one or more processors are further programmed to utilize one or more energy distribution thresholds within the reflected energy profile to determine the stylus tilt.

Some examples of the disclosure are directed to an optical stylus operative with an optical sensing system for performing stylus sensing, comprising a stylus body having a tip and sides, and a diffractive reflective surface on at least a portion of the tip and sides of the stylus, wherein the diffractive reflective surface is configured to reflect incoming light received from the optical sensing system at a plurality of locations with a consistent reflected light pattern regardless of an angle of stylus tilt with respect to a surface normal of the optical sensing system. Additionally or alternatively to one or more of the examples disclosed above, in some examples the diffractive reflective surface comprises a plurality of diffractive optical elements. Additionally or alternatively to one or more of the examples disclosed above, in some examples the plurality of diffractive optical elements comprise a volume diffraction grating. Additionally or alternatively to one or more of the examples disclosed above, in some examples the plurality of diffractive optical elements comprise a grid of materials of higher and lower reflectivity. Additionally or alternatively to one or more of the examples disclosed above, in some examples the plurality of diffractive optical elements comprise a grid of materials having different reflection phase shifts. Additionally or alternatively to one or more of the examples disclosed above, in some examples the plurality of diffractive optical elements have a feature density that is a function of a density of light detecting devices in the optical sensing system. Additionally or alternatively to one or more of the examples disclosed above, in some examples the diffractive reflective surface is further configured to reflect the incoming light as a single crosshairs reflected light pattern having a first axis longer than a second axis. Additionally or alternatively to one or more of the examples disclosed above, in some examples the diffractive reflective surface is further configured to reflect the incoming light as a single crosshairs reflected light pattern having a first axis thicker than a second axis. Additionally or alternatively to one or more of the examples disclosed above, in some examples the diffractive reflective surface is further configured to reflect the incoming light with a multiple crosshairs reflected light pattern.

Some examples of the disclosure are directed to an optical sensing system operative with an optical stylus for performing stylus sensing, comprising a plurality of optical devices, some of the plurality of optical devices configured as light emitting devices having illumination angles less than a critical angle in optics, and some of the plurality of devices configured as light detecting devices configured to capture a reflected energy profile of a reflected light pattern, and one or more processors programmed to determine stylus location and tilt from the reflected energy profile of the reflected light pattern. Additionally or alternatively to one or more of the examples disclosed above, in some examples the light emitting devices are configured to emit light with near-infrared wavelengths. Additionally or alternatively to one or more of the examples disclosed above, in some examples the light emitting devices are configured to emit light with wavelengths between 980 nm and 1 micron. Additionally or alternatively to one or more of the examples disclosed above, in some examples a quantity of the light detecting devices is a function of a feature density of the reflected light pattern. Additionally or alternatively to one or more of the examples disclosed above, in some examples the light detecting devices are configured to detect reflected light with near-infrared wavelengths. Additionally or alternatively to one or more of the examples disclosed above, in some examples the one or more processors are further programmed to track the reflected energy profile over time to determine stylus orientation and rotation.

Some examples of the disclosure are directed to a method for determining a first stylus pattern on an optical stylus operative with an optical sensing system for performing stylus sensing, the method comprising determining a first location on the optical stylus and a reflected light pattern to be generated at the optical sensing system, and performing a Fourier transform on the reflected light pattern to obtain the first stylus pattern at the first location. Additionally or alternatively to one or more of the examples disclosed above, in some examples the first stylus pattern is a reoriented version of a default stylus pattern located at the stylus tip. Additionally or alternatively to one or more of the examples disclosed above, in some examples the first stylus pattern is a compressed version of a default stylus pattern located at the stylus tip. Additionally or alternatively to one or more of the examples disclosed above, in some examples the first stylus pattern is a tilted version of a default stylus pattern located at the stylus tip. Additionally or alternatively to one or more of the examples disclosed above, in some examples the method further comprises incrementally changing a spacing of features in the first stylus pattern at a plurality of positions across the optical stylus to account for incoming spherical waves.

Some examples of the disclosure are directed to an optical stylus operative with an optical sensing system for performing stylus sensing, comprising a stylus body having a tip and sides, and a first light detecting device located at the tip of the stylus body, wherein the first light detecting device is configured to receive modulated light at a plurality of first modulation frequencies and generate first light detection data at each first modulation frequency. Additionally or alternatively to one or more of the examples disclosed above, in some examples the optical stylus further comprises a processor programmed to determine a frequency response of the received modulated light from the first light detection data, derive an amplitude at each of the received plurality of first modulation frequencies from the determined frequency response, and determine a location of the optical stylus at the optical sensing system from the derived amplitudes at the received plurality of first modulation frequencies. Additionally or alternatively to one or more of the examples disclosed above, in some examples the processor is further programmed to use a map of locations of a plurality of light emitting devices in the optical sensing system and the first modulation frequencies of each of the plurality of first light emitting devices to determine the location of the optical stylus. Additionally or alternatively to one or more of the examples disclosed above, in some examples the processor is further programmed to determine the location of the optical stylus by using the map to associate the derived amplitudes at each of the received plurality of first modulation frequencies with locations of a plurality of light emitting devices in the optical sensing system. Additionally or alternatively to one or more of the examples disclosed above, in some examples the processor is further programmed to linearize the derived amplitudes at each of the received plurality of first modulation frequencies with distance from a light emitting device. Additionally or alternatively to one or more of the examples disclosed above, in some examples the processor is further programmed to use a map of locations of a plurality of groups of first light emitting devices in the optical sensing system and an arrangement of modulation frequencies within each of the groups to determine the location of the optical stylus. Additionally or alternatively to one or more of the examples disclosed above, in some examples the processor is further programmed to determine the location of the optical stylus by using the map to associate a detected arrangement of first modulation frequencies within a detected group of light emitting devices with a locations in the optical sensing system. Additionally or alternatively to one or more of the examples disclosed above, in some examples the processor is further programmed to derive phase information at each of the plurality of first modulation frequencies from the determined frequency response, and determine the location of the optical stylus at the optical sensing system from the derived amplitudes and the derived phase information at the plurality of received first modulation frequencies. Additionally or alternatively to one or more of the examples disclosed above, in some examples the optical stylus further comprises a second light detecting device located around the side of the stylus body, wherein each of the second light detecting devices is configured to receive modulated light at a plurality of second modulation frequencies and generate second light detection data at each second modulation frequency. Additionally or alternatively to one or more of the examples disclosed above, in some examples the optical stylus further comprises a processor programmed to determine a frequency response of the received modulated light from the second light detection data, derive an amplitude at each of the received plurality of second modulation frequencies from the determined frequency response at each second light detecting device, and determine a location of the optical stylus at the optical sensing system from the derived amplitudes at the received plurality of second modulation frequencies at the first light detecting device and the one or more second light detecting devices. Additionally or alternatively to one or more of the examples disclosed above, in some examples the processor is further programmed to determine a rotation of the optical stylus about its axis by tracking the derived amplitudes at the plurality of received modulation frequencies at the one or more second light detecting devices over time.

Some examples of the disclosure are directed to an optical sensing system operative with an optical stylus for performing stylus sensing, comprising an array of light emitting devices, each light emitting device configured for emitting light at a particular modulation frequency such that light at a plurality of modulation frequencies is emitted from the array of light emitting devices, wherein the plurality of modulation frequencies is selected to be detectable by the optical stylus. Additionally or alternatively to one or more of the examples disclosed above, in some examples the light emitting devices are configured to emit light with near-infrared wavelengths. Additionally or alternatively to one or more of the examples disclosed above, in some examples the light emitting devices are configured to emit light with wavelengths between 980 nm and 1 micron.

Some examples of the disclosure are directed to an optical stylus operative with an optical sensing system for performing stylus sensing, comprising a stylus body having a tip, a light emitting device, and a pattern generator disposed between the light emitting device and the tip, wherein the pattern generator is configured to generate an illumination pattern through the tip of the stylus body when light from the light emitting device impinges upon the pattern generator. Additionally or alternatively to one or more of the examples disclosed above, in some examples the light emitting device is a light emitting diode (LED), and the pattern generator is a patterned aperture configured for generating the illumination pattern. Additionally or alternatively to one or more of the examples disclosed above, in some examples the LEDs are configured to emit light with near-infrared wavelengths. Additionally or alternatively to one or more of the examples disclosed above, in some examples the LEDs are configured to emit light with wavelengths between 980 nm and 1 micron. Additionally or alternatively to one or more of the examples disclosed above, in some examples the light emitting device is a laser, and the pattern generator is a diffractive pattern generator configured for generating the illumination pattern. Additionally or alternatively to one or more of the examples disclosed above, in some examples the diffractive pattern generator is further configured to generate the illumination pattern as a single crosshairs having a first axis longer than a second axis. Additionally or alternatively to one or more of the examples disclosed above, in some examples the diffractive pattern generator is further configured to generate the illumination pattern as a single crosshairs having a first axis thicker than a second axis. Additionally or alternatively to one or more of the examples disclosed above, in some examples the diffractive pattern generator is configured to generate the illumination pattern as multiple crosshairs.

Some examples of the disclosure are directed to an optical sensing system operative with an optical stylus for performing stylus sensing, comprising a plurality of light detecting devices configured to capture an illumination energy profile of an illumination pattern, and one or more processors programmed to determine one or more of stylus location, tilt, orientation and rotation from the illumination energy profile of the illumination pattern. Additionally or alternatively to one or more of the examples disclosed above, in some examples the optical sensing system further comprises a lock-in amplifier communicatively coupled to one or more of the plurality of light detecting devices to filter out ambient light that is separate from the illumination pattern. Additionally or alternatively to one or more of the examples disclosed above, in some examples a quantity of the light detecting devices is a function of a feature density of the illumination pattern. Additionally or alternatively to one or more of the examples disclosed above, in some examples the plurality of light detecting devices are configured to detect light that forms the illumination pattern with near-infrared wavelengths. Additionally or alternatively to one or more of the examples disclosed above, in some examples the one or more processors are further programmed to track the illumination energy profile over time to determine stylus orientation and rotation.

Some examples of the disclosure are directed to an optical stylus operative with an optical sensing system for performing stylus sensing, comprising a stylus body having a tip and sides, a light emitting device located in the tip of the stylus, a splitting element located in the tip and configured for separating incoming light into a plurality of wavelengths, a plurality of light detecting devices located in the tip and optically coupled to the splitting element, each light detecting device for receiving light of a different wavelength from the splitting element, and a processor communicatively coupled to the plurality of light detecting devices and configured to determine one or more wavelengths of the incoming light, and determine a location of the stylus on the optical sensing system from the one or more wavelengths and a spectrum map of the optical sensing system.

Some examples of the disclosure are directed to an optical sensing system operative with an optical stylus for performing stylus sensing, comprising an array of display elements, and a retroreflector layer formed between the array of display elements, the retroreflector layer formed with varying retroreflective properties at different locations across the optical sensing system, wherein the display elements and the retroreflector layer are configured to reflect light at different wavelengths for detection by the optical stylus. Additionally or alternatively to one or more of the examples disclosed above, in some examples the retroreflector layer comprises a diffractive grating with varying periodicity to produce a spectral shift. Additionally or alternatively to one or more of the examples disclosed above, in some examples the retroreflector layer forms a chirp across the optical sensing system. Additionally or alternatively to one or more of the examples disclosed above, in some examples the optical sensing system further comprises a plurality of touch electrodes, and display electronics, wherein the plurality of electrodes and the display electronics are configured to reflect light at different wavelengths for detection by the optical stylus.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An integrated touch screen for performing display operations and optical object sensing, comprising:
a cover material having a detection surface;
an array of photodetectors, including a first photodetector, arranged below the cover material;
a first light-blocking layer, including a first light-blocking element corresponding to the first photodetector, arranged between the array of photodetectors and the cover material, the first light-blocking layer including a first plurality of apertures configured as detector angular filters for blocking light having a detection angle less than a first critical angle from impinging on the photodetectors; and
an array of illuminators, including a first illuminator, arranged below the cover material, the first light-blocking layer further including a second light-blocking element corresponding to the first illuminator, and a second plurality of apertures configured as illuminator angular filters for blocking light, emitted by the illuminators, having an illumination angle greater than a second critical angle, different from the first critical angle, from impinging on the cover material,
wherein:
the first light-blocking element is offset from the first photodetector, toward the cover material, and the first light-blocking element comprises an annular structure, and
the first critical angle is determined in accordance with the cover material and a first medium in contact with the cover material, and is defined with respect to a normal to the detection surface.

2. The integrated touch screen of claim 1, wherein the first medium is water, and the first critical angle is +/−62.7 degrees+/−1 degree.

3. The integrated touch screen of claim 1, wherein the first critical angle is less than at least one first reflection angle determined in accordance with the cover material and a second medium in contact with the cover material.

4. The integrated touch screen of claim 1, wherein the first critical angle is the greater of the first critical angle and the second critical angle that is determined in accordance with the cover material and a second medium in contact with the cover material.

5. The integrated touch screen of claim 4, wherein the second medium is air, and the second critical angle is +/−42 degrees+/−1 degree.

6. The integrated touch screen of claim 1, further comprising a second light-blocking layer arranged between the photodetectors and the first light-blocking layer, the second light-blocking layer including a plurality apertures, aligned with the first plurality of apertures of the first light-blocking layer, configured as part of the detector angular filters for blocking light that is less than the first critical angle.

7. The integrated touch screen of claim 1, wherein:
the second critical angle is determined in accordance with the cover material and a second medium in contact with the cover material, and is defined with respect to the normal to the detection surface.

8. The integrated touch screen of claim 7, wherein the second critical angle is lesser of the second critical angle and a third critical angle that is determined in accordance with the cover material and a third medium in contact with the cover material.

9. The integrated touch screen of claim 8, wherein the third medium is water, and the third critical angle is +/−62.7 degrees+/−1 degree.

10. The integrated touch screen of claim 7, wherein the second medium is air, and the second critical angle is +/−42 degrees+/−1 degree.

11. The integrated touch screen of claim 7, further comprising a second light-blocking layer arranged between the array of illuminators and the first light-blocking layer, the second light-blocking layer including a plurality of third apertures aligned with the plurality of second apertures and configured as part of the illuminator angular filters for blocking light having the illumination angle that is greater than the second critical angle.

12. A method for angularly filtering light at a touch sensing device to improve object detection, comprising:
determining a first critical angle in accordance with a cover material of the touch sensing device and a first medium in contact with the cover material;
blocking light having a detection angle less than the first critical angle from impinging on a plurality of photodetectors, including a first photodetector, located below the cover material;
determining a second critical angle, different from the first critical angle, associated with a plurality of illuminators, including a first illuminator, located below the cover material of the touch sensing device, and a second medium in contact with the cover material; and
blocking light, from the plurality of illuminators, having an illumination angle greater than the second critical angle from impinging on the cover material,
wherein:
a first light-blocking element, configured to block light from the first photodetector, is offset toward the cover material from the first photodetector,
the first light blocking element comprises an annular structure, and
a second light-blocking element, configured to block light emitted by the first illuminator, is offset toward the cover material from the first illuminator.

13. The method of claim 12, further comprising:
allowing light having a detection angle greater than the first critical angle to impinge on the plurality of photodetectors through a plurality of first apertures in a first light-blocking layer located between the plurality of photodetectors and the cover material.

14. The method of claim 13, further comprising:
allowing the light having the detection angle greater than the first critical angle to impinge on the plurality of photodetectors through a plurality of second apertures in a second light-blocking layer located between the plurality of photodetectors and the first light-blocking layer.

15. The method of claim 12, wherein the first critical angle is less than at least one first reflection angle determined in accordance with the cover material and a second medium in contact with the cover material.

16. The method of claim 12, further comprising:
determining a second critical angle in accordance with the cover material and a second medium in contact with the cover material; and
determining the first critical angle as the greater of the first critical angle and the second critical angle.

17. The method of claim 12, wherein determining the second critical angle is in accordance with the cover material of the touch sensing device and a second medium in contact with the cover material.

18. The method of claim 17, further comprising:
determining a third critical angle in accordance with the cover material and a third medium in contact with the cover material; and
determining the second critical angle as lesser of the second critical angle and the third critical angle.

19. The method of claim 17, further comprising:
allowing light having an illumination angle less than the second critical angle through a plurality of first apertures in a first light-blocking layer located between the plurality of illuminators and the cover material.

20. An integrated touch screen for performing display operations and optical object sensing, comprising:
a cover material having a detection surface;
an illuminator optically coupled to the cover material for transmitting light laterally into the cover material at a first angle that is equal to or greater than a critical angle of the cover material for causing internal reflections at the first angle within the cover material; and
an array of photodetectors, arranged in a layer below the cover material, different than the display layer, configured to detect light approaching the photodetectors from the cover material;
wherein the critical angle is defined with respect to a normal to the detection surface in accordance with the cover material and one or more media in contact with the cover material.

* * * * *